United States Patent [19]
Sakai et al.

[11] Patent Number: 5,955,228
[45] Date of Patent: Sep. 21, 1999

[54] METHOD AND APPARATUS FOR FORMING A POWDER IMAGE

[75] Inventors: Katsuo Sakai, Yokohama; Takahiko Tokumasu, Tokyo; Osamu Endo, Kawasaki; Masami Kadonaga, Yokohama, all of Japan

[73] Assignee: Ricoh Company, Ltd, Tokyo, Japan

[21] Appl. No.: 08/816,623

[22] Filed: Mar. 13, 1997

[30] Foreign Application Priority Data

| Mar. 14, 1996 | [JP] | Japan | 8-085836 |
|---|---|---|---|
| Mar. 14, 1996 | [JP] | Japan | 8-085837 |
| Mar. 15, 1996 | [JP] | Japan | 8-087713 |
| Mar. 15, 1996 | [JP] | Japan | 8-087715 |
| Mar. 15, 1996 | [JP] | Japan | 8-087718 |
| Mar. 22, 1996 | [JP] | Japan | 8-093592 |
| Jul. 18, 1996 | [JP] | Japan | 8-209310 |
| Oct. 4, 1996 | [JP] | Japan | 8-283412 |

[51] Int. Cl.⁶ ............................ G03G 13/08
[52] U.S. Cl. ............................ 430/53; 430/120
[58] Field of Search .............. 430/120, 53; 347/55; 101/489

[56] References Cited

U.S. PATENT DOCUMENTS

| 3,809,556 | 5/1974 | Pressman et al. | 430/53 |
|---|---|---|---|
| 3,977,323 | 8/1976 | Pressman et al. | 430/53 |
| 4,435,066 | 3/1984 | Tarumi et al. | 430/53 |
| 4,611,730 | 9/1986 | Ikesue et al. | 222/167 |
| 4,641,945 | 2/1987 | Ikesue et al. | 355/300 |
| 4,700,659 | 10/1987 | Hirakura et al. | 118/652 |
| 4,744,493 | 5/1988 | Ikesue et al. | 222/167 |
| 4,878,603 | 11/1989 | Ikesue et al. | 222/167 |
| 5,132,733 | 7/1992 | Koizumi et al. | 355/245 |
| 5,495,273 | 2/1996 | Kitamura | 347/55 |
| 5,508,794 | 4/1996 | Ikesue et al. | 355/260 |
| 5,552,814 | 9/1996 | Maeda et al. | 347/55 |
| 5,598,254 | 1/1997 | Ikesue et al. | 399/262 |
| 5,633,110 | 5/1997 | Desie et al. | 430/120 |

FOREIGN PATENT DOCUMENTS

| 61-62081 | 3/1986 | Japan . |
|---|---|---|
| 62-248662 | 10/1987 | Japan . |
| 63-139752 | 6/1988 | Japan . |

*Primary Examiner*—John Goodrow
*Attorney, Agent, or Firm*—Oblon, Spivak, McClelland, Maier & Neustadt, P.C.

[57] ABSTRACT

A method of forming a powder image on a recording medium and an apparatus therefor are disclosed. The apparatus includes a toner carrier for carrying powdery toner in a layer or layers thereon, a counter electrode, and a flight control member having independent or continuous extremely small holes and a plurality of control electrodes for controlling the passage of toner through the holes. A voltage is applied to the control electrodes in accordance with an image signal in order to cause the toner to fly from the toner carrier toward the counter electrode via the holes. The toner deposits on the recording medium intervening between the flight control member and the counter electrode, forming an image on the recording medium. The method and apparatus are capable of increasing a recording speed, recording an image even on a paper in a humid environment or on a conductor, simplifying circuitry for driving control electrodes included in the flight control member, promoting the effective use of drivers during image formation, causing only a part of toner for forming an image to fly, and reducing the cost.

14 Claims, 28 Drawing Sheets

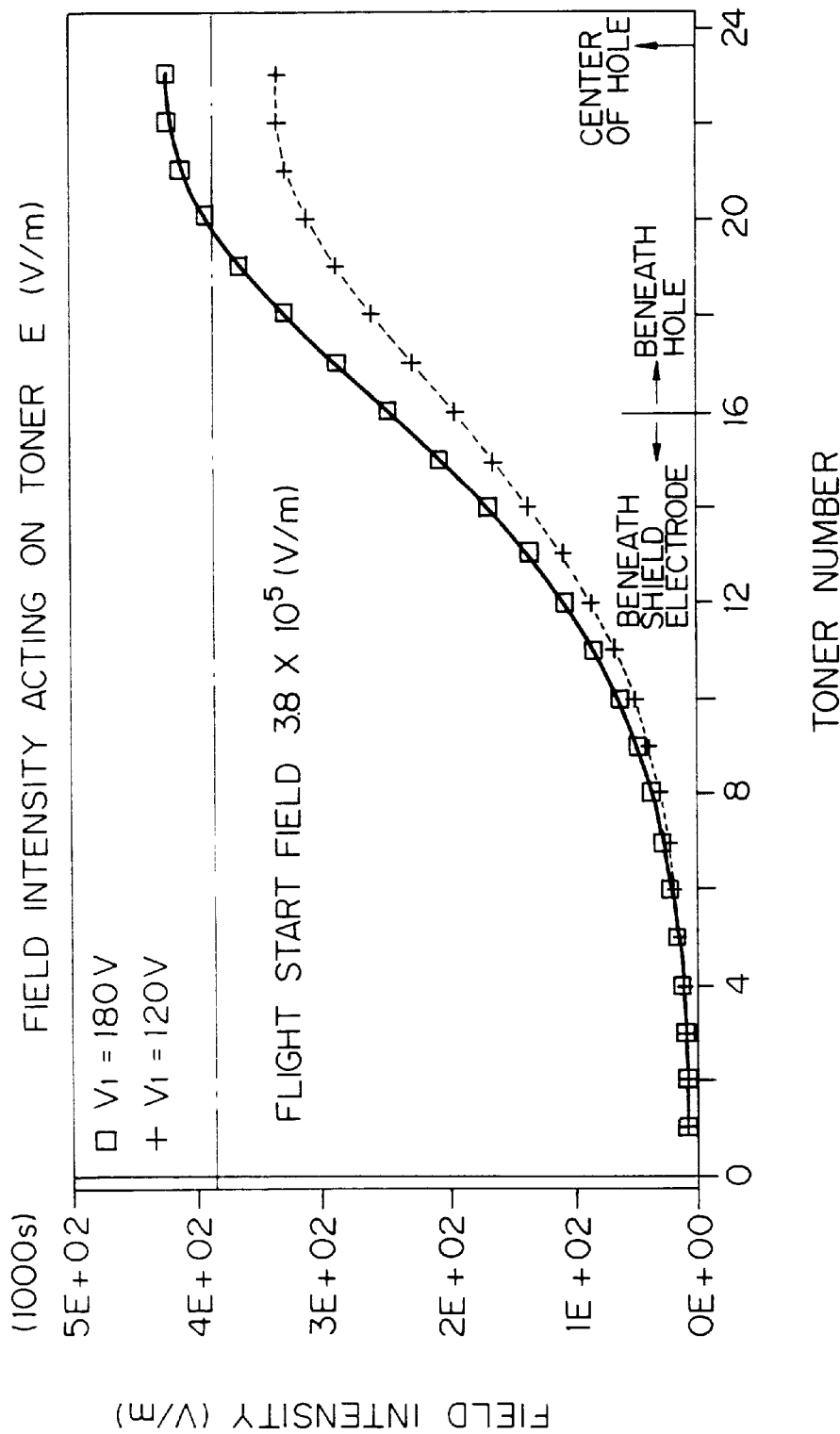

Fig. 11
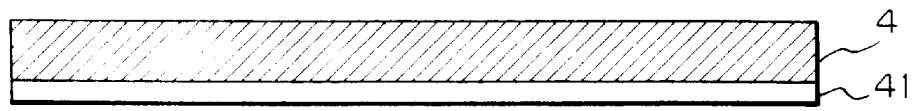
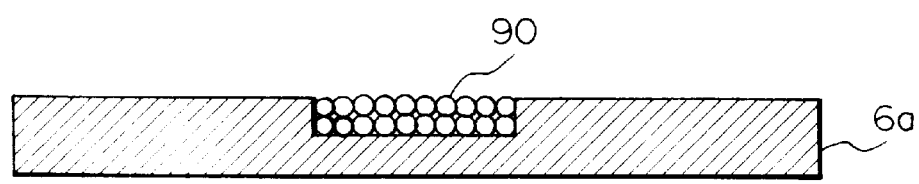
Fig. 12
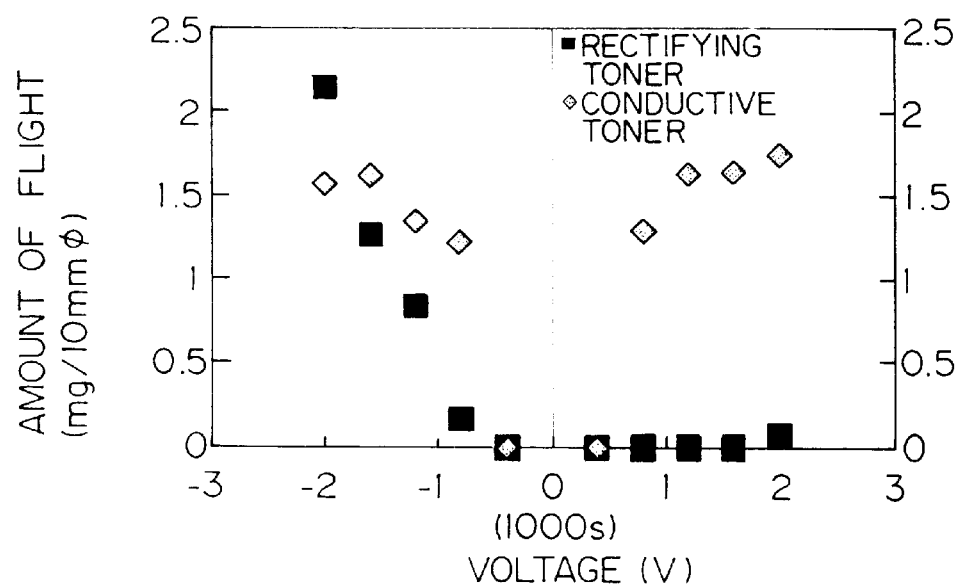

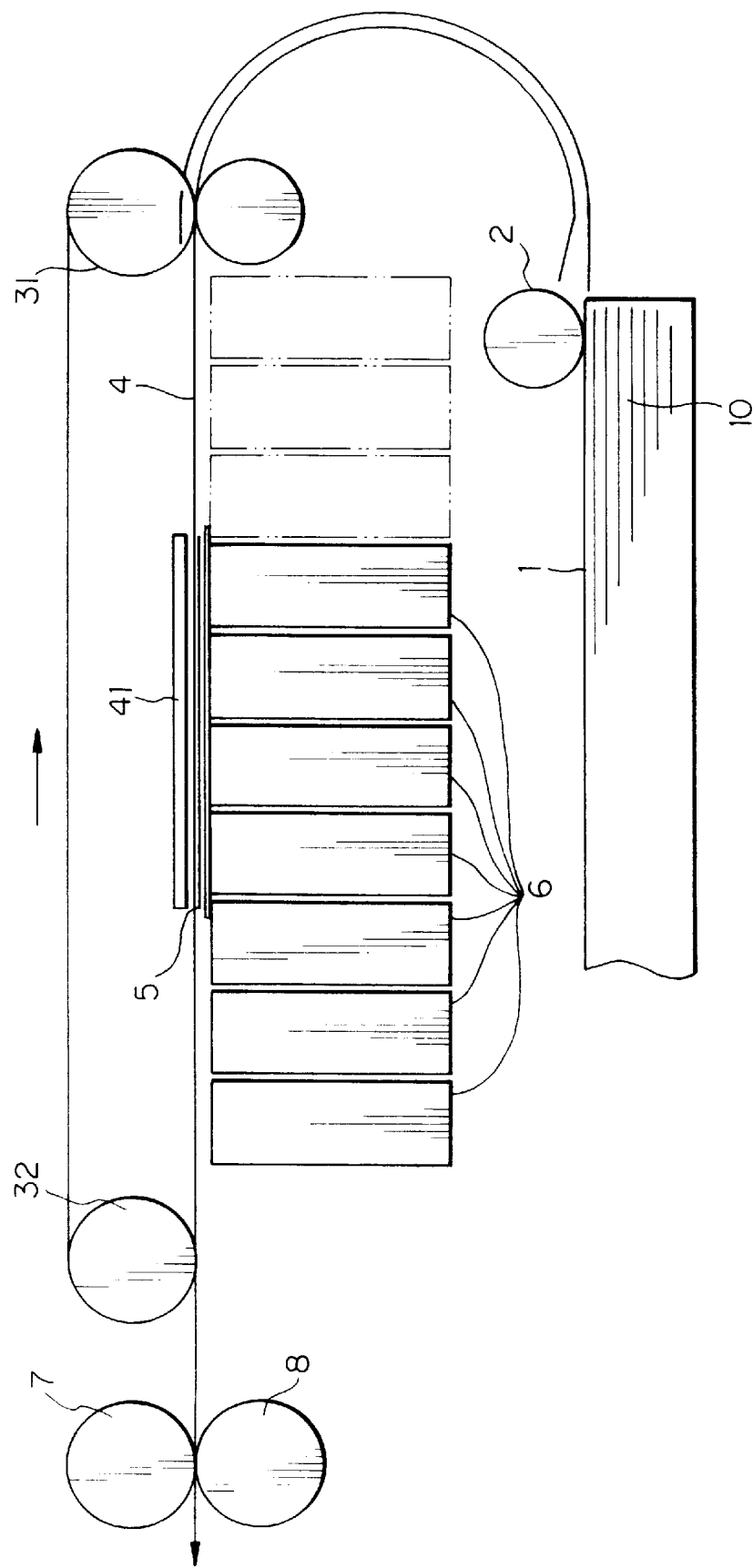

METHOD AND APPARATUS FOR FORMING A POWDER IMAGE

BACKGROUND OF THE INVENTION

1. Field of the Invention

The present invention relates to a method of forming a powder image on a recording medium, and an apparatus therefor. The method and apparatus use a toner carrier for carrying powdery toner in a layer or layers thereon, a counter electrode, and a flight control member having a plurality of independent or continuous extremely small holes, or microholes, and a plurality of control electrodes for controlling the passage of toner through the microholes. Voltages are applied to the control electrodes in accordance with an image signal in order to cause the toner to fly from the toner carrier toward the counter electrode via the microholes. The toner deposits on a recording medium intervening between the flight control member and the counter electrode, forming an image on the recording medium.

2. Discussion of the Background

An image recording method using powder and called direct toning or toner projection is conventional. In this kind of image forming method, a voltage is applied to image electrodes surrounding holes or slits so as to cause charged toner to move (fly) via the holes or the slits. As a result, the toner directly forms an image on a paper or similar recording medium.

The above image recording method has been proposed in various forms in the past. For example, Japanese Patent Publication No. 44-26333 discloses an apparatus including a counter electrode, a recording medium, a control grid, a mesh electrode and a fur brush sequentially arranged in this order. The fur brush feeds insulative toner to the mesh electrode. The insulative toner is charged by friction due to the rotation of the brush, and then accelerated toward the counter electrode by an electric field formed between the mesh electrode and the counter electrode. As a result, the toner forms an image on the recording medium, flying via the control grid. When the value of an electric signal applied to the control grid is varied, an electric field between the mesh electrode and the control grid is inverted. This prevents the toner from flying and forms a background (white) on the recording medium. Further, the value of the electric signal may be increased or decreased in order to vary image density.

However, the above apparatus using the insulative toner needs a large scale device for rotating the brush which charges the toner by friction. While the insulative toner may be charged in the same manner as in a conventional developing system using a single- or two-ingredient type developer, a large scale device including a carrier, agitating mechanism and developing roller is also needed. In addition, because frictional charging generates heat, use must be made of resin having a relatively high melting point as mother resin of the toner. This makes it difficult to lower a fixing temperature and therefore to save energy.

Japanese Patent Laid-Open Publication No. 58-44456 proposes an apparatus using conductive magnetic toner in place of the insulative toner needing frictional charging. The apparatus includes a control electrode, a base electrode and a toner carrier or toner conveying means sequentially arranged in this order. The control electrode and base electrode sandwich a counter electrode, a recording medium, and an insulating member. The control member and base electrode are formed with holes for allowing the toner to pass therethrough. A DC electric field is formed between the base electrode and the toner carrier so as to cause the toner on the toner carrier to form a cloud. While a DC electric field is formed between the base electrode and the counter electrode, a voltage for image formation is applied to signal electrodes. As a result, the toner in the form of a cloud forms an image on the recording medium, flying via the holes. The conductive toner does not have to be charged beforehand. Such toner can be easily charged by charge injection based on an outside electric field.

The toner carrier of the apparatus using the conductive magnetic toner carries the toner thereon, relying on a magnetic force. However, because a transparent magnetic material has not been accomplished yet, the apparatus cannot produce a full-color print by laminating transparent color toners.

Japanese Patent Publication No. 6-47298 teaches an apparatus having a counter electrode, a recording medium, a flight control member, and a toner carrier sequentially arranged in this order. The flight control member h a s microholes and control electrodes surrounding them. The toner carrier carries conductive toner in a layer thereon. While a DC electric field is formed between the toner carrier and the counter electrode, the voltage state of the individual control electrode is switched in accordance with an image signal to one for causing the toner to fly from the toner carrier toward the recording medium or one for preventing it from flying. When the control electrode is switched to the former voltage state, charge is induced on the conductive toner and causes it to fly so as to form an image on the recording medium. This kind of scheme, however, has some problems left unsolved, as follows.

(1) In the voltage state preventing the toner from flying, the same potential is applied to the toner carrier and control electrodes. Therefore, if the voltage state is switched from one causing the toner to fly to one preventing it from flying before the toner left the toner carrier in the former voltage state reaches the recording medium, the toner will simply float because the toner conveying force is lost. The floating toner smears the inside of the apparatus and deposits on the control electrodes to result in the need for cleaning. The document clearly describes that the conductive toner has already deposited on the recording medium when the latter voltage state is set up. It follows that during image formation the former voltage must be continuously applied to the control electrodes until the toner left the toner carrier reaches the recording medium. The duration of this voltage effects the recording speed available with the apparatus.

(2) When the resistance of, e.g., a paper decreases due to a hot and humid environment, it is likely that charge of opposite polarity is injected from the paper into the toner deposited thereon, charging the toner to the opposite polarity. When an electrostatic force ascribable to the charge of opposite polarity and acting toward the toner carrier exceeds attraction acting between the recording medium and the toner, i.e., van der Waals's forces, the toner flies in the reverse direction and lowers image density to a noticeable degree.

(3) The toner flying in the reverse direction elastically collides against the toner flying toward the recording member. As a result, the toner flies in the horizontal direction to a substantial distance. This part of the toner is scattered around a desired image on the recording medium and blurs the boundary between the image and the background. The resulting image lacks sharpness.

(4) If the toner left the toner carrier deposits on the control electrodes, charge of opposite polarity is injected into the toner and causes the toner to fly inversely toward the toner carrier. As a result, the toner flies back and forth repeatedly. The toner is therefore apt to stop the microholes of the flight control member and to deposit on the counter electrode and control electrodes via the microholes, resulting in defective images. Consequently, a cleaning step is necessary which lowers the printing speed. In addition, a shield must be provided in order to prevent the toner flying back and forth from smearing the inside of the apparatus, increasing the size and cost of the apparatus.

(5) When the conductive toner is deposited on the recording medium in layers, electrostatic induction occurs due to the electric field around the toner. Therefore, the charge of the toner forming the second and successive layers on the recording medium migrates toward the first layer close to the counter electrode. As a result, the toner of the second and successive layers are charged to the opposite polarity and caused to fly reversely. It follows that basically only a single layer is available with the conductive toner. Consequently, a full-color image in the form of a laminate of yellow, magenta and cyan toners cannot be formed.

(6) When charge is repeatedly injected into the toner, electrons are deeply trapped in the portions of the toner where the energy level is low. In this condition, the toner is charged to either polarity and prevented from flying due to the increase in electrostatic adhesion. Also, the toner hitting against the toner carrier and control electrodes repeatedly is pulverized and loses conductivity, eventually failing to fly.

(7) The control electrodes are arranged in an array in the direction perpendicular to the direction in which the recording medium is conveyed. The control electrodes or the control grids have their voltage states switched at the same time in accordance with an image signal while the recording medium is in transport. When the control grids or control electrodes with such a structure and the above voltage application scheme are used, the required number of IC (Integrated Circuit) drivers increases in proportion to the number of control grids or that of control electrodes. For example, when a sheet of size A4 having a width of 210 mm is fed in a vertically long position, and when the resolution is 600 dpi (dots per inch), 4,960 image electrodes are driven. Assume that an IC driver having thirty-two output terminals and capable of driving thirty-two image electrodes is used. Then, the number of IC drivers necessary to drive the 4,960 image electrodes is as great as 155 in total. In the case of a color printer, as many as 620 IC drivers are required.

Assume an image forming apparatus using the direct toning or toner projection scheme forms a color image. Then, use is made of, e.g., magenta, cyan, yellow and black toners. In a black-and-white mode, only the black toner is used. Therefore, when the apparatus selectively operable in a color mode and a black-and-white mode is used to form a black-and-white mode, only one of the flight control members assigned to the black toner is used while the other flight control members simply remain idle. In offices, black-and-white prints are usually predominant over color print, so that image forming sections other than one assigned to the black toner are idle most of the time. Generally, the cost of this kind of apparatus is mostly occupied by IC drivers for applying a voltage to the control electrodes in accordance with an image signal. It follows that in the black-and-white mode most of the IC drivers are not used, wasting the greater part of the printer cost. This is also true when an image forming apparatus operable with a different kinds of toners forms images by using only a particular kind of toner.

SUMMARY OF THE INVENTION

It is therefore an object of the present invention to provide a powder image recording method capable of increasing a recording speed, and an apparatus therefor.

It is another object of the present invention to provide a powder image recording method capable of recording an image even on a paper in a humid environment or on a conductor, and an apparatus therefor It is another object of the present invention to provide a powder image forming method capable of simplifying circuitry for driving control electrodes included in a flight control member, and an apparatus therefor.

It is another object of the present invention to provide a powder image forming apparatus promoting the effective use of drivers during image formation.

It is another object of the present invention to provide a method or an apparatus for forming a powder image and capable of causing only a part of toner for forming an image to fly.

It is another object of the present invention to provide a powder image forming method capable of reducing the cost, and an apparatus therefor.

In accordance with the present invention, in an image recording method using a toner carrier for carrying a toner thereon, a counter electrode, and a flight control member intervening between the toner carrier and the counter electrode and having a plurality of independent or continuous microholes and a plurality of control electrodes for controlling the passage of toner through the microholes, a voltage is applied to the control electrodes in accordance with an image signal to thereby cause the toner on the toner carrier to move toward the counter electrode via the microholes, depositing on a recording medium intervening between the flight control member and the counter electrode to thereby form an image on the medium. Even when a voltage for forming an image is not applied to the control electrodes, an electric field is continuously applied which generates an electrostatic force causing the toner which left the toner carrier to fly toward the recording medium, but preventing the toner from newly flying from said toner carrier.

The toner may be rectifying toner exhibiting a rectifying characteristic in a range of voltages used in the method.

Also, in accordance with the present invention, an electric field for preventing the toner other than the toner expected to pass through the microholes is prevented from flying from the toner carrier.

Further, in accordance with the present invention, an image recording includes a toner carrier for carrying toner thereon, a counter electrode, and a flight control member intervening between the toner carrier and the counter electrode, and having a plurality of independent or continuous microholes and a plurality of control electrodes for controlling the passage of the toner through the microholes. A voltage applying section applies a voltage to the control electrodes in accordance with an image signal. A controller controls the voltage applying section such that the toner moves from the toner carrier toward the counter electrode via the microholes and deposit on a recording medium intervening between the flight control member and the counter electrode. The controller further controls the voltage applying section such that even when a voltage for forming an image is not applied to the control electrodes, an electric field is continuously applied which generates an electrostatic force causing the toner left the toner carrier to fly toward the recording medium, but preventing the toner from newly flying from the toner carrier.

BRIEF DESCRIPTION OF THE DRAWINGS

The above and other objects, features and advantages of the present invention will become apparent from the following detailed description taken with the accompanying drawings in which:

FIG. 7 is a graph showing an electric field distribution on the surface of a toner layer;

FIG. 11 is a fragmentary view of a device for measuring the characteristic of rectifying toner used in a second embodiment of the present invention;

FIG. 12 shows a relation between the amount of flight of toner and the voltage applied to a counter electrode, as measured by the device shown in FIG. 11;

FIG. 18 is a front view showing a fourth embodiment of the present invention;

DESCRIPTION OF THE PREFERRED EMBODIMENTS

Figure 1:
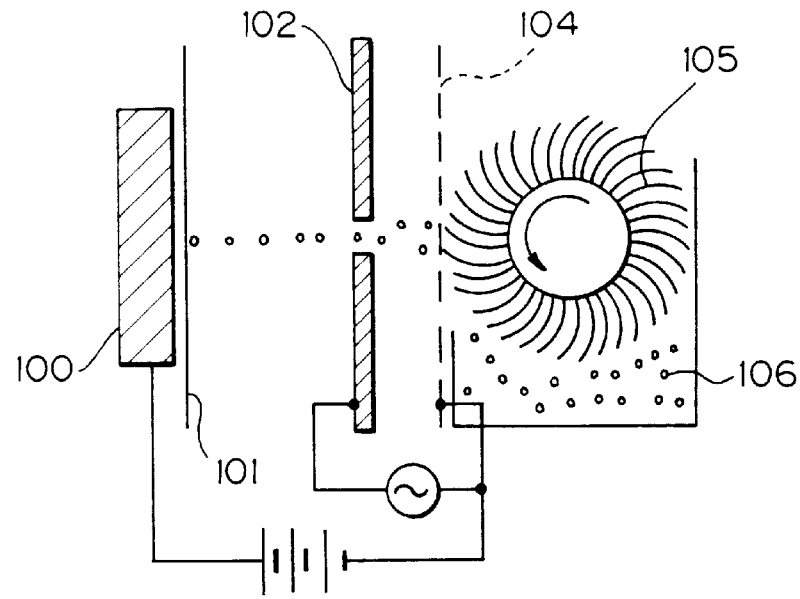
FIG. 1 is a section showing a conventional powder image recording apparatus.

To better understand the present invention, brief reference will be made to a conventional image recording system referred to as direct toning or toner projection. FIG. 1 shows an image recording apparatus using the conventional recording system and taught in, e.g., Japanese Patent Publication No. 44-26333 mentioned earlier. As shown, the apparatus has a counter electrode 100, a recording medium in the form of a sheet 101, a control grid 102, a mesh electrode 104, and a fur brush 105 sequentially arranged in this order. The fur brush 105 feeds toner to the mesh electrode 104. The apparatus uses insulative toner 106. The toner 106 is frictionally charged by the brush 105 while the brush 105 is in rotation. The charged toner 106 flies toward the counter electrode 100 via the control grid 102 while being accelerated by an electric field formed in the space between the mesh electrode 104 and the counter electrode 100. As a result, the toner 106 forms an image on the sheet 101. When the value of an electric signal applied to the control grid 102 is varied, an electric field between the mesh electrode 104 and the control grid 102 is inverted. This prevents the toner 106 from flying and forms a background (white) on the sheet 101. Further, the value of the electric signal may be increased or decreased in order to vary the density of the image. However, this kind of apparatus has the problems discussed earlier.

Figure 2:
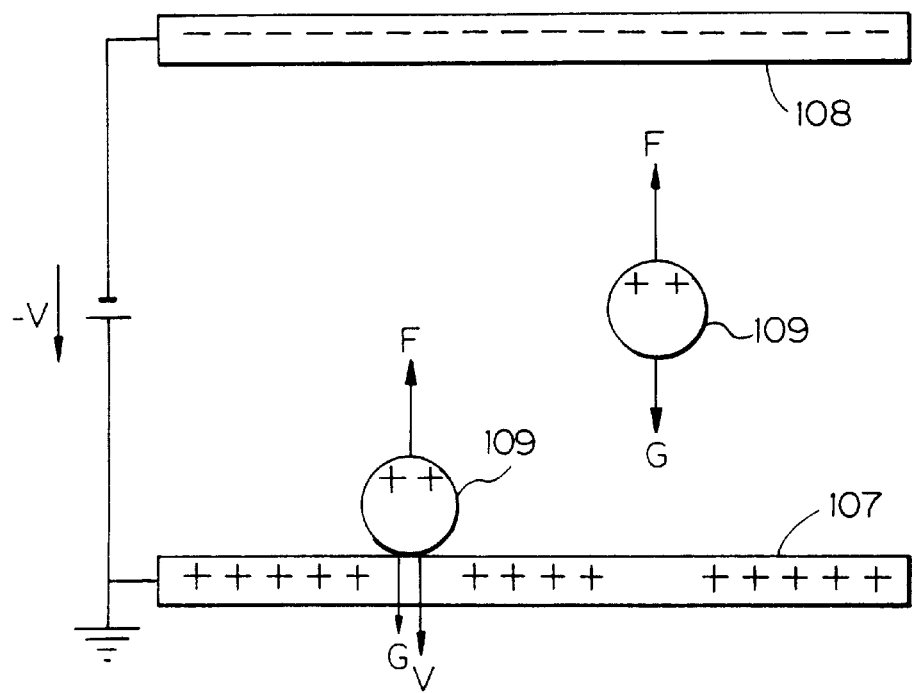
FIG. 2 demonstrates the flight of conductive toner heretofore used in a powder image recording apparatus.

FIG. 2 demonstrates the flight of conductive toner to occur in, e.g., an image recording apparatus proposed in Japanese Patent Publication No. 6-47298 also mentioned earlier. A control grid is not shown in FIG. 2 for simplicity. As shown, the apparatus includes a toner carrier 107 connected to ground, and a counter electrode 108. When a negative voltage −V is applied to the counter electrode 108, a positive charge q is injected into the conductive toner labeled 109. Assuming that the toner carrier 107 and counter electrode 108 are spaced by a distance d, then an electric field E around the toner 109 is directed from the toner carrier 107 toward the counter electrode 108 and has an intensity of V/d. As a result, an electrostatic force F=qV/d acts on the toner 109 upward. When the electrostatic force F exceeds the sum of gravity G acting on the toner 109 downward and the adhesion V (van der Waals's forces) acting between the particles of the toner 109 or between the toner 109 and the toner carrier 107, the toner 109 is released from the toner carrier 107 and caused to fly toward the counter electrode 108. In this manner, by using the conductive toner 109, it is possible to charge the toner 109 easily by charge injection. This eliminates the need for frictional charging. However, this kind of scheme has some issues yet to be solved, as stated previously.

Figure 3:
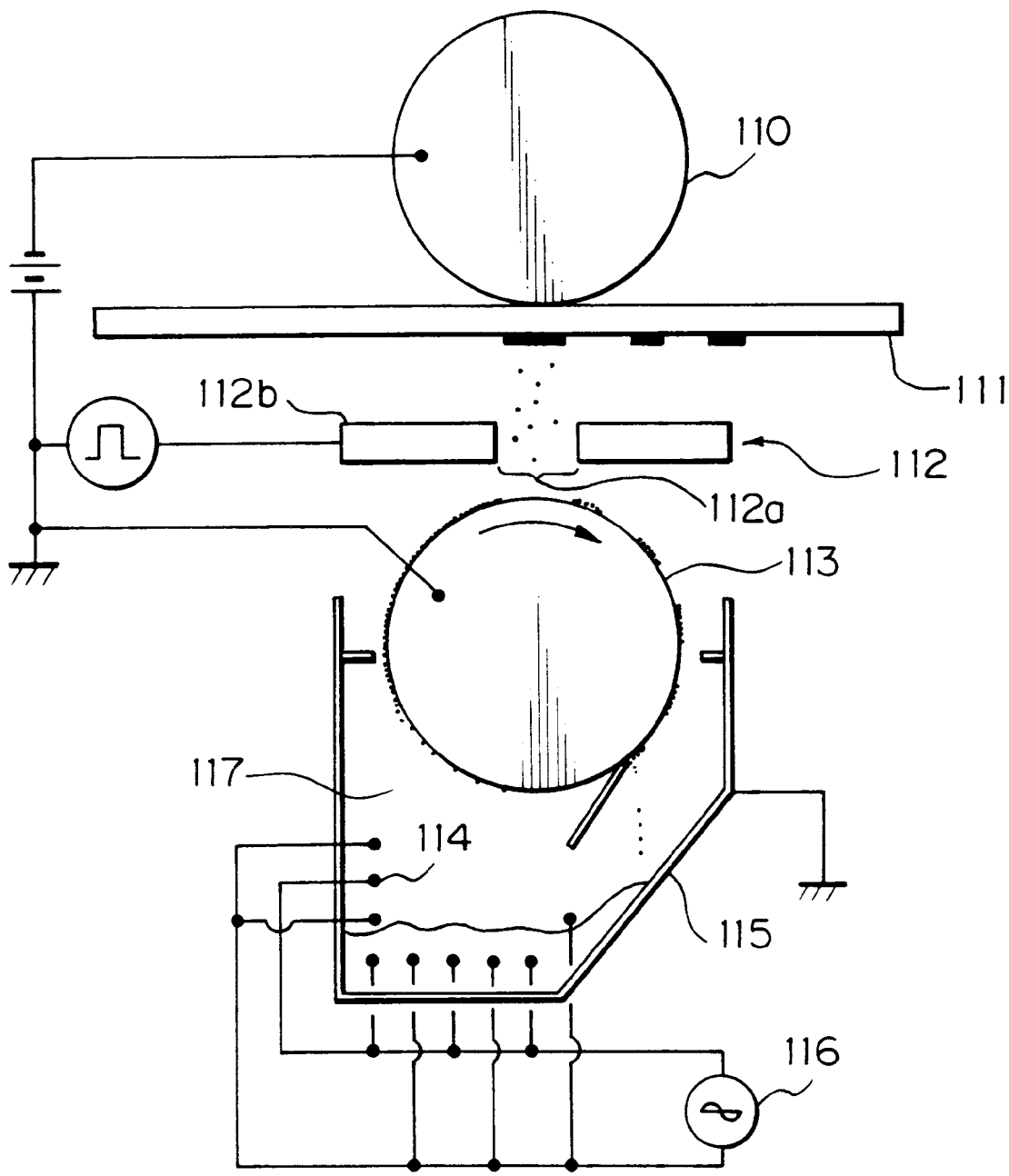
FIG. 3 is a section showing another conventional powder image recording apparatus.

FIG. 3 shows the apparatus disclosed in the above Publication No. 6-47298 specifically. As shown, the apparatus has a counter electrode 110, a sheet 111, a flight control member 112 and a conductive roller 113 sequentially arranged in this order. The flight control member 112 has a microhole 112a and a control electrode 112b for controlling the flight of the toner through the hole 112a. The conductive roller, or previously mentioned toner carrier, 113 is rotatably disposed in a conductive casing 115. Covered wires 114 are arranged on the bottom of the casing 115. An AC power source 116 applies an AC voltage to the wires 114 in order to induce charge on the roller 113. The charge causes the toner to fly in a sealed space 117, forming a cloud. The toner in the form of a cloud is electrostatically deposited on the surface of the roller 113 due to the mirror-image force of its own charge. However, the AC power source 116 for forming an AC electric field increases the cost of the apparatus. Further, to cause to toner to form a cloud, the apparatus must be increased in size and cost. In addition, because the toner deposition on the roller 113 simply relies on the mirror-image force of the charge, the toner is allowed to deposit on the roller 113 only when it approaches the roller 113 by chance. Therefore, the amount of toner deposition on the roller 113 for a unit time, i.e., the amount of toner supply is too small to implement high-speed operation.

Preferred embodiments of the present invention will be described hereinafter.

1st Embodiment

Figure 4:
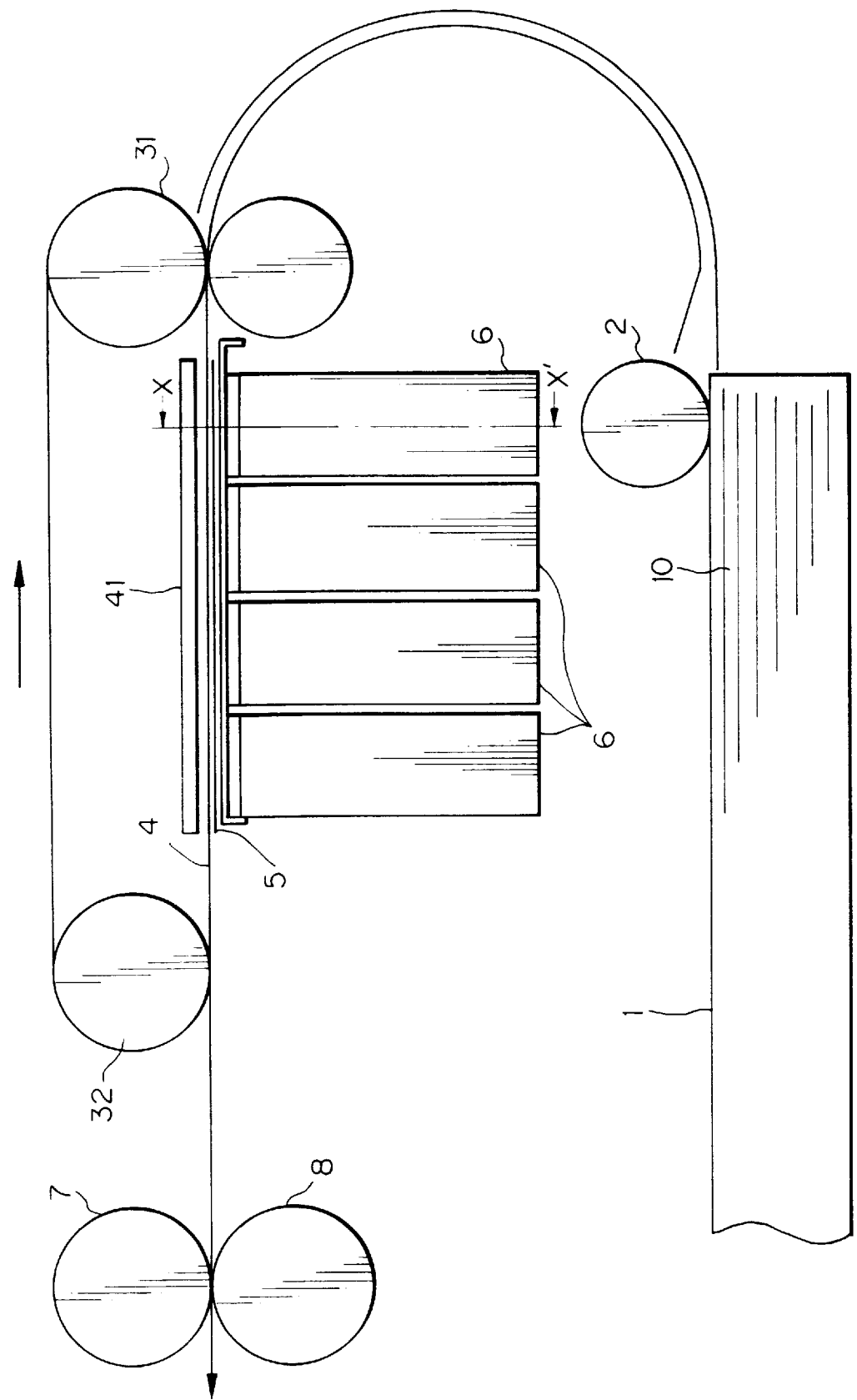
FIG. 4 is a front view showing a first embodiment of the powder image forming apparatus in accordance with the present invention.

Referring to FIGS. 4–10, a first embodiment of the present invention is shown and implemented as a color printer by way of example. As shown in FIG. 4, the color printer includes a cassette I loaded with a stack of sheets 10. A pick-up roller 2 feeds the uppermost sheet 10 from the cassette 1. A counter electrode 4 is implemented as a belt rotatable in the direction indicated by an arrow in FIG. 4. The counter electrode 4 is passed over support rollers 31 and 32 and provided with a sheet conveying function. The counter electrode 4 in rotation conveys the sheet 10 to a position above a flight control member 5. To provide the counter electrode 4 with the conveying function, it may be formed with a number of perforations and cooperate with a vacuum unit, not shown, as conventional. Four toner containers 6 are positioned below the control member 5, and each has an opening a its top. While the sheet 10 is conveyed above the control member 5 horizontally, conductive color toner is caused to fly from each toner container 6 under the control of the control member 5. As a result, the toners form a color image on the sheet 10. The counter electrode 4 is guided by a guide member 41. Voltage applying means, not shown, applies a voltage to the counter electrode 4 via the support roller 31 which is conductive. The toner containers 6 are assumed to store Y (yellow), M (magenta), C (cyan) and BK (black) toners, respectively. The toners deposited on the sheet 10 in layers are fixed by a heat roller 7 and a press roller 8 constituting a fixing device.

Figure 5:
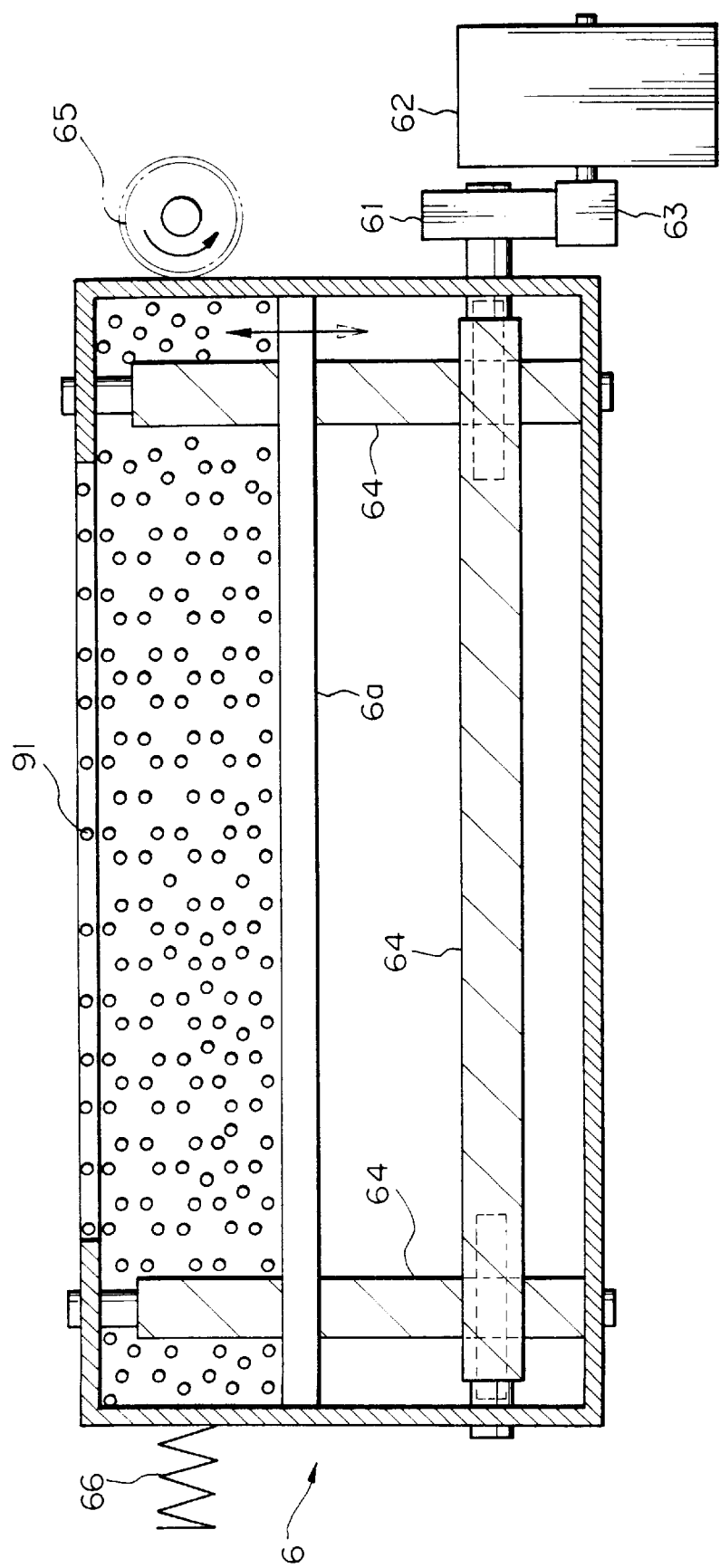
FIG. 5 is a section along line X–X' of FIG. 4.

FIG. 5 is a section of one of the toner containers 6 along line X–X' shown in FIG. 4. In FIG. 5, the counter electrode 4 and flight control member 5 are not shown. The container 6 is removably mounted to the printer. When the container 6 is mounted to the printer, a gear 61 mounted on the container 6 is brought into mesh with a gear 63 mounted on the output shaft of a motor 62. Conductive toner 91 is stored in the container 6 in the form of a layer. A toner carrier 6a is implemented as a flat plate of, e.g., plastics and elevatable to raise the toner 91. Screw shafts 64 move the toner carrier 6a up and down. A gear 65 and a spring 66 respectively play the role of a vibrator and an elastic body. The gear 65 has a toothed surface abutting against the outer surface of one side wall of the container 6. The spring 66 constantly biases the container 6 toward the gear 65. As the toner 91 is consumed, the screw shafts 64 are rotated to slightly raise the toner carrier 6a, i.e., the toner 91. At this instant, the gear 65 and spring 66 cooperate to cause the container 6 to vibrate only lightly, maintaining the surface of the toner layer horizontal at all times. The inner periphery of the container 6 is treated for electrical conduction. The toner layer is connected to ground via the gear and a side wall included in the apparatus body.

Figure 6:
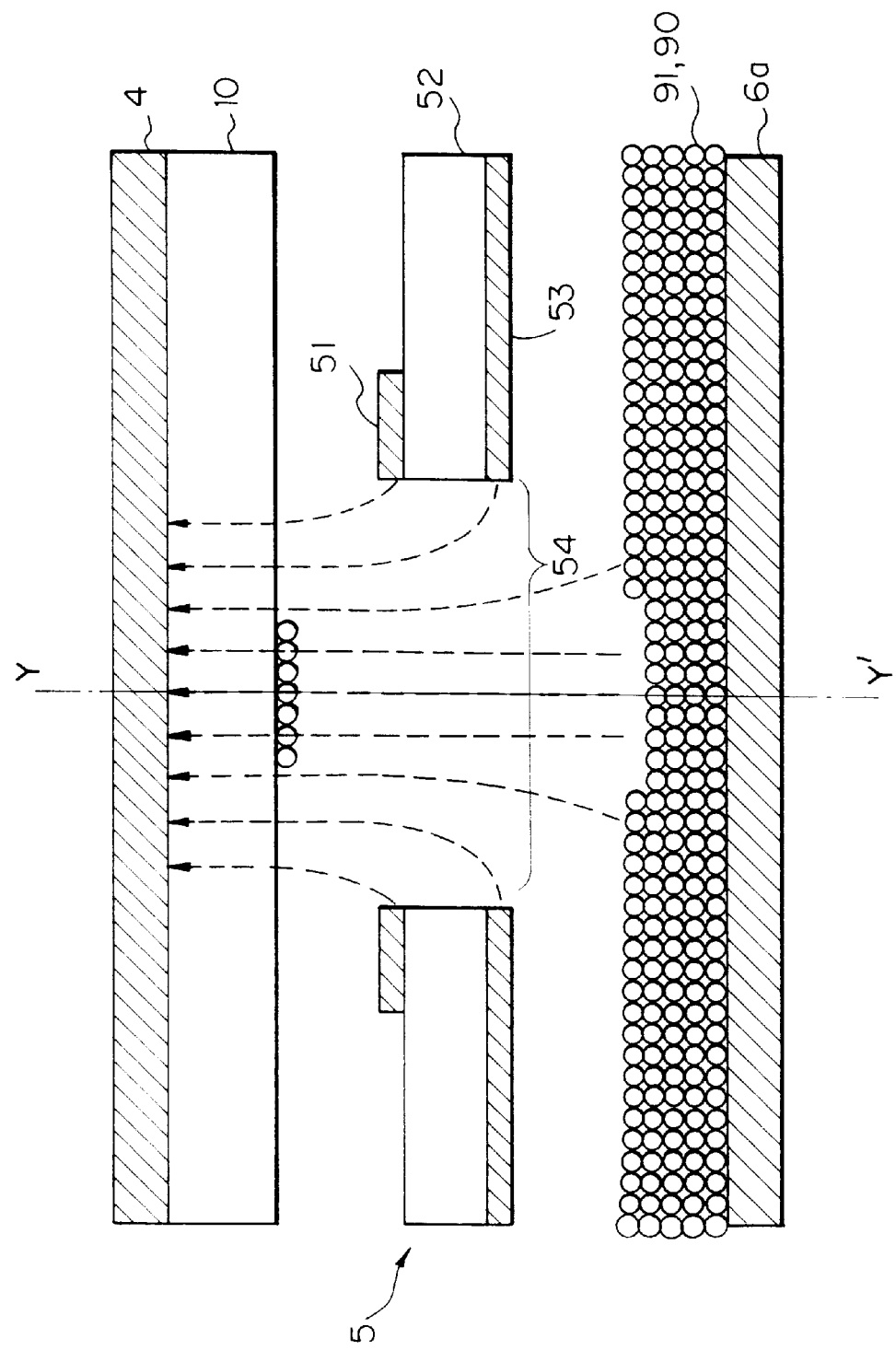
FIG. 6 is a section showing a recording section included in the first embodiment and assigned to one color.

FIG. 6 shows a recording section assigned to any one of the four colors and including the counter electrode 4, flight control member 5, and toner carrier 6a. The control member 5 applies an electric field to the toner 91 existing on the toner carrier 6a, controlling the flight of the toner 91. A specific procedure for forming the control member 5 consists of the steps of preparing a 75 $\mu$m thick polyimide film 52 which is an insulator, adhering 25 $\mu$m copper foil to both surfaces of the film 52, exposing the surface of each copper foil to an electrode pattern, etching the copper foil, and forming a microhole 54 at a preselected position by, e.g., YAG laser. The microhole 54 has a diameter of 150 $\mu$m. The copper foil facing the counter electrode 4 constitutes image electrodes 51 to which a voltage based on an image signal is applied. The other copper foil facing the toner carrier 6a constitutes shield electrodes 53 for preventing the toner 91 from flying in the portions other than the portion beneath the microhole 54.

The shield electrodes 53, like the toner carrier 6a, is connected to ground. This maintains, even when voltages for image formation are applied to the counter electrode 4 and image electrodes 51, the electric field acting on the toner in the portions other than the portion beneath the microhole 54 below a flight start electric field, thereby preventing the toner from flying. In the illustrative embodiment, the distance between the counter electrode 4 and the image electrodes 51 is 200$\mu$ while the distance between the shield electrodes 53 and the toner layer 91 is 100 $\mu$m. A constant voltage of, e.g., 400 V is applied to the counter electrode 4. A voltage for causing the toner 91 to fly is applied to the image electrodes 51 in accordance with an image signal. The voltage causes the electric field formed on the surface of the toner layer 91 to act on the charge of the toner 91. When the resulting electrostatic force exceeds the sum of the adhesion acting between the particles of the toner 91 or between the toner 91 and the toner carrier 6a (van der Waals's forces) and gravity, the toner 91 flies away from the layer 91 along the electric lines of force indicated by broken lines. As a result, the toner deposits on the sheet 10 and forms an image thereon.

When the toner carrier 6a is connected to ground and when voltages V1 of 120 V and 180 V are individually applied to the image electrodes 51, the electric field on the surface of the toner layer 9 varies as shown in FIG. 7. The variation was determined by simulation. Because the electric field is considered to be symmetrical in the right-and-left direction with respect to the center line Y–Y' of FIG. 6, the simulation was effected only with the left part of FIG. 6. In FIG. 7, the abscissa indicates the position on the surface of the toner layer 91; a graduation of 23.5 indicates a position just below the center of the microhole 54. The ordinate indicates the intensity of the electric field (field intensity hereinafter) on the surface of the toner layer 91. Because the field intensity is graduated in 10 $\mu$m, and because the toner particles have a diameter of 10 $\mu$m each, a single toner particle is assumed to correspond to a single graduation. In this sense, let the numbers attached to the graduations be referred to as particle numbers. Particles #17–23 are positioned beneath the microhole 54 while a particle #15 and successive particles are positioned below the shield electrodes 53. A solid curve and a dotted curve respectively show an electric field distribution observed when V1=180 V and a distribution observed when V1=120 V. Experiments showed that the flight start electric field of the toner is $3.8 \times 10^5$ V/m.

As FIG. 7 suggests, when the voltage V1 is 120 V, the electric field allowing the toner 91 to fly is not applied to the toner layer 91, so that no toner particles fly. On the other hand, when the voltage V1 is 180 V, the flight start electric field or more intense electric field is expected to act on the particles #20–23, i.e., over the range of about 40 $\mu$m from the center of the microhole 54. An experimental result shows that when the voltage V1 is 180 V, the particles lying in a circular region beneath the microhole 54 and having a diameter of about 80 $\mu$m fly; no particles fly when the voltage V1 is 120 V.

Figure 8A:
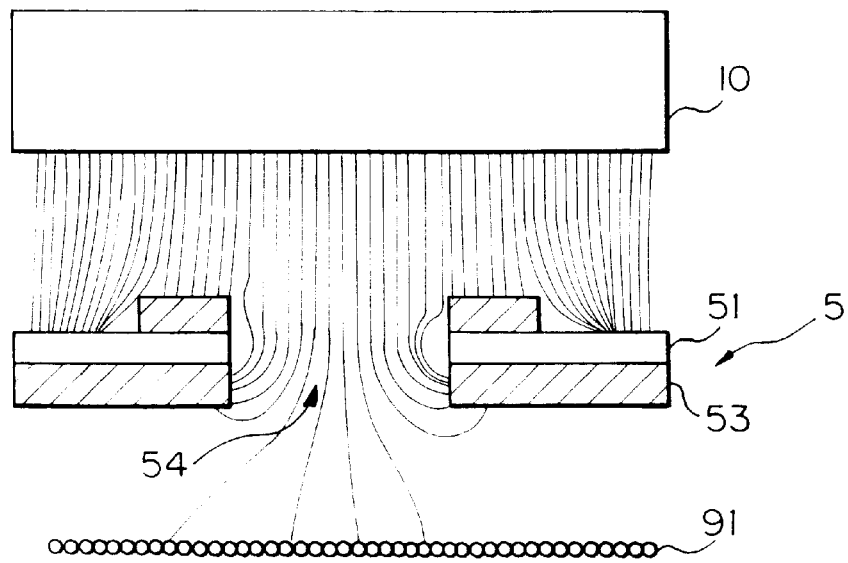
FIGS. 8A–8D show the result of simulation representative of the flight of toner in the recording section shown in FIG. 6.
Figure 8B:
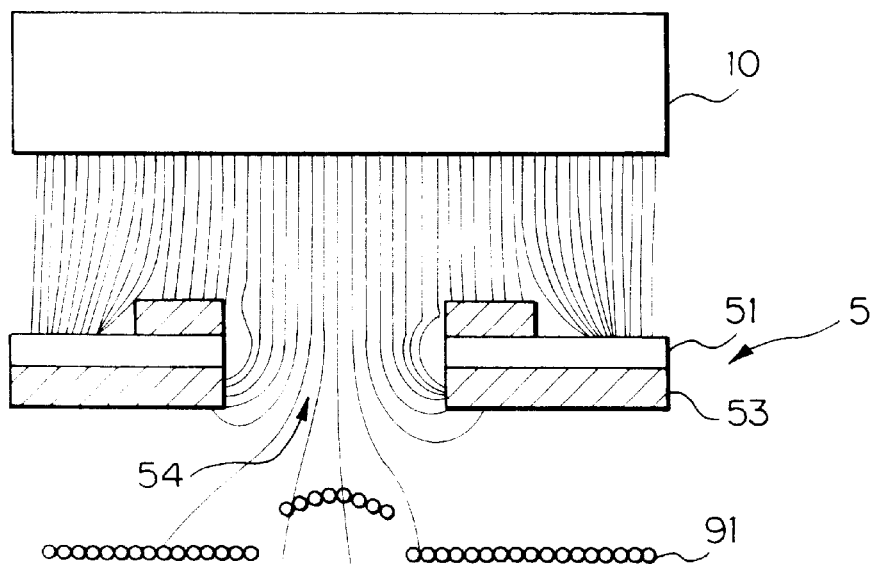
Figure 8C:
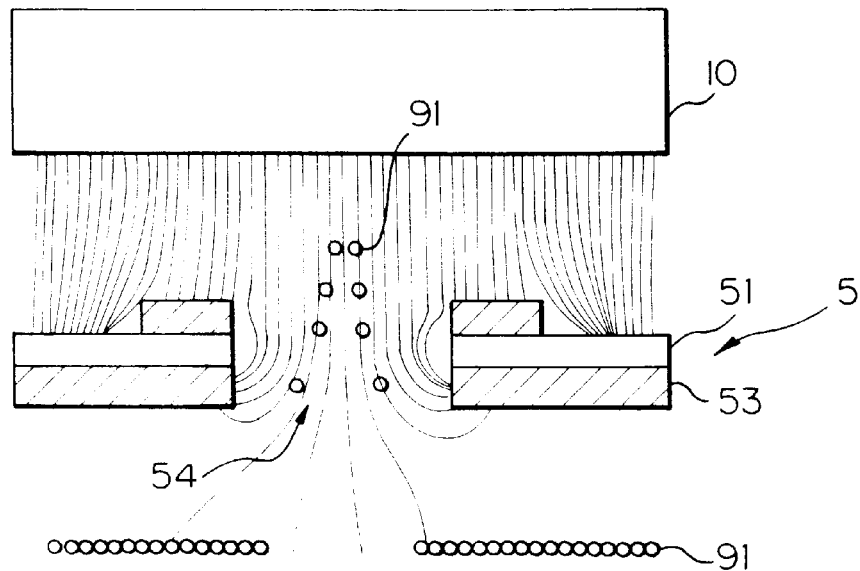
Figure 8D:
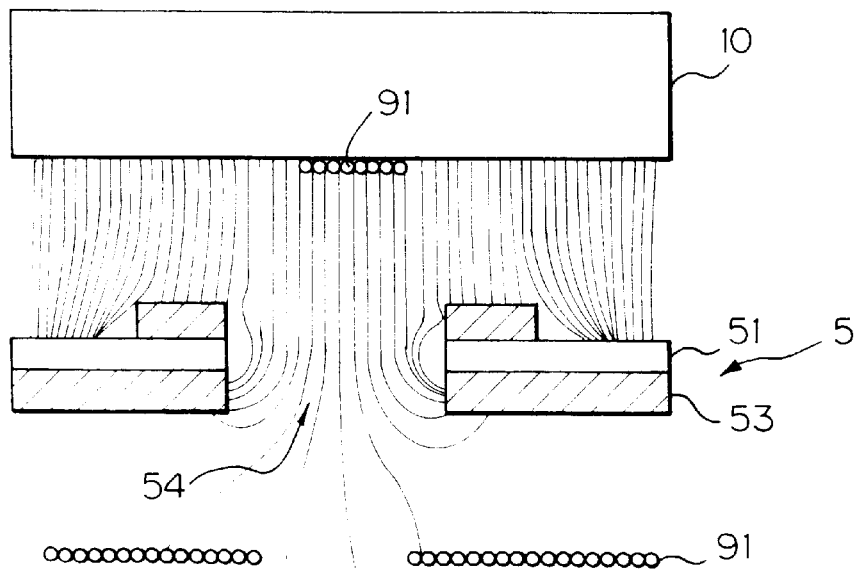

FIGS. 8A–8D show the result of simulation representative of the locus of the toner occurred when the voltage V1 of 120 V continuously applied to the image electrode 51 was sharply increased by 60 V, i.e., to 180 V. As shown in FIG. 8A, at the moment when the voltage V1 is raised from 120 V to 180 V, the charge of the toner 91 is not great enough to cause it to fly. As shown in FIG. 8B, 0.2 msec later, a charge great enough to cause the toner 91 to fly is deposited on the toner 91. As a result, eight toner particles lying in the range of 40 $\mu$m, as mentioned above, start flying away from the layer along the electric lines of force. As shown in FIG. 8C, 0.4 msec later, all the eight particles 91 pass through the microhole 54 of the control electrode 54 in a wedge-like configuration, the center particle heading the others. As shown in FIG. 8D, 0.6 msec later, the eight particles are deposited on the sheet 10 without exception. This simulation was performed by maintaining the voltage V1 at 180 V. Even if the voltage and therefor the field intensity is lowered after the start of the flight, the particles continue their flight although the arrival at the sheet 10 is slightly delayed. This is because gravity acting on the particles ($0.5 \times 10^{-10}$N in this case) is negligibly small, compared to the electrostatic force ($5 \times 10^{-10}$N in this case). Therefore, even if the voltage V1 is switched from 180 V to 120 V before the particles move away from the hole 54, the particles are prevented from smearing the inside of the apparatus or depositing on the shield electrodes 53 to result in the need for cleaning.

For the reasons described above, the embodiment applies 180 V to the image electrodes 51 for image formation or applies 120 V to the same for non-image formation. This makes it needless to delay the switching of the voltage of the image electrodes 51 until the particles 91 move away from the microholes 54 of the flight control member 5, thereby implementing high-speed operation. Moreover, the control member 5 can have its control electrodes driven in groups. For example, when the control electrodes are arranged in a transverse array and driven at the same time, an exclusive IC must be assigned to each control electrode. Assuming that an image is printed with a resolution of 600 dpi on an sheet of size A4 having a width of 210 mm and fed in a vertically long position, then 4,960 image electrodes must be driven. If an IC driver having thirty-two output terminals and capable of driving thirty-two electrodes 51 is used, then, 4,960/32=155 IC drivers are needed in total. In the case of a color printer, as many as 630 IC drivers are necessary due to the use of four different colors. By contrast, when eight image electrodes 51 are connected to one pin (output terminal) of an IC driver and driven in eight groups, the required number of IC drivers is reduced to one-eighth, i.e., seventy-eight. This also reduces the cost and the volume to be occupied to one-eighth.

Figure 9:
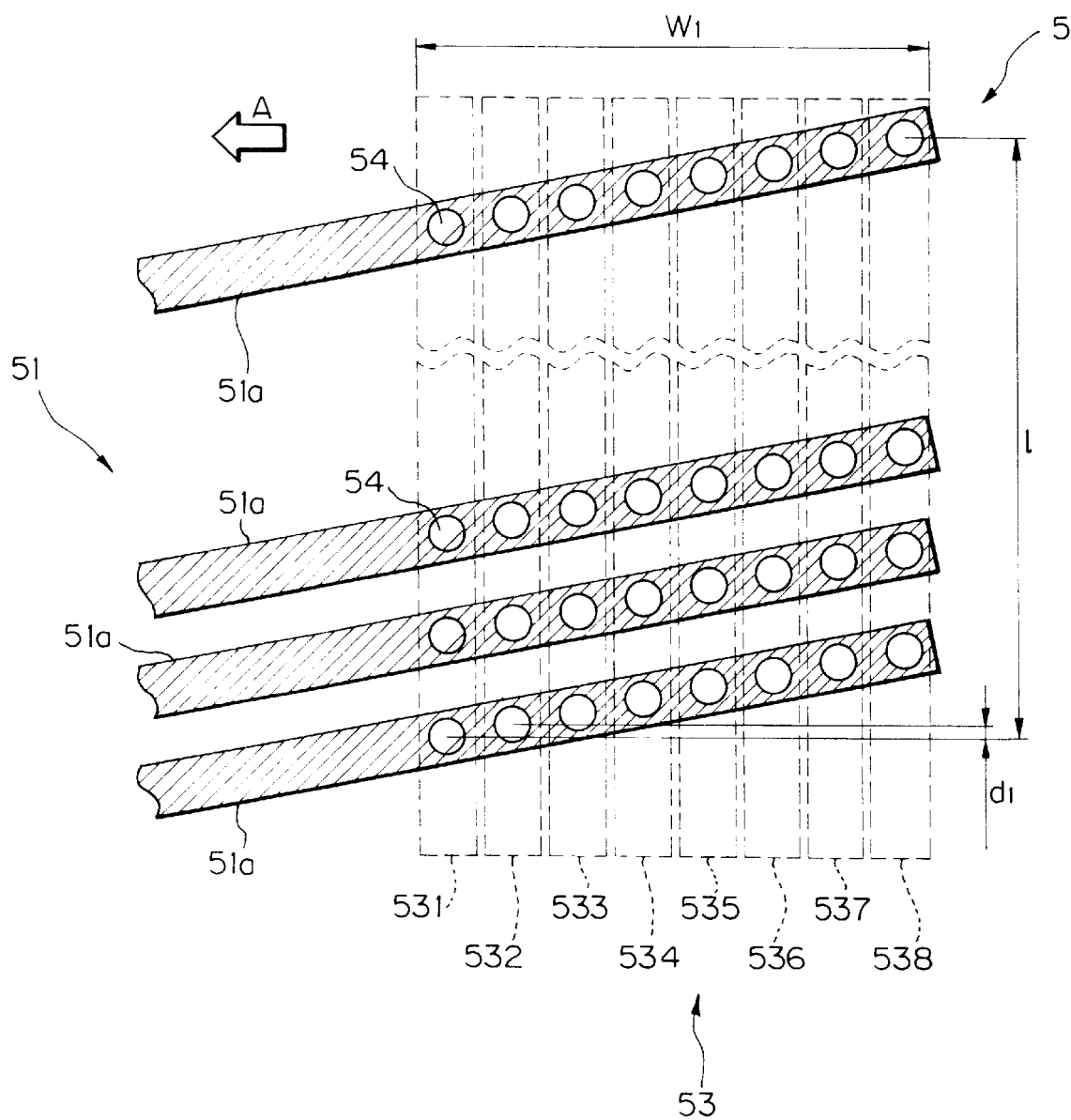
FIG. 9 is a plan view showing a control electrode array included in the first embodiment and assigned to one color.

The image electrodes 51 and shield electrodes 53 will be described more specifically. FIG. 9 shows a specific configuration of the image electrodes 51 and shield electrodes 53 assigned to one color. The specific configuration implements a resolution of 600 dpi by way of example. The image electrodes 51 on a single main scanning line are driven in eight groups in order to reduce the number of expensive IC drivers. In FIG. 9, the sheet 10 (not show) is conveyed in the right to left direction, as indicated by an outline arrow. Let this direction be referred to as the direction of sheet transport. As shown, the image electrodes 51 are implemented as a group of 620 common image electrodes 51a each of which is a single assembly of the image electrodes 51 corresponding to eight microholes 54. Each common image electrode 51a is inclined a predetermined angle relative to the direction of sheet transport, and the nearby electrodes 51a are so spaced as to prevent the centers of their microholes 54 from aligning in the direction of sheet transport. Specifically, the inclination angle and distance are selected such that the centers of the microholes 54 are arranged at a pitch d1 of 42.3 $\mu$m, corresponding to 600 dpi, in the direction perpendicular to the direction of sheet feed. Let the direction perpendicular to the direction of sheet feed be referred to as the widthwise direction of sheet. The 620 common image electrodes 51a have an overall dimension of 1.65 mm in the direction of sheet transport and a dimension of 210 mm in the widthwise direction of sheet which is identical with the width of a sheet of size A4.

Eight shield and group drive electrodes 531–538 are provided on the other side of the polyimide film 52 and play the role of the shield electrodes 53 at the same time. Even when a voltage for causing the toner to fly in accordance with an image signal (flight voltage hereinafter) is applied to the common image electrodes 51a, the shield and group drive electrodes 531–538 form electric fields for preventing the toner particles from passing through the microholes 54 of the common image electrodes 51a other than the microholes 54 to be driven. The electrodes 531–538 each has an array of 620 microholes extending perpendicular to the direction of sheet transport and aligning with the holes of the 620 common image electrodes 51a of the same order. For example, 620 holes of the most downstream electrode 531 in the direction of sheet transport respectively align with the most downstream holes of the 620 common image electrodes 51a in the same direction. The 620 electrodes and 8 electrodes 531–538 are connected to IC drivers.

The holes of the 620 common image electrodes 51a are sequentially provided with a drive state in arrays extending in the widthwise direction of sheet and respectively corresponding to the shield and group drive electrodes 531–538, e.g., in the order of the first array, second array and successive arrays as counted in the direction of sheet transport. More specifically, assume that the most upstream hole array with respect to the direction of sheet transport is to be provided with the drive state, i.e., the output of the IC drivers based on image information representative of dots corresponding to the most upstream hole array is to be applied to the common image electrodes 51a. Then, the most upstream shield and group drive electrode 538 is provided with a potential state forming an electric field for the passage of the toner in the holes of the electrodes 51a to which the flight voltage is applied in accordance with an image signal, but forming an electric field failing to cause the toner to fly in the other holes of the electrodes 51a to which a voltage for preventing the toner from flying (non-flight voltage hereinafter) is applied. This potential state will be referred to as a drive potential state hereinafter. At this instant, the other electrodes 531–537 are provided with a potential state forming an electric field, even in the holes of the electrodes 51a to which the flight voltage is applied in accordance with the image signal, failing to cause the toner beneath such holes to pass therethrough. This potential state will be referred to as a non-drive potential state hereinafter.

For example, assume that the specific dimensions and counter electrode voltage stated with reference to FIG. 6 are used, and that the flight voltage and non-flight voltage are 180 V and 120 V, respectively. Then, the voltage for providing the shield and group drive electrodes 531–538 with the drive voltage state and the voltage for providing them with the non-drive state are selected to be, e.g., −20 V and 0 V (ground), respectively. In this condition, assume that use is made of toner of low resistance whose flight start field intensity, which is the lower limit for toner flight, is $4.0 \times 10^5$ (V/m). Then, at positions beneath the microholes 54 where the holes of the common image electrodes 51 applied with the flight voltage and the holes of the shield electrodes 53 applied with the voltage for drive voltage state align each other, the field intensity acting on the toner layer exceeds the flight start field intensity and causes the toner to fly. As a result, the toner flies toward the counter electrode via the microholes 54 and deposits on the sheet 10.

On the other hand, the field intensity acting on the toner does not exceed the flight start field intensity, i.e., the toner does not fly at all at positions beneath the microholes 54 where the above combination of voltages are not available. These positions are the positions where the holes of the common image electrodes 51a applied with the non-flight voltage and the those of the shield and group drive electrodes 531–538 applied with the voltage for the drive voltage state align, and the positions where the holes of the electrodes 51 applied with the voltage for the non-drive voltage state and those of the electrodes 51 align (without regard to flight/non-flight voltage applied to the electrodes 51).

To provide the second hole array of the 620 common image electrodes 51a, as counted from the upstream side, with the drive state, the second shield and group drive electrode 537 in the above direction is provided with the drive potential state while the other electrodes 531–536 are provided with the non-drive potential state.

For example, by the above eight group drive, while the flight voltage is applied to all the common image electrodes 51a, the eight shield and group drive electrodes 531–538 are sequentially driven at intervals corresponding to a period of time necessary for the sheet 10 to move one pitch in the direction of sheet transport. As a result, a single line extending in the widthwise direction of sheet is recorded on the sheet 10.

Figure 10:
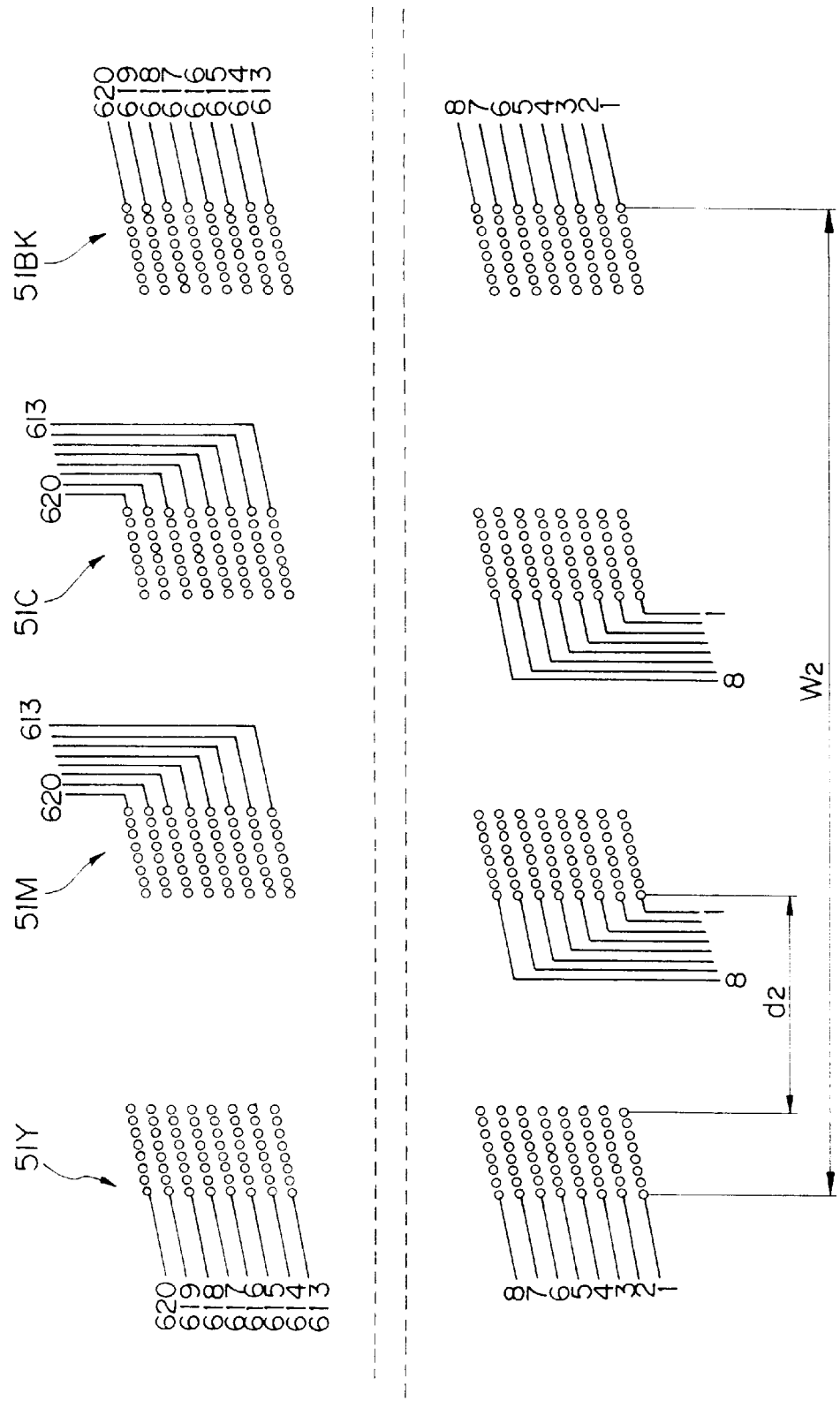
FIG. 10 is a plan view showing control electrode arrays also included in the first embodiment and respectively assigned to four different colors.

FIG. 10 shows control electrode arrays respectively assigned to the four colors of the above color printer. As shown, common image electrode groups 51Y, 51M, 51C and 51Bk each having 620 common image electrodes are respectively provided on the front of the control electrode arrays assigned to the different colors. Eight shield and group drive electrodes, not shown, are provided on the rear of each of the control electrode arrays. Numerals 1–620 attached to the leads are representative of the first to the 620th image electrodes. Assume that the potential of the image electrodes is 180 V at the time of recording or 120 V at the time of non-recording. Then, the maximum potential difference between the common image electrodes is 60 V which is small enough to prevent a leak current from flowing between nearby common image electrodes, so that the width of each lead and the distance between nearby leads can be as small as 30 μm. It follows that the pitch d2 between the colors and the overall width w2 can be respectively selected to be as small as 18.6 mm and 61.8 mm. Therefore, the common image electrode groups for the four colors can be formed on a single polyimide film at the same time by a single patterning. This insures extremely high accuracy as to the positions of the four common image electrode groups adjacent to each other; even the yellow electrode group 51Y and black electrode group 51bK spaced by the greatest distance can be provided with positional accuracy of less than 15 μm. Of course, the simultaneous patterning scheme is also applicable to the shield and group drive electrodes from which leads can be drawn out within the width of the electrodes. As a result, images of different colors can be held in accurate register.

Four groups of polystyrene resin balls having a diameter of 10 μm were prepared and respectively colored by the dispersion of cyan, magenta, yellow and black pigments. The balls were coated with a transparent polarity control substance of low resistance by a spray dry method to a thickness of 0.1 μm. Subsequently, the balls were covered with 1.5 wt % of fine silica ($SiO_2$) powder having a mean grain size of 0.1 μm. The resulting four toners of different colors each had a resistivity of as low as $10^4$ Ωcm.

The above toners of four colors were respectively stored in the toner containers 6 shown in FIG. 4. The counter electrode 4 sucking the plain paper 10 and applied with the constant voltage of 400 V was caused to rotate at a speed of 66 mm/sec in the direction indicated by an arrow. The eight shield and group drive electrodes 531–538 were sequentially driven. The image electrodes 51 continuously applied with the constant voltage of 120 V were additionally applied with a pulse voltage of 60 V from IC drivers, i.e., applied with 180 V for 0.082 msec. The resulting full-color printing had high definition and showed accurate register. The printing speed was as high as twelve printings per second. The group drive reduced the number of expensive IC drivers to one-eighth, saving the cost to a noticeable degree.

The eight group drive is only illustrative and may be replaced with any other suitable group drive. If the group drive scheme is not used, a printing speed eight times the above speed will be achieved, i.e., ninety-six printings can be produced for a minute.

While the embodiment causes the toner to directly deposit on the plain paper 10, the image components of different colors may be sequentially transferred to an intermediate transfer body or belt one above the other and then collectively transferred to the plain paper 10.

In the embodiment, the toner container 6 having the configuration shown in FIG. 5 is used. However, any other suitable configuration for the conveyance and supply of the toner may be used. In addition, even a method which conveys magnetic toner by a magnetic force is usable only if the cost and size of the apparatus are not questionable and if a weak uniform magnetic force is available.

While the toner has been shown and described as flying upward in the perpendicular direction, it may be caused to fly downward or even in the horizontal direction, if necessary.

The shield electrodes 53 are omissible, depending on the configuration of the electrodes and the sizes of the voltages. Further, the arrangement of the electrodes shown and described is only illustrative.

For the conductive toner 91, use may be made of rectifying toner chargeable only to the positive polarity or the negative polarity. For example, to produce rectifying toner chargeable only to the positive polarity, there may be used mother resin implemented as a copolymer of styrene, acryl monomer and cationic polymer represented by:

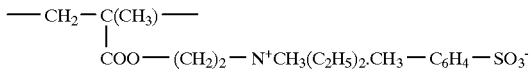

A coloring agent is dispersed in the above mother resin. Then, the resin is pulverized by a conventional method and covered with silica.

The rectifying toner produced by the above procedure is chargeable only to the positive polarity in the range of voltages of the color printer. Therefore, when such toner is used, voltages opposite to the voltages of the above embodiment are applied to the various electrodes.

The rectifying toner has the following advantages. Even when the resistance of the sheet 10 is low, charge opposite in polarity to desired charge is prevented from being injected into the toner deposited on the sheet 10. This prevents the toner from flying reversely from the sheet 10. Therefore, sufficient image density is achievable even in a hot and humid environment. Even when the toner is deposited on the sheet 10 in layers, the second and successive toner layers are prevented from being charged to the opposite polarity due to electrostatic induction and flying in the reverse direction. This allows toners of different colors to be deposited on the sheet 10 in layers in order to produce a full-color printing. Further, when an electric field causing the toner to fly only in one direction is applied, the toner is prevented from flying reversely by being charged to the opposite polarity. This obviates an occurrence that toner flying toward the recording medium and toner flying reversely from the medium undergo elastic collision. The elastic collision would cause the toner to be scattered around a desired image on the sheet 10, blurring the boundary between the image and the background.

As stated above, in the illustrative embodiment, even when an image is not formed, an electric field is continuously formed which generates an electrostatic force for causing toner left a toner carrier to fly, but preventing new toner from flying away from the toner carrier. Therefore, even if control electrodes are switched to the voltage state assigned to non-image formation when the toner has left the toner carrier due to a voltage for image formation, the toner is prevented from floating and contaminating the inside of the apparatus or from depositing on the control electrodes to result in the need for cleaning. This promotes high-speed printing. In addition, group drive reduces the cost of the apparatus.

2nd Embodiment

A color printer representative of a second embodiment will be described with reference to FIGS. 11–16. Because the above description of the first embodiment made with reference to FIGS. 4, 6, 9 and 10 also applies to this embodiment, it will not be repeated in order to avoid redundancy. The color printer to be described uses rectifying toner 90 in place of the conductive toner 91. For the rectifying toner 90, use is made of mother resin in the form of a copolymer of styrene, acryl monomer and cationic polymer represented by the formula shown previously in the first embodiment. After a coloring agent has been dispersed in the above mother resin, the resin is pulverized and then covered with silica, as stated earlier.

The characteristic of the toner 90 produced by the above procedure was measured, as follows. For the measurement, as shown in FIG. 11, the toner particles 90 were set in a recess formed in the toner carrier 6a. The recess had a diameter of 10 mm and a depth of 1 mm. The counter electrode 4 carrying an insulating film 41 on its surface facing the toner carrier 6a is spaced above the toner carrier 6a by a distance of 1 mm.

First, the toner carrier 6a is connected to ground, and then a preselected voltage is applied to the counter electrode 4 for 1 second. Subsequently, the mass of the toner flown toward and deposited on the insulating film 41 (amount of toner flight hereinafter) was measured by a device heretofore used to measure toner in electrophotography. For comparison, the same measurement was effected with conductive toner RIFAX 9000 (trade name) available from Ricoh and which is conductive toner. The results of measurement are shown in FIG. 12.

Figure 13:
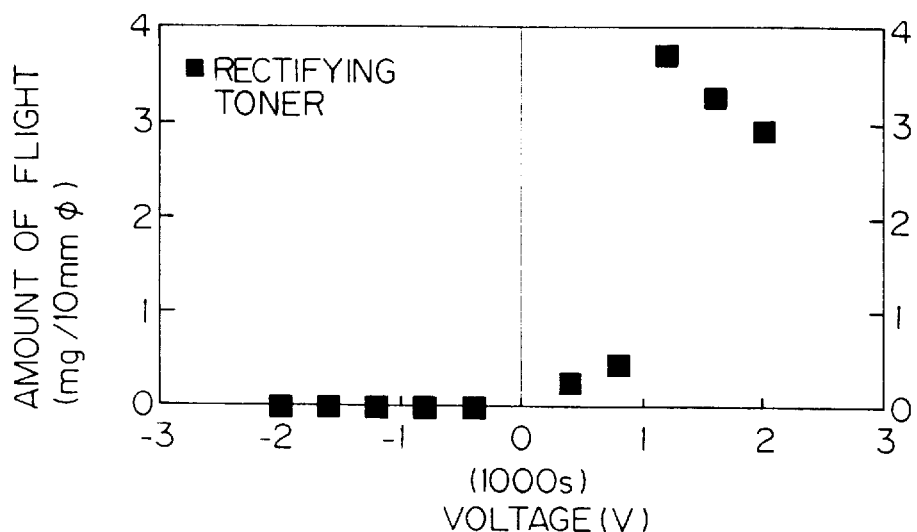
FIG. 13 shows a relation between the amount of flight of toner and the voltage applied to a toner carrier, as also measured by the device shown in FIG. 11.

As FIG. 12 indicates, the conductive toner 91 flies without regard to the polarity of the voltage while the rectifying toner 90 flies only when a negative voltage is applied. The toner 90 does not fly at all even when a voltage as high as 2,000 V is applied so long as its polarity is negative. Next, the amount of toner flight was measured by connecting the counter electrode 4 to ground and applying a voltage to the toner carrier 6a. The result of this measurement is shown in FIG. 13. As shown, the toner 90 flies only when a positive voltage is applied; it does not fly at all even when a voltage of −2,000 V is applied.

It will be seen from the above that the rectifying toner 90 is chargeable to the positive polarity due to charge injection as easily as the conductive toner, but not to the negative polarity. This shows that the toner 90 has a noticeable rectifying characteristic for the following presumable reason. In the previous formula, positive ions are firmly caught by the main chain and cannot migrate, but negative ions can freely migrate. Therefore, when a negative voltage is applied to the counter electrode 4 in order to form an electric field, only the negative ions migrate and flow out of the toner with the result that the toner is charged to the positive polarity by the positive ions. When the opposite electric field is formed, electrons are prevented from penetrating into the toner with the result that the toner is not charged to the negative polarity.

Figure 14:
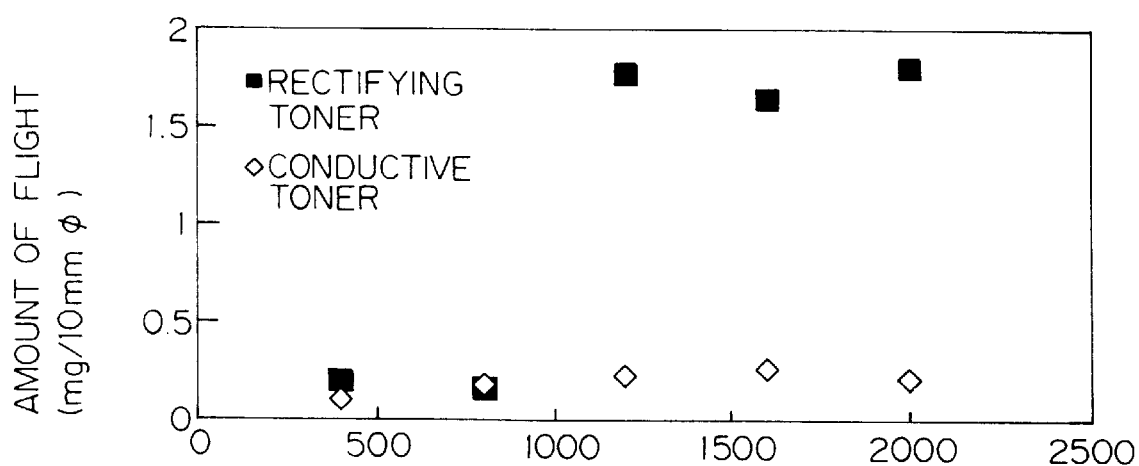
FIG. 14 shows a relation between the amount of flight of toner and the voltage applied to the counter electrode, as measured by the device shown in FIG. 11 with an insulating film removed.
Figures 15A, 15B, 15C:
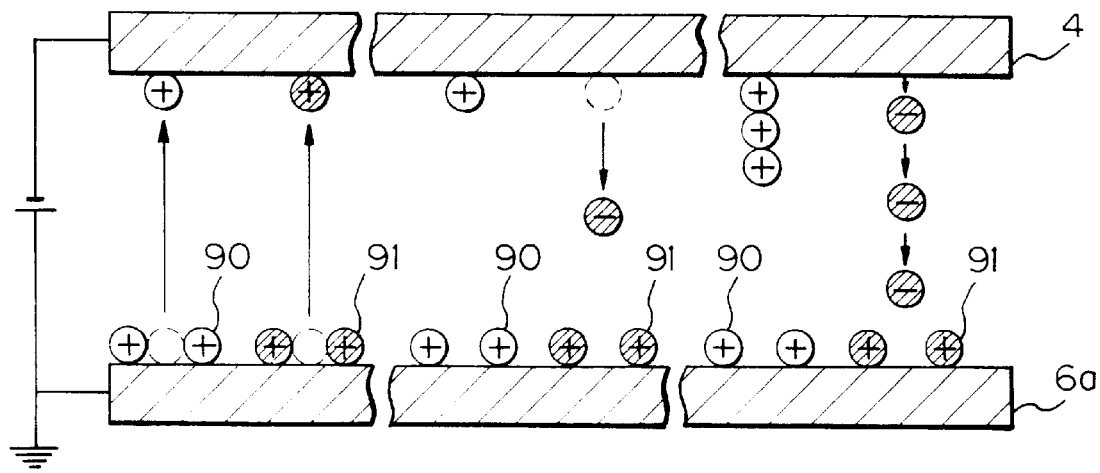
FIG. 15 shows the flight of the rectifying toner and that of conductive toner.

Also, the amount of toner flight was measured by peeling off the insulating film 41 of the counter electrode 4 and causing the rectifying toner 90 to fly in the same manner as the conductive toner 91. The result of measurement is shown in FIG. 14. As shown, when the conductive toner 91 was used, substantially no particles were left on the counter electrode 4. As for the rectifying toner 90, particles were left on the counter electrode 4 in substantially the same amount as when the insulating film 41 was present on the electrode 4. This is accounted for by the following occurrence. As shown in FIG. 15A, both the conductive toner 91 and the rectifying toner 90 fly due to the positive charge. However, as shown in FIG. 15B, when the conductive toner 91 deposits on the counter electrode 4, a negative charge is injected into the toner 91 and causes it to fly in the reverse direction. By contrast, the rectifying toner 90 remains positive and does not fly in the reverse direction because a negative charge is not injected thereinto. It may therefore be said that when a recording member of low resistance is positioned at the counter electrode 4 side, the toner 91 cannot record, but the toner 90 can record.

Figure 16:
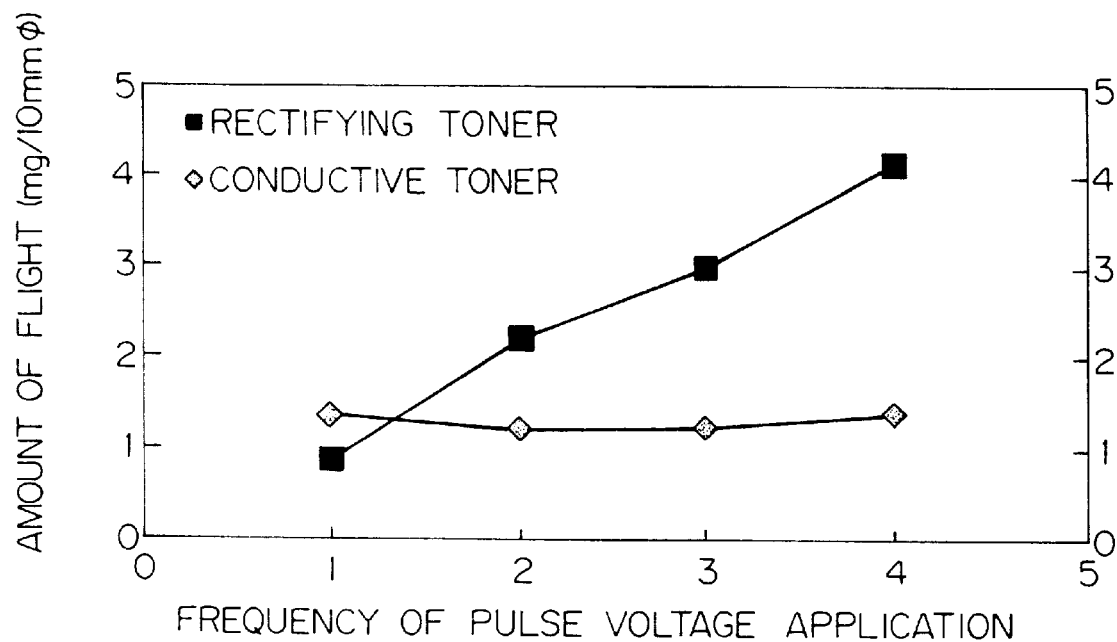
FIG. 16 shows a relation between the amount of flight of toner and a pulse voltage applied to the counter electrode, as measured by the device shown in FIG. 11.

A pulse voltage was applied four consecutive times to the counter electrode 4 in order to cause the toner to fly four consecutive times, 1 mg each time. This was executed with each of the rectifying toner 90 and conductive toner 91. FIG. 16 shows the amounts of toner flight measured in such conditions. As shown, as for the toner 91, the amount of flight remains substantially constant without regard to how many times the pulse voltage is applied. On the other hand, as for the toner 90, the amount of toner flight increases in proportion to the number of times of application of the pulse voltage. Even when the toner 91 is used, a sufficient amount of toner flies every time the pulse voltage is applied, as determined by experiments. Presumably, therefore, as shown in FIG. 15C, the second and successive layers of the toner 91 once flown fly in the reverse direction, but the second and successive layers of the toner 90 remain on the counter electrode 4 without flying in the reverse direction. It may therefore be said that the toner 90 can deposit on the counter electrode 4 in layers.

When the color printer of the embodiment is loaded with a rectifying toner chargeable only to the positive polarity, the printer operates, as follows. Referring to FIG. 6, the toner carrier 6a and shield electrode 53 are connected to ground, and a constant voltage of, e.g., −400 V is applied to the counter electrode 4. Also, a constant voltage of, e.g., −120 V is applied to the image electrode 51. To form an image on the sheet 10, an IC driver, not shown, applies an image signal or pulse voltage of, e.g., −60 V. As a result, the image electrode 51 is applied with a voltage of −180 V, i.e., −120+−60=−180. An electric field formed on the surface of the toner layer induces a positive charge on the rectifying toner 90. The above electric field acts on the charge with the result that an electrostatic force directed toward the counter electrode 5 acts on the toner 90. When this electrostatic force exceeds the sum of the adhesion acting between the toner particles or between the toner and the toner carrier 61 (van der Waals's forces), the toner flies away from the layer along the electric lines of force and deposit on the sheet 10.

In this embodiment, even if the sheet 10 has a low resistance, a negative charge is not injected into the toner 90 deposited on the sheet 10, so that the toner 90 is free from negative charge. Consequently, an electrostatic force tending to cause the toner 90 to return to the toner carrier 6a does not act. It follows that the toner 90 can record an image even on the sheet 10 of low resistance. For experiment, the sheet 10 was implemented by aluminum foil or similar conductor, or plain paper left in a 30° C., 90% RH hot and humid atmosphere for 4 hours. The toner 90 successfully printed a high density image even on such a substitute when a voltage of −100 V and a voltage of −180 V were applied to the counter electrode 4 and image electrode, respectively.

In a full-color print mode, the above operation is repeated four times with yellow toner, magenta toner, cyan toner and black toner. In this case, after the deposition of the second toner layer, it is prevented from being negatively charged by electrostatic induction. This is also true with the third and successive toner layers. The toner can therefore be deposited in consecutive layers. A full-color print is achievable if the counter electrode or belt 4 is moved at a speed of 66 mm/sec, and if a pulse voltage of −60 V is applied from an IC driver to the image electrode 51 in accordance with the image signal.

Further, because the toner is prevented from flying in the reverse direction, the elastic collision of the toner flying toward the counter electrode 4 and the toner flying in the reverse direction is obviated. This prevents the toner from being scattered around an image on the sheet 10.

While the above embodiment has concentrated on the rectifying toner chargeable to the positive polarity, it is practicable only if the rectifying toner is chargeable either to the positive polarity or to the negative polarity by an electric field available within the range of voltages for use in a powder recording apparatus.

As stated above, in the illustrative embodiment, the rectifying toner is chargeable only to the positive polarity or the negative polarity. Therefore, even when the resistance of a paper or similar recording medium deceases due to a hot and humid environment, there can be eliminated an occurrence that a charge of opposite polarity is injected into the toner deposited on the paper and causes the toner to be charged to the polarity opposite to the desired polarity. The toner therefore does not fly in the reverse direction and can record an image even on a recording medium of low resistance. Also, the second and third toner layers laminated on the recording medium are prevented from charged to the opposite polarity and flying in the reverse direction. This allows an attractive full-color print to be produced by laminating toners of different colors.

3rd Embodiment

A color printer representative of a third embodiment of the present invention will be described. Because the description of the first embodiment made with reference to FIGS. 4, 6, 9 and 10 also applies to this embodiment, it will not be repeated in order to avoid redundancy. In this embodiment, to produce the flight control member 5 shown in FIG. 6, 8 $\mu$m thick copper foil is adhered to both surfaces of the 25 $\mu$m thick polyimide film 52 which is an insulator. After the surface of each copper foil has been exposed to an electrode pattern, it is etched. Subsequently, the film 52 is formed with the microholes 54 having a diameter of 500 $\mu$m by, e.g. a YAG laser. Assume that the distance between the counter electrode 4 and the image electrodes 51 is 300 $\mu$m that the distance between the shield electrodes 53 and the surface of the conductive toner layer 90 is 300 $\mu$m, that a voltage of +50 V is applied to the counter electrode 4, and that a flight voltage of +140 V and a non-flight voltage of 0 V (i.e. ground) are applied to the common image electrodes 51a, FIG. 9. Then, a voltage of, e.g., +80 V and a voltage of 0 V (i.e. ground) are applied to the shield and group drive electrode 538 for setting up the drive voltage state and non-drive voltage state, respectively. In this condition, assume that the toner has low or medium resistance (e.g. medium toner whose conductivity is $10^{-8+3}$ S/cm) needing a flight start electric field strength, which is the lower limit, of $4.0 \times 10^5$ V/m. Then, just below the microhole 54 where the hole of the common image electrode 521 applied with the flight voltage and that of the shield electrode 53 applied with the voltage for the drive voltage stage align, the field intensity acting on the toner layer exceeds the flight start field intensity and causes the toner to fly to the sheet via the microhole 54.

Further, as for the voltage of the drive potential state to be applied to the shield and group drive electrodes 531–538, FIG. 9, there is applied a voltage (+80 V) related in size to the potential (0 V) applied to the toner carrier 6*a* in the same manner as the potential (+140 V) of the common image electrodes 5*a* applied with the flight voltage is related to the potential (0 V) applied to the toner carrier 6*a*. The shield and group drive electrodes 531–538 also form electric fields for causing the toner layer beneath the microholes 54 to fly.

Therefore, by applying a voltage of the same potential as the toner carrier 6*a* (0 V) as a voltage for the drive potential state to be applied to the electrodes 531–538, it is possible to reduce the size of the flight voltage, compared to the case wherein the electric field for causing the toner beneath the microholes 54 to fly is formed only by the flight voltage applied to the electrodes 5*a*.

Figure 17A:
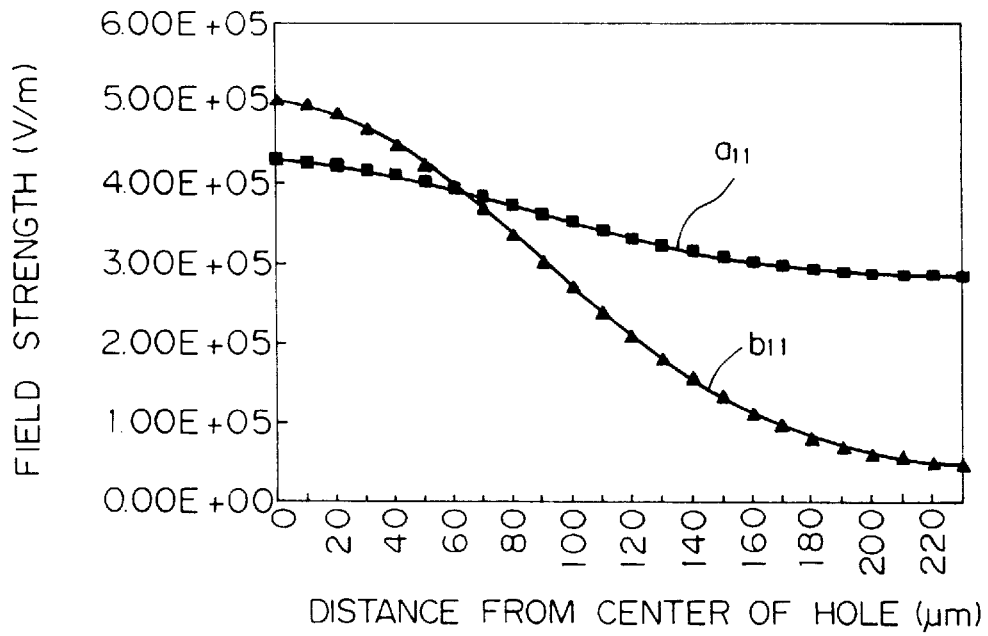
FIGS. 17A and 17B show the results of simulation representative of the intensity of an electric field around the individual control electrode included in a third embodiment of the present invention.

For example, assume that the specific dimensions shown in FIG. 6 hold, and that a voltage of +500 V is applied to the counter electrode 4. Also, assume any one of the microholes 54 where the common image electrode applied with the flight voltage of 140 V and the shield and group drive electrode applied with the voltage of +80 V for the drive potential state intersect. In FIG. 17A, a curve all shows an electric field to act on the surface of the toner layer under the above conditions, as determined by simulation using a finite element method. In FIG. 17A, the abscissa indicates the distance as measured from a position beneath the center of the microhole 54 while the ordinate indicates the field intensity.

Assume that the specific dimensions shown in FIG. 6 hold, and that a voltage of +900 V is applied to the counter electrode 4. Also, assume the microhole 54 where the common image electrode 51*a* applied with a flight voltage of +300 V and the shield and any one of the group drive electrode 531–538 applied with 0 V for the drive potential stage and identical with the potential of the toner carrier 6*a*. In FIG. 17A, a curve b11 shows the result of simulation effected to determine an electric field under the above conditions. It is to be noted that when the potential for the drive potential state is 0 V by way of example, the above counter electrode voltage and flight voltage are the voltages necessary for the toner to fly on the basis of the duration of the flight voltage shorter than 1 msec. Even with the condition represented by the curve all and in which the flight voltage applied to the common image electrode 51 is relatively low, a field intensity higher than the flight start field intensity above $4.0 \times 10^5$ V/m is achievable in the range of 60 $\mu$m as measured from the position beneath the center, as with the condition represented by the curve b11. Therefore, in any one of such condition, toner particles lying in the above range can fly. As stated above, the flight voltage necessary for the toner to fly can be lowered. This allows the IC drivers to drive the electrodes at relatively high speed.

Figure 17B:
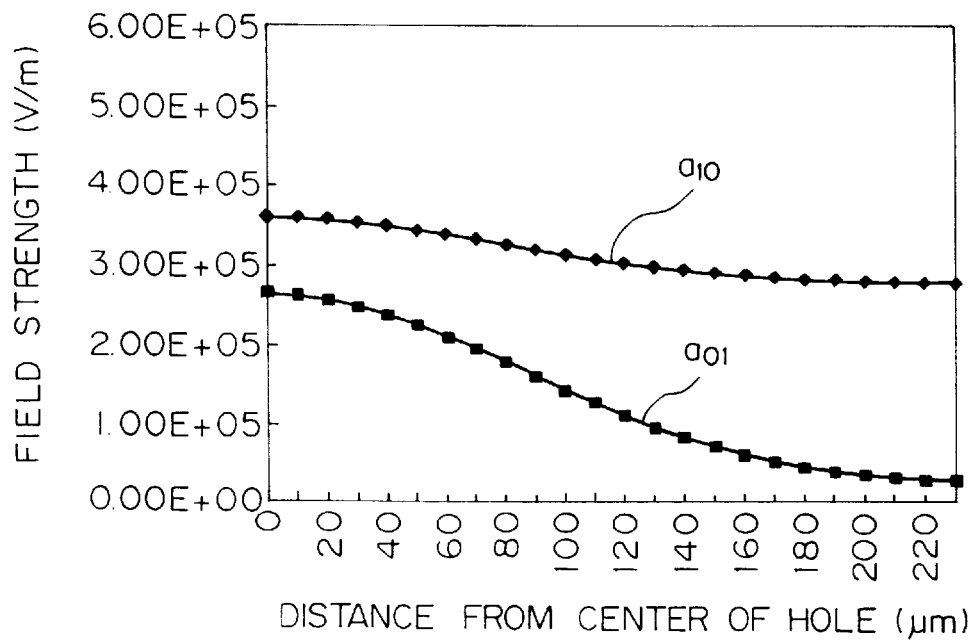

Further, assume that the specific dimensions shown in FIG. 6 hold, and that a voltage of +500 V is applied to the counter electrode 4. Also, assume any one of the microholes 54 where the common image electrode 51*a* applied with a toner flight voltage of +140 V and any one of the shield and group drive electrodes 531–538 applied with 0 V for the nondrive potential state intersect. In FIG. 17B, a curve a10 shows the result of simulation effected to determine an electric field under the above conditions. Moreover, assume that the specific dimensions shown in FIG. 6 hold, and that a voltage of +500 V is applied to the counter electrode 4. Also, assume the opening 54 where the common image electrode 51*a* applied with the non-flight voltage of 0 V and any one of the shield and group drive 531–538 applied with a voltage of +80 V for the drive potential state. In FIG. 17B, a curve a10 shows the result of simulation effected to determine an electric field under the above conditions. As shown, in these cases, a field intensity exceeding the flight start field intensity of $4.0 \times 10^5$ V/m is not achievable, so that the toner does not fly.

The above embodiment applies 0 V setting up the same potential as that of the toner carrier 61 is applied to the common image electrode 51*a* as the non-flight voltage. Alternatively, there may be applied to the electrode 51*a* a voltage opposite in polarity to the voltage applied to the shield and group drive electrodes 531–538 for setting up the drive potential state. This successfully reduces the field intensity acting on the toner layer beneath the microholes 54 where the common image electrodes 51*a* applied with the non-flight voltage and the electrodes 531–538 provided with drive potential state intersect each other.

As stated above, this embodiment has the following advantages.

(1) Circuitry for a flight control member to control control electrodes is simplified.

(2) Voltages responsive to an image signal are of relatively small size, so that simple drive circuitry can drive the control electrodes at high speed.

(3) Toner particles other than those adjoining microholes are prevented from flying and depositing on the surface of the flight control member facing the toner carrier, and stopping the opening.

4th Embodiment

Referring to FIGS. 18–24, a color printer representative of a fourth embodiment of the present invention will be described. Because the description of the first embodiment made with reference to 6, 9 and 10 also applies to this embodiment, it will not be repeated in order to avoid redundancy. As shown in FIG. 18, the color printer differs from the color printer of FIG. 4 in that it has seven toner containers 6. Specifically, three toner containers 6 from the right store Y, M and C toner, respectively, while the other four toner containers 6 store BK toner. The toner containers 6 are each treated for electrical conduction and connected to ground.

Figure 19:
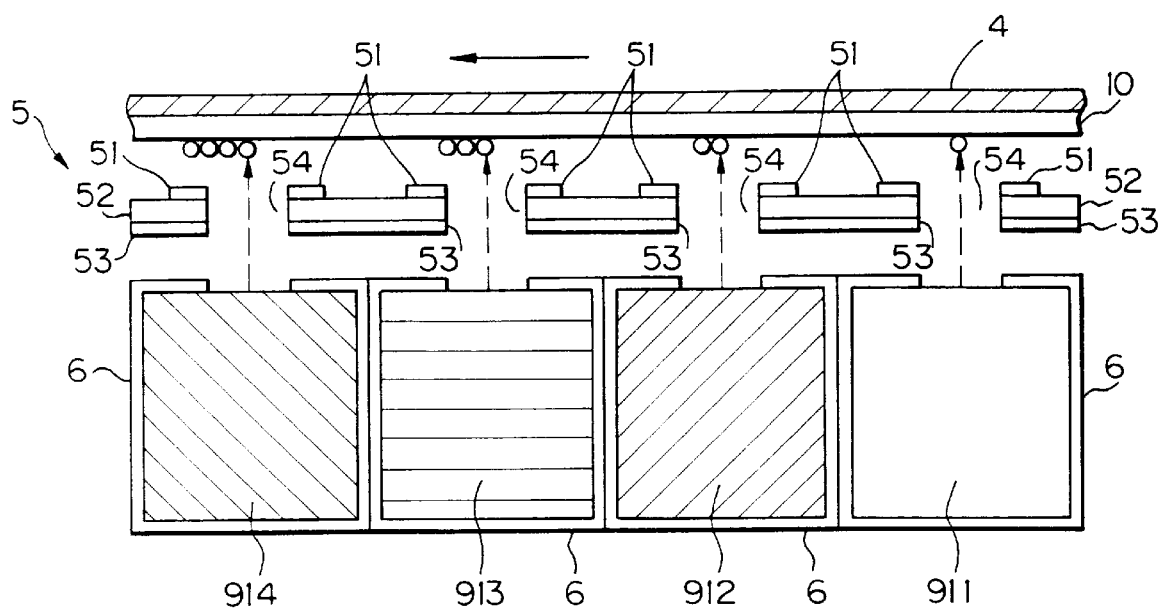
FIG. 19 is a section of recording sections included in the fourth embodiment and respectively assigned to four colors.

As shown in FIG. 19, the four toner containers 6 store yellow toner 911, magenta toner 912, cyan toner 913, and black toner 914, respectively. While the counter electrode or belt 4 moves in the direction indicated by an arrow while sucking the sheet 10, the yellow, magenta, cyan and black toner sequentially fly from the toner containers 6 to a preselected position on the sheet 10, each in a preselected amount. As a result, a color image is formed on the sheet 10.

Figure 20:
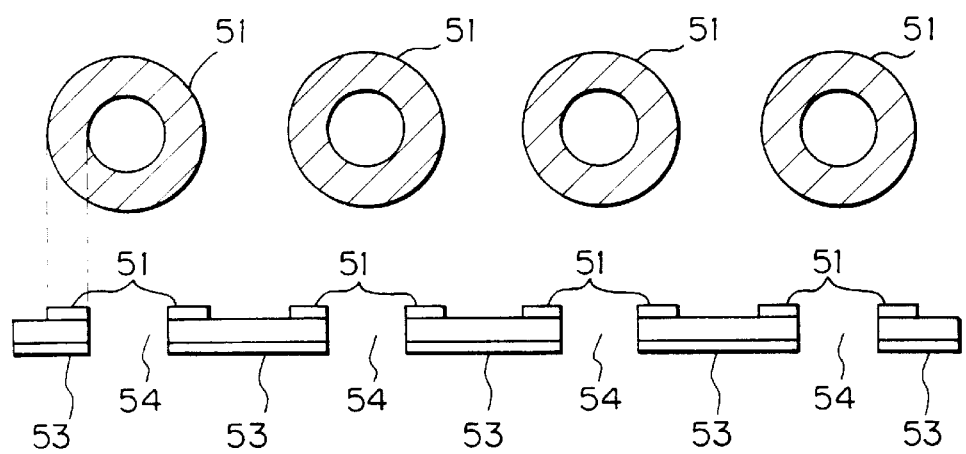
FIG. 20 is a section showing image electrodes included in the fourth embodiment.

As shown in FIG. 20, each flight control member 5 has the image electrodes 51 each surrounding a particular microhole 54. The image electrodes 51 each applies an electric field to the respective microhole 54 in order to cause the toner to fly.

To drive the image electrodes 51 during recording, use is made of IC drivers. However, allocating an exclusive IC driver to each image electrode 51 increases the overall cost of the printer. The illustrative embodiment reduces the number of IC drivers by a time division drive scheme.

In the illustrative embodiment, the seven toner containers 6 are easily slidable such that the toner containers 6 facing the control electrodes 5 are replaceable. For example, in a color mode, the toner containers 6 storing the yellow, magenta, cyan and black toner are respectively located to face the control electrodes 5, as indicated by solid lines in FIG. 18. In a black-and-white monocolor mode, a pulse motor, not shown, causes the toner containers 6 to slide to positions indicated by dash-and-dots lines in FIG. 18. As a result, four black toner containers 6 face the control electrodes 5. In the arrangement shown in FIG. 18, the toner containers 6 should only slide 66 mm in about 2 sec, and therefore can be slowly fixed at accurate positions.

Figure 21:
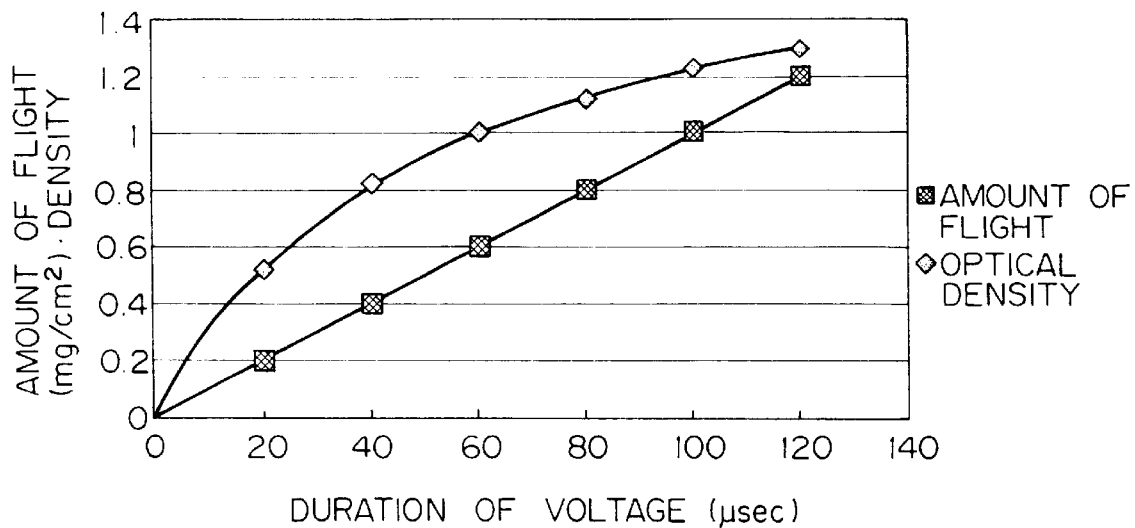
FIG. 21 shows computed variations in the amount of toner deposition on a recording medium for a unit area and optical density with respect to the duration of a pulse voltage applied to the image electrodes of the fourth embodiment.
Figure 22:
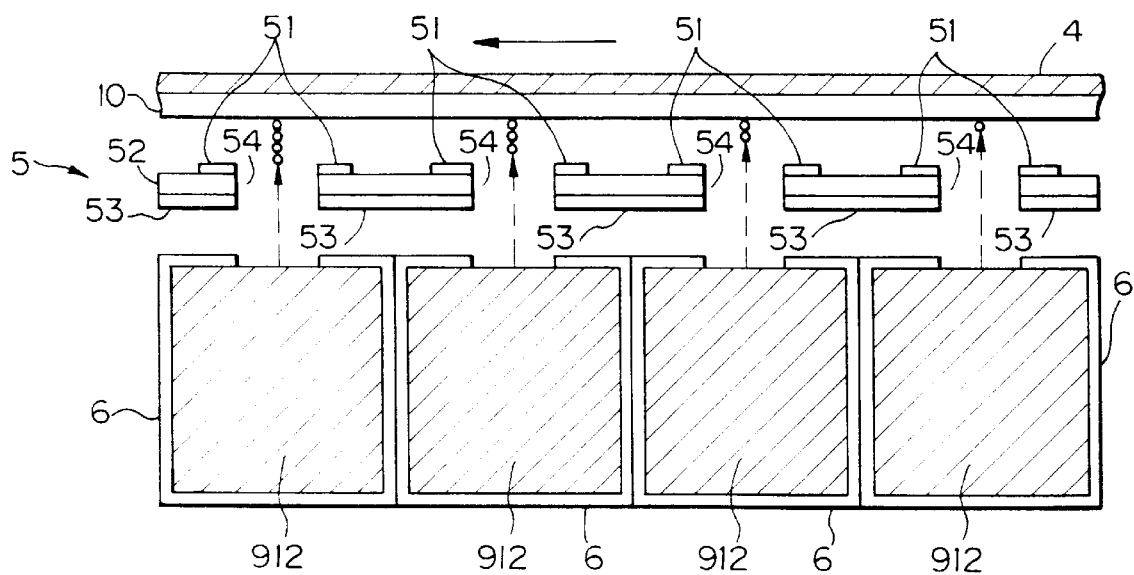
FIG. 22 shows how the recording sections of FIG. 19 are conditioned in a black-and-white mode.

For experiment, a voltage of −120 V continuously applied to the image electrodes 51 was increased to −180 V in order to cause the magenta toner 912 produced by the previously stated method to fly. In this condition, the duration of a pulse voltage was varied to determine the variation of the amount of toner deposition on the sheet 10 for a unit area and the variation of optical density, as shown in FIG. 21. Although the amount of toner deposition increases in proportion to the pulse width or duration, the optical density substantially stops increasing at or around 0.12 msec. therefore, if a voltage is applied for 0.12 msec for each color, a sufficient image density is achievable with each color.

Assume that the sheet 10 is a plain paper and conveyed by the counter electrode 4 at a rate of 42.3 mm/sec, and that the resolution is 600 dpi. Then, 1 msec is necessary for a single dot whose size is 42.3 μm to move over the flight control member 5. Because the image electrodes 51 are driven in eight groups, the maximum duration of the pulse voltage (maximum pulse width hereinafter) which can be applied to each image electrode 51 for image formation is 0.125 msec. For experiment, while the sheet 10 was conveyed at the rate of 42.3 mm/sec, the toner containers 6 were set at the positions indicated by the solid lines in FIG. 18 and respectively stored toner of different colors. In this condition, when a pulse voltage of −60 V was applied to each image electrode 51 for 0.125 msec from the associated IC driver in accordance with the image signal, a full-color print was obtained. In this case, the print speed was measured to be 7.7 ppm.

In a black-and-white mode, the four toner containers 6 each accommodating the toner carrier 6a can be used to cause the toner to sequentially fly four consecutive times. At this instant, if the transport speed of the sheet 10 is quadrupled, the maximum pulse width is about 0.03 msec which is one-fourth of 0.125 msec. If a voltage is applied to each image electrode 51 for 0.03 msec, and if image formation is effected four consecutive times for the single position, then, image density is achievable which is as high as one achievable when the voltage is applied for 0.12 msec which is four times 0.03 msec.

In light of the above, an image was formed under the following experimental conditions. All the four toner containers 6 facing the control electrodes 5 were filled with the magenta toner 912. The counter electrode 4 was driven at control members 5. The combination of the toner containers 6 that face the control members 5 can be changed to form an image, sharing the same control members 5. This makes the most of expensive IC drivers for driving the control members 5.

An image can be formed with the control members 5 facing only the toner containers 6 storing the black toner. Therefore, when a black-and-white image is to be formed, the IC drivers for driving the control members 5 can be efficiently used.

The pulse motor or moving means causes the seven toner containers 6 or the four control members 5 to slide. This allows the combination of the toner containers 6 facing the four control members 5 to be easily changed mechanically for each of the black-and-white mode and color mode.

In the black-and-white mode, the toner containers 6 each storing the black toner can face the four control members 5. This allows the expensive IC drivers to be used most effectively. Further, it is possible to cause the toner to fly to the same position by using all the control members 5, allowing an image to be formed at the highest speed.

In the black-and-white mode, the sheet 10 is conveyed at a speed four times as high as a speed assigned to the color mode, so that a black-and-white image can be formed at a four times higher speed than in the color image. Although the a four times higher speed, i.e., 169.2 mm/sec. While a voltage of −120 V was constantly applied to each image electrode 51, a pulse voltage of −60 V was added to the image electrodes 51 for 0.03 msec each. As a result, a magenta image having a density of 1.3 was attained as when a single flight control member 5 was used to apply a pulse voltage to the image electrodes 51 for 0.12 msec. Next, the toner containers 6 were slid to the positions indicated by the dash-and-dots lines in FIG. 18 by the pulse motor, so that four black toner containers 6 faced the flight control members 5. With this configuration, a black-and-white print whose resolution was as high as 31 ppm was achieved.

Figure 23:
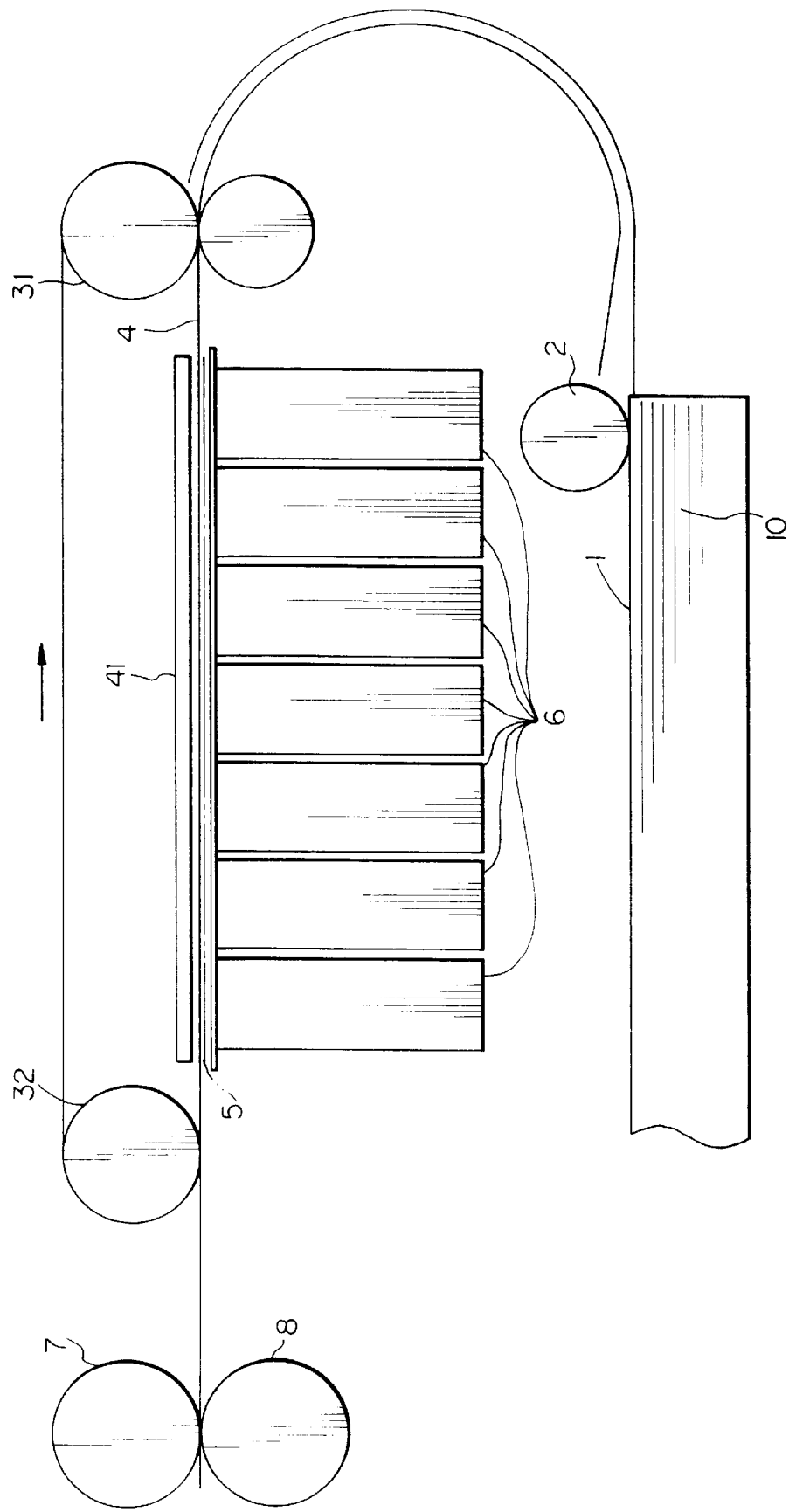
FIGS. 23 and 24 each shows a particular modification of the fourth embodiment.

FIG. 23 shows a modification of the above embodiment. As shown, the seven toner containers 6 are fixed in place while the flight control members 5 are slidable relative to the containers 6. In a color mode, the control members 5 are arranged at the positions indicated by a solid line, so that the yellow, magenta, cyan and black toner containers 6 face the control members 5. In a black-and-white mode, the control members 5 are slid to the positions indicated by a dash-and-dot line, so that the four black toner containers 6 face the control members 5.

As stated above, in the illustrative embodiment, the number of the toner containers 6 each accommodating the toner carrier 7a is greater than the number of the flight maximum pulse width in the black-and-white mode is one-fourth of the pulse width available in the color mode, the toner flies to the same position on the sheet 10 four consecutive times and thereby implements the same image density as in the color mode.

If desired, the four black toner containers 6 may be replaced with a single black toner container having a width great enough to face the four control members 5. The single black toner container is formed with four openings respectively facing the four control members 5, so that the black toner can fly through the openings. Generally, in a printer of the type forming an image by use of toner, a large size container storing black toner, which is frequently used, prevents the toner from being fully consumed because the fluidity of the toner is not so high as the fluidity of liquid. In the illustrative embodiment, because the black toner flies through the four openings, it can be consumed as evenly as when four toner containers are used. Therefore, black toner to be used often can be stored in a great amount. This saves time and labor for the replacement of the container and allows the toner in the container to be fully consumed.

Figure 24:
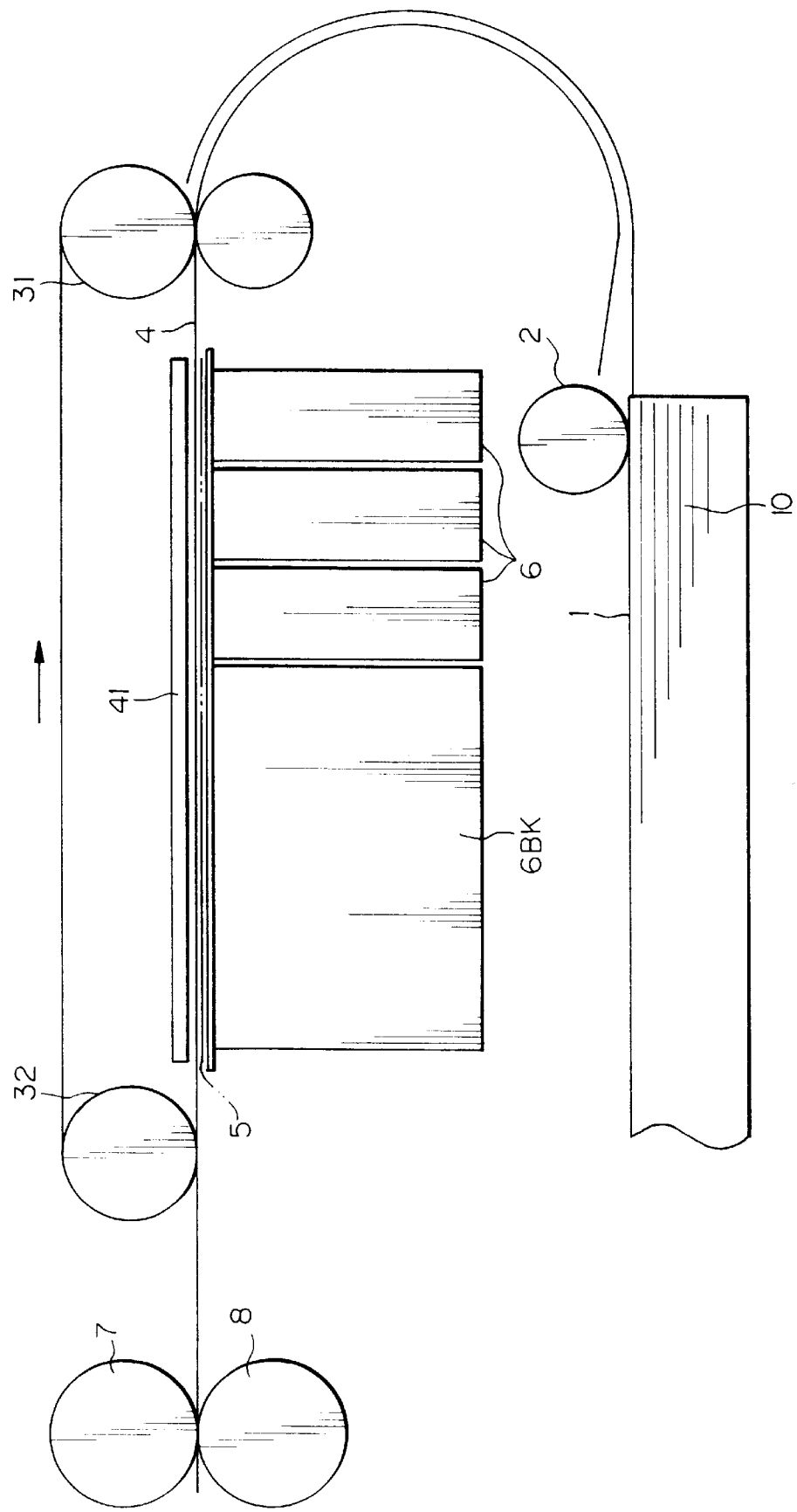

FIG. 24 shows a black toner container 6Bk which may replace the four black toner containers 6, as stated above. The container 6Bk is 86 mm wide and formed with four parallel slits each having a width of 2 mm in its top. Nearby slits are spaced by a distance of 22 mm. Experiments showed that the toner stored in the container 6 was evenly consumed when used over a long period of time. In FIG. 24, if the control members 5 are fixed in place at the positions for implementing the color mode, and if only the slit at the right end of the container 6Bk is used over a long period of time, then the toner existing in the left half of the container 6Bk will be simply left in the container 6Bk. This, however, is least probable because most prints needed in offices are black-and-white printings, as stated earlier.

While the four control members 5 have been shown and described as producing a black-and-white print by causing the toner to fly to the same position of the sheet 10 four times, a particular image forming position may be allocated to each control member 5. Although such allotment reduces the maximum pulse width, stable voltage drive is achievable because the period of the timing for driving and not driving each image electrode is the same as the conventional period.

The rectifying toner chargeable only to the positive polarity or the negative polarity is also applicable to this embodiment.

5th Embodiment

Referring to FIGS. 25–29, a fifth embodiment of the present invention will be described. Because the description of the first embodiment made with reference to FIGS. 4, 6 and 8A–8D also applies to this embodiment, it will not be repeated in order to avoid redundancy. This embodiment uses the conductive toner 91. The toner 91 may be produced by coating particles of polystyrene resin having a diameter of 6 $\mu$m with conductive polymeric polypyrol to a thickness of 0.1 $\mu$m, and then covering them with 5 wt % of fine silica powder having a mean grain size of 0.1 $\mu$m. When black conductive toner was produced, its resistivity was measured to be 10 $\Omega$cm which was as low as the resistance of metal.

The flight control members 5 were produced by the previously stated method. Each control member 5 had the microholes 54 arranged at a pitch of 300 $\mu$m and each having a diameter of 250 $\mu$m. The control members 5 were mounted on the printer shown in FIG. 4. The conductive toner 91 was stored in each of the toner containers 6 of the printer. The shield electrodes 53 and toner carriers 6a were connected to ground, as in the simulation described with reference to FIGS. 8A–8D. While the constant voltage of 400 V was applied to the counter electrode, the image electrodes 53 continuously applied with the voltage of 120 V was additionally applied with a pulse signal voltage of 60 V, i.e., applied with the signal voltage of 180 V for 1 msec. After the fixation of the resulting image, the diameters of the dots forming the image were measured. The diameters were found to lie in the range of 75±5 $\mu$m. A high-speed camera showed that the toner particles lying in the circular area beneath each microhole 54 and having a diameter of about 80 $\mu$m left the toner carrier 6a and flew while spreading to a diameter of about 95 $\mu$m. Presumably, the particles spread due to electrostatic repulsion acting between the particles of the same polarity. Thereafter, the particles passed through the microholes 54, slightly reduced their spread, and then deposited on the sheet 10 over a circular range of about 75 $\mu$m. The particles beneath the shield electrodes 53 did not fly at all. This is presumably because the shield electrodes 53 connected to ground and the surface of the toner layer 91 present on the toner carrier 6a are of the same potential, allowing hardly any electric field to be formed on the surface of the toner layer 91. The same experiment, but conducted by varying the voltage to be applied to the shield electrodes 53, showed that the particles did not fly in the voltage range of from –400 V to 40 V, but flew reversely toward the shield electrodes 53 at the other voltages.

With this embodiment, it is possible to suppress the flight of the conductive toner 91 other than the toner beneath the microholes 54 on the basis of the electric fields derived from the voltage applied to the shield electrodes 53. This prevents the toner 91 from flowing into and smearing the apparatus, stopping the microholes 54, or depositing on the counter electrode 4 and control members 5 to render images defective. In addition, because no charges are injected into the toner 91, the toner is free from deterioration ascribable to charge injection.

As the signal voltage applied to each image electrode 51 is increased, there also increase the range over which the toner 91 leaves the toner layer, the spread of the toner 91 passing through the opening 54, and the range over which the toner 91 deposits on the sheet 10.

In the illustrative embodiment, while the electric field for suppressing the flight of the toner 91 other than the toner beneath each microhole 54 is maintained by the voltage applied to the shield electrode 53, a signal voltage for causing a group of toner particles to pass through the microhole 54 with a diameter smaller than the diameter of the microhole 54, e.g., 180 V is applied to the image electrode 51. Therefore, the toner beneath the shield electrode 53 does not fly, and in addition the toner 91 in flight does not stop the microhole 91 or deposit on the shield electrode 53 and image electrode 51. This eliminates the need for a cleaning step and thereby enhances high-speed printing, while eliminating the need for a shield which would increase the cost. Further, all the toner particles in flight contribute to image formation. The toner is free from deterioration ascribable to a plurality of times of charge injection.

Figure 25:
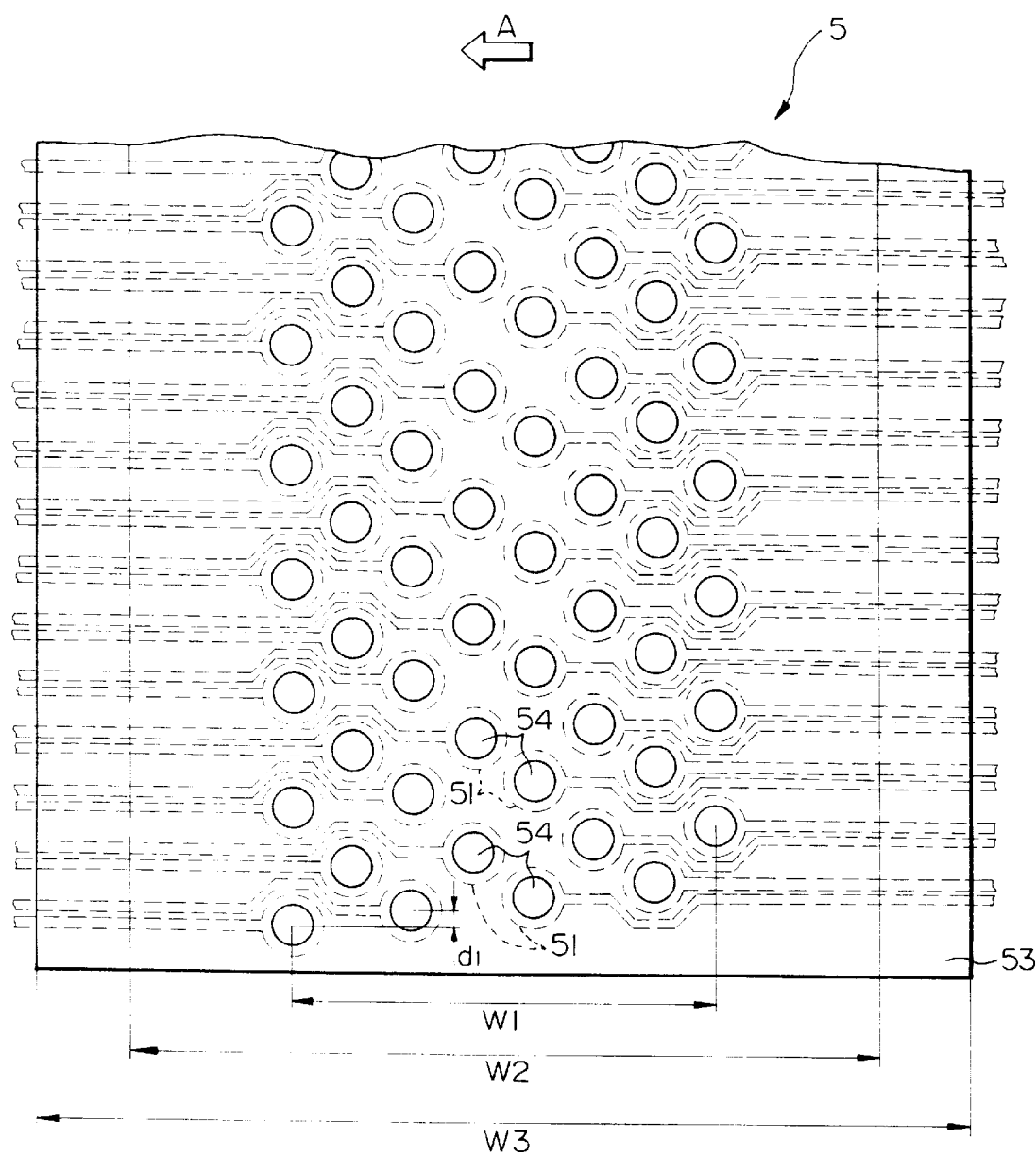
FIG. 25 is a plan view showing a specific configuration of control electrodes included in a fifth embodiment of the present invention.

FIG. 25 shows a specific configuration of the flight control member 5 included in the above printer and configured to produce a print over a width of 210 mm (width of size A4) with a resolution of 600 dpi. The control member is mounted on the printer such that the front side, as viewed in the direction perpendicular to the sheet surface of FIG. 25, faces the toner carrier 6a while the rear side faces the counter electrode 4. An outline arrow A indicates the direction of sheet transport. The centers of the most upstream microholes 54 and those of the most downstream microholes 54 are spaced by a distance of W1. A range over which the toner flies, as will be described, extends over a width of W2 in the direction of sheet transport. The shield electrode 53 has a width of W3.

As shown in FIG. 25, the image electrodes 51 are positioned on the side of the polyimide film 52 facing the sheet transport side, i.e., the counter electrode 4. For the resolution of 600 dpi, the dots are expected to have a pitch of 42.3 $\mu$m. In this embodiment, such a pitch must be implemented by the image electrodes 51 having a diameter of 180$\mu$ and the microholes 54 having a diameter of 120 $\mu$m . For this purpose, each eight microholes 54 in the widthwise direction of sheet are inclined by a predetermined angle relative to the direction of sheet transport. In addition, each eight image electrodes 51 adjoining each other are spaced from each other such that the centers of the microholes 54 do not align with each other. That is, the inclination angle and distance are selected such that the microholes 54 have a pitch d1 of 42.3 μm, as measured in the widthwise direction of sheet, corresponding to the resolution of 600 dpi. The pitch of the microholes 54 in the direction of sheet transport is selected to be an integral multiple of 42.3 μm corresponding to 600 dpi. The distance W1 is selected to be 1.1844 mm. The group of image electrodes 51 has a width of 210 mm (width of size A4) in the direction of sheet width. The image electrodes 51 are connected to IC drivers, not shown.

To form an image with 600 dip by use of the above flight control member 5, a voltage drive section, not shown, drives the image electrodes 51 by dividing them into eight groups. Specifically, the image electrodes 51 whose microholes 54 form the first array, as seen in the direction of sheet transport, extending in the widthwise direction of sheet to the image electrodes 51 whose microholes 54 form the last array, as seen in the direction of sheet transport, are sequentially driven in this order. More specifically, to provide the most upstream array of microholes 54 with the driven state, the output of the associated IC driver and based on the image data representative of dots corresponding to such particular microholes 54 is applied to the image electrodes 51. That is, a voltage for image formation, e.g., 180 V is applied to the electrodes 51 having the microholes 54 for causing the toner beneath them to fly, while a voltage for non-image formation, e.g., 120 V failing to cause the toner to fly is applied to the electrodes 51 whose microholes are not expected to cause the toner to fly. The voltage for non-image formation, e.g., 120 V is also applied to the electrodes 51 having the microholes 54 other than the most upstream ones.

The above voltage drive is sequentially repeated with the eight arrays of microholes 54 parallel in the direction of sheet transport. In such an eight group drive, only if the voltage for image formation is applied to all the arrays of microholes 54, but at intervals corresponding to the period of time necessary for the sheet 10 to move one pitch in the direction of sheet transport, a single line extending in the widthwise direction of sheet is recorded on the sheet 10.

In the color printer, the above group of image electrodes 51 are assigned to each of the four colors.

On the other hand, the shield electrode 53 provided on the polyimide film 52 is formed of a conductive or semiconductive substance over its entire range corresponding to the range in which the toner 91 flies from the toner carrier 61 (range of toner flight hereinafter), except for the microholes 54. The range of toner flight may be considered to be substantially equal to the opening formed in the top of the toner container 6. In this embodiment, the shield electrode 53 is positioned closer to the toner carrier 6a than to the members formed of a conductive material and intervening between the counter electrode 4 and the toner carrier 6a, i.e., the image electrodes 51. As a result, an electric field different from the electric field to be formed by the voltage applied to each image electrode 51 can be formed in the range of toner flight except for the position beneath the microhole 54. Potential applying means, not shown, applies, e.g., the ground potential to the shield electrode 53. The ground potential prevents, despite the voltage for image formation applied to the counter electrode and image electrode 51, the electric field acting on the toner 91 other than the toner beneath the microhole 54 from falling below the flight start electric field and causing the toner to fly.

The shield electrode 53 extends over a range, as measured in the direction of sheet transport, broader than the range corresponding to the range of toner flight, i.e., such that the width W3 is greater than the width W2. Also, the width of the electrode 53 in the widthwise direction of sheet is selected to be greater than the width of the range of toner flight in the same direction. This prevents the electric field derived from the voltage applied to the counter electrode or the image electrode from easily turning round the outside of the electrode 53. As a result, the flight of the toner 91 due to the turn-round of the above electric field to the toner 91 on the toner carrier 6a is obviated. The electrode 53 is broad enough to sufficiently weaken the electric field ascribable to the turn-round. For example, it is preferable to configure the electrode 53 such that even when the voltage for image formation is applied to any one of the image electrodes 51 closest to the edges of the range of toner flight, the electric field derived from such a voltage or the electric field derived from the voltage applied to the counter electrode 4 is prevented from turning round the outside of the electrode 53.

Figure 26:
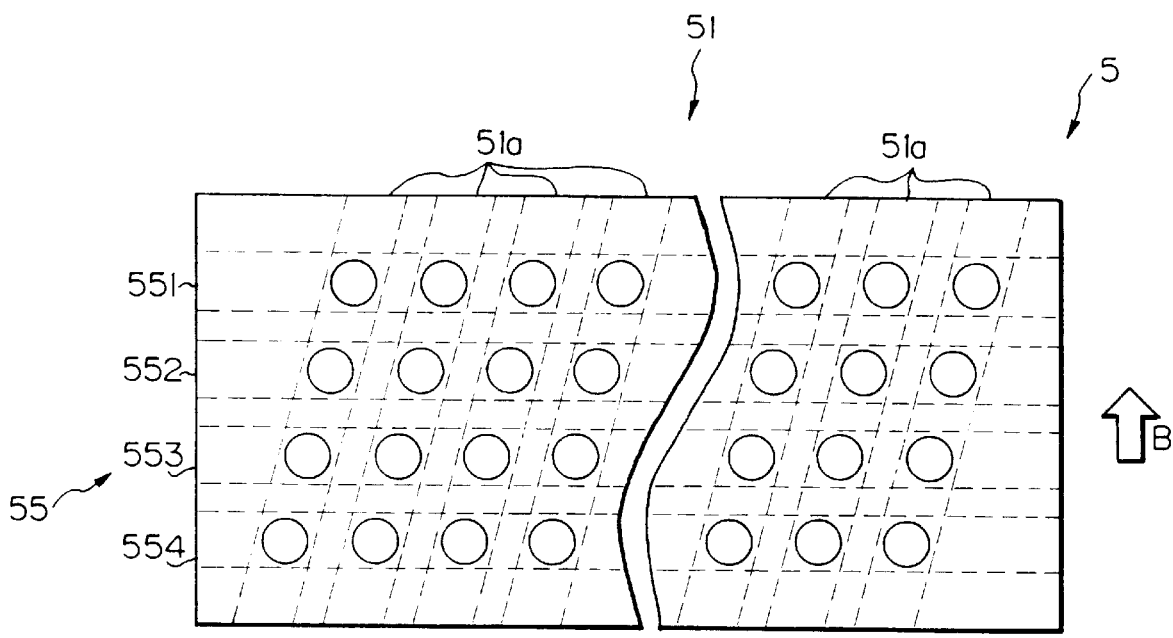
FIG. 26 is a plan view showing another specific configuration of the control electrodes of the fifth embodiment.

FIG. 26 shows a modification of the flight control member 5. The control member 5 is mounted on the color printer such that the front side, as viewed in the direction perpendicular to the sheet surface of FIG. 26, faces the counter electrode 4 while the rear side faces the toner carrier 6a. The direction of sheet transport extends in the vertical direction, as indicated by an outline arrow B. As shown, the control member 5 has common image electrodes 51a each of which is an assembly of the image electrodes 51 corresponding to four microholes 54, and a time division electrode 55 which will be described. Time division drive using the common image electrodes 51a and time division electrode 55 reduces the required number of expensive IC drivers.

Figure 27:
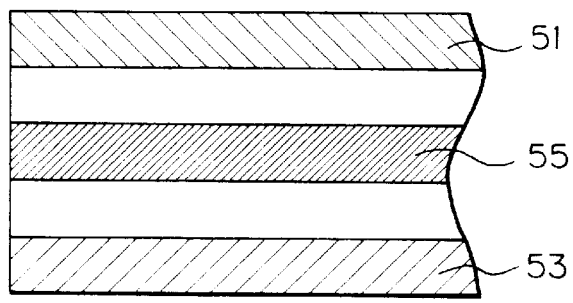
FIG. 27 shows the laminate structure of a flight control member included in the fifth embodiment.

As shown in FIG. 27, the flight control member 5 is a laminate consisting of a conductive layer, an insulating layer, a conductive layer, an insulating layer and a conductive layer stacked in this order. The conductive layer closest to the counter electrode 4 constitutes the image electrodes 51 while the conductive layer underlying the above conductive layer constitutes the time division electrodes 55. The conductive layer closest to the toner carrier 6a constitutes the shield electrode 53. The shield electrode 53 is located closer to the toner carrier 6a than to the members formed of a conductive substance and intervening between the counter electrode 4 and toner carrier 6a, i.e., the image electrodes 51 and time division electrodes 55. Therefore, even with such a control member 5, it is possible to cause an electric field different from the electric fields derived from the voltage applied to the electrodes 51 or 55 to act on the toner in the range of toner flight facing the shield electrode 53, except for the positions beneath the microholes 54.

The image electrodes 51 are implemented as 1,240 common image electrodes 51a each consisting of the image electrodes 51 corresponding to four microholes 54. Each common image electrode 51a is inclined by a predetermined angle relative to the direction of sheet transport. In addition, nearby electrodes 51a are spaced such that the centers of their microholes 54 do not align in the direction of sheet transport. Specifically, the inclination angle and distance are selected such that the centers of the microholes 54 are arranged at a pitch of 42.3 μm corresponding to 600 dpi in the widthwise direction of sheet perpendicular to the direction of sheet transport. The group of common image electrodes 51a extends over a width of 210 mm, as measured in the widthwise direction of sheet, equal to the width of size A4.

The time division electrodes 55 are implemented as four time division electrodes 551–554. Even when the voltage for causing the toner to fly is applied to the common image electrodes 51a in accordance with the image signal, the time division electrodes 551–554 form electric fields for preventing the toner from passing through the microholes 54 of the electrodes 51a not driven. The electrodes 551–554 each has 1,240 holes arranged in the direction perpendicular to the direction of sheet transport. Such holes of the electrodes 551–554 are arranged in the direction of sheet transport in a planar configuration such that each hole aligns with the microhole 54 of one of the 1,240 common image electrodes 51a and identical in order in the direction of sheet transport. For example, the 1,240 holes of the most downstream electrode 531 in the direction of sheet transport align with the most downstream microholes 54 of the 1,240 common image electrodes.

The shield electrode 53, like the flight control member 5 of FIG. 25, is formed of a conductive or semiconductive substance over its entire range corresponding to the range in which the toner flies from the toner carrier 6a, except for the microholes 54. Potential applying means, not shown, applies, e.g., ground potential to the shield electrode 53 such that even when the voltage for image formation is applied to the counter electrode 4 and image electrodes 51 lying in the range of toner flight, the electric fields acting on the toner 91 other than the toner beneath the microholes 54 do not fall below the flight start electric field. This is the same as the potential applying means described in relation to the control member 5 of FIG. 25.

The shield electrode 53, like the control member 5 of FIG. 25, extends over a range broader than the range corresponding to the range of toner flight, i.e., such that the width W3 is greater than the width W2. This prevents the electric field derived from the voltage applied to the counter electrode 4 or the image electrodes 51 from easily turning round the outside of the electrode 53. As a result, the flight of the toner due to the turn-round of the above electric field to the toner on the toner carrier 6a is obviated.

The 1,240 common image electrodes 51a, four time division electrodes 551–554 and shield electrode 53 are connected to IC drivers, not shown.

Assume that the flight control member 5 shown in FIG. 26 is used to form an image with a resolution of 600 dpi.

Then, the first array, as seen in the direction of sheet transport, of holes of the 1,240 common image electrodes 51a extending in the widthwise direction of sheet to the last array of holes are sequentially provided with the drive state, i.e., on the basis of the array corresponding to the time division electrode. Specifically, to apply the output of the IC drivers based on the image information of dots corresponding to the most upstream array of holes to the common image electrodes 51a, the most upstream time division electrode 554 is provided with the drive potential state. This drive potential state is such that electric fields for the passage of the toner are formed in the holes of the common image electrodes 51a applied with the flight voltage which causes the toner to fly in accordance with an image signal, but only electric fields failing to cause the toner to fly are formed in the holes of the electrodes 51a applied with the non-flight voltage which prevents the toner from flying. Applied to the other time division electrodes 551–553 is the non-drive potential state for forming electric fields not allowing the toner to fly even in the holes of the common image electrodes 51a applied with the flight voltage. Assume that the specific dimensions stated with reference to FIG. 6 are used, that a voltage of 400 V is applied to the counter electrode 4, that a flight voltage of 180 V is applied to the common image electrodes 51a, and that a non-flight voltage of 120 V is applied to the electrodes 51a. Then, the voltage for the drive voltage state of the time division electrodes 538 is selected to be, e.g., 0 V (ground) while the voltage for the non-drive voltage state is selected to be, e.g., −20 V. In this condition, assuming the toner 91 produced by the previously stated method, the electric field acting on the toner layer exceeds the flight start electric field at positions beneath the microholes 54 where the holes of the common image electrode 51 applied with the flight voltage and the holes of the shield electrode 53 applied with the voltage for the drive voltage state align. As a result, the toner flies through such microholes 54 and deposits on the sheet 10. However, the electric field acting on the toner layer does not exceed the flight start electric field at positions beneath the microholes 54 where the holes of the electrode 51 applied with the non-flight voltage and those of the electrodes 551–554 applied with the voltage for the drive voltage state align, and at positions beneath the microholes 54 where the holes of the time division electrode 51 and those of the common image electrode 51 align without regard to the kind of the voltage applied to the electrode 51. To drive the second array of holes of the 1,240 common image electrodes 51a with respect to the direction of sheet transport, the second time division electrode 553 in the same direction is provided with the drive potential state. The other time division electrodes 551, 552 and 554 are provided with the non-drive potential state.

For example, while the flight voltage is applied to all the common image electrodes 51a, the four time division electrodes 551–554 are sequentially driven by the above four-group drive at intervals corresponding to a period of time necessary for the sheet 10 to move one pitch in the direction of sheet transport of the electrodes 551–554. As a result, a single line is recorded on the sheet 10 in the widthwise direction of sheet.

When the control member 5 of the above modification is used, group drive is applicable to the plurality of holes of each common image electrode 51a. This reduces the number of expensive IC drivers to substantially one-fourth and thereby saves cost noticeably.

The layer of the control member 5 closest to the counter electrode 4 is a conductive layer, as stated earlier. It is preferable that an insulating layer be formed on the surface of the above conductive layer facing the counter electrode 4. The insulating layer will prevent, e.g., when the transport of the sheet 10 is defective, the sheet 10 and the conductive layer from contacting each other. Therefore, even when the resistance of the sheet 10 falls due to high humidity, there is obviated discharge between the counter electrode 4 and the sheet 10 which would damage the control member 5.

In the illustrative embodiment, the image electrodes 51 and shield electrode 53 or the image electrodes 51, shield electrode 53 and time division electrodes 55 are constructed into a single flight control member 5. Although the individual electrode may be formed independently of the other electrodes, the integral assembly does not have any gap between the electrodes and prevents the toner not charged or charged to the opposite polarity from flying about and depositing on the electrodes.

Figure 28:
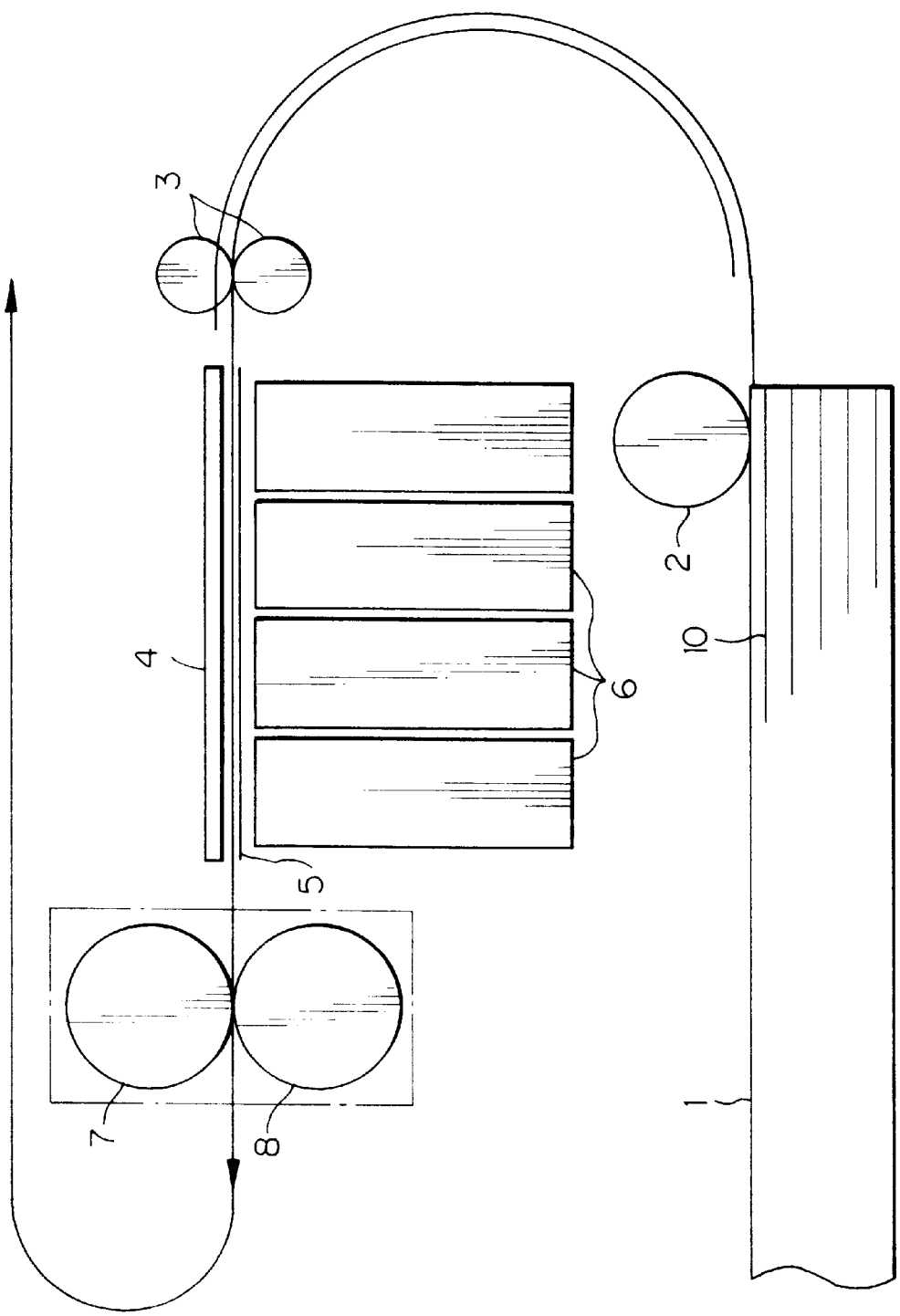
FIGS. 28 and 29 are front views each showing a modification of the fifth embodiment.

The color printer 4 shown in FIG. 4 may be replaced with the color printer shown in FIG. 28. As shown in FIG. 28, the sheet 10 is conveyed not by the counter electrode or belt 4, but by a conveyor roller pair 3. The counter electrode 4 is spaced from the sheet 10. The conveyor roller pair 3 feeds the sheet 10 to between the counter electrode 4 and the control member 5. While the sheet 10 moves along the control member 5, an image is recorded on the sheet 10 in the same manner as in the color printer shown in FIG. 4.

Figure 29:
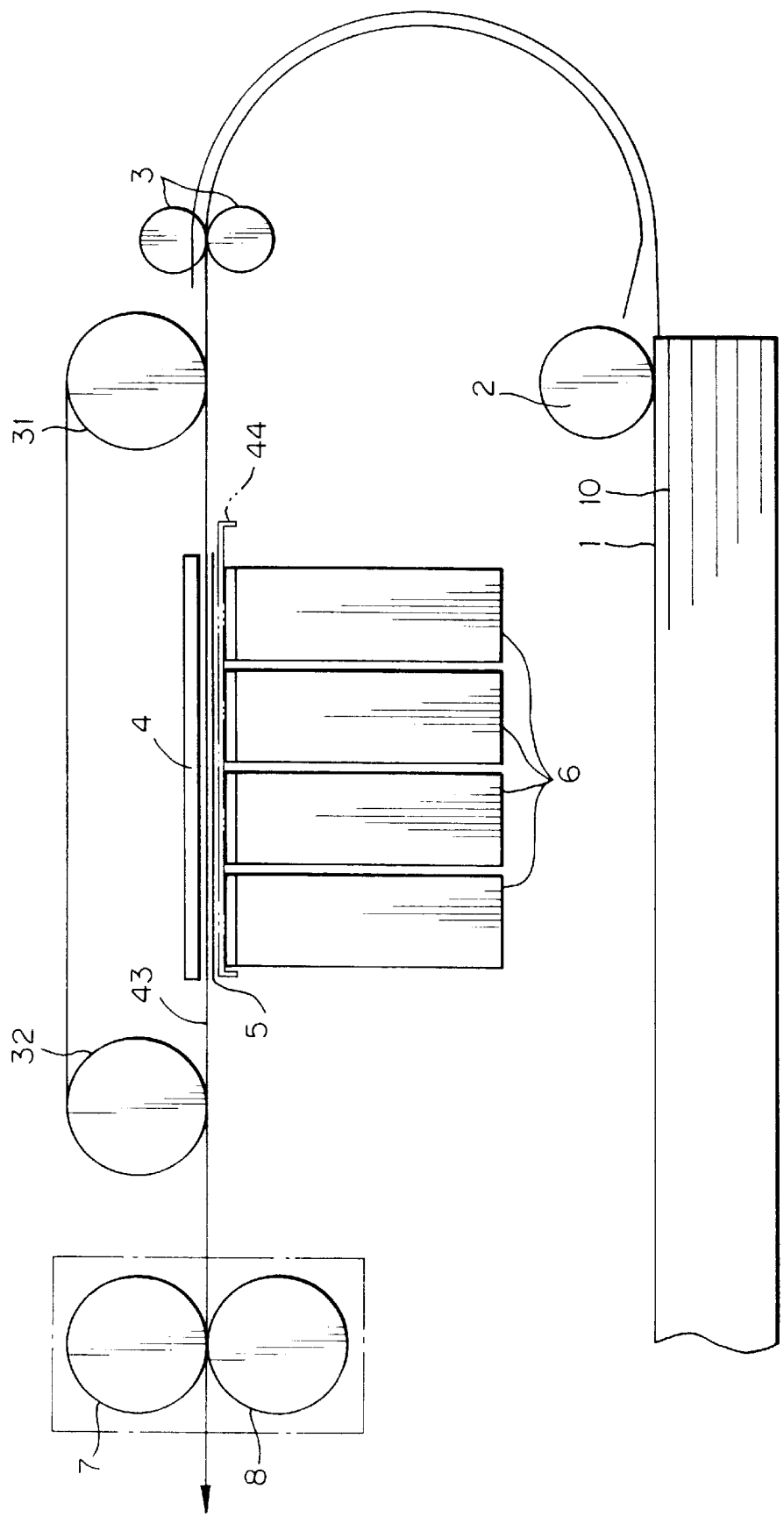

FIG. 29 shows another color printer to which the illustrative embodiment is applicable. As shown, the color printer has a conveyor belt 43 and a shutter 44 in addition to the structural elements shown in FIG. 28. The conveyor belt 43 is passed over the support rollers 31 and 32 and conveys the sheet 10 while turning in the direction indicated by an arrow. The shutter 44 covers the openings of the toner containers 6 while an image is not formed, preventing the toner 91 from flying about. The belt 43 conveys the sheet 10 to between the counter electrode 4 and the control member 5 while retaining it thereon by suction. This prevents the leading edge of the sheet 10 from rising away from the surface of the belt 43, and thereby insures accurate deposition of the toner 91 as to position.

In this embodiment, the toner 91 may also be replaced with the rectifying toner chargeable only to the positive polarity or the negative polarity.

As stated above, the above embodiment has the following advantages.

(1) An electric field acting on toner other than toner to pass through the microholes of a flight control member prevents it from flying away from a toner carrier. Therefore, toner not contributing to image formation is prevented from flowing out into an apparatus and contaminating its inside, stopping the microholes, or depositing on a counter electrode and control member to bring about defective images. This eliminates the need for a cleaning step and thereby implements high-speed printing, while eliminating the need for a shield which would increase cost. In addition, all the toner flown from the toner carrier joins in image formation. Therefore, the toner is free from deterioration ascribable to a plurality of times of charge injection.

(2) Image electrode and shield electrode are constructed integrally with each other; if otherwise, toner not charged or charged to the opposite polarity would fly about in spaces between the electrodes and would deposit on the electrodes.

(3) An electric field derived from a voltage applied to the counter electrode or to the flight control member is not allowed to easily turn round the outside of the shield electrode. This obviates the flight of toner ascribable to such an electric field and therefore toner deposition on the electrodes.

(4) Circuitry for driving the flight control member is simple in configuration.

(5) An insulating layer is formed on the surface of the flight control member facing the counter electrode. The insulating layer prevents, e.g., when the transport of a sheet is defective, the sheet and the conductive layer from contacting each other. Therefore, even when the resistance of the sheet falls due to high humidity, there is obviated discharge between the counter electrode and the sheet which would damage the control member.

6th Embodiment

FIGS. 30–33 shows a sixth embodiment of the present invention also implemented as a color printer. Because the description of the first embodiment made with reference to FIGS. 4, 6, 9 and 10 also applies to this embodiment, it will not be repeated order to avoid redundancy. In this embodiment, the counter electrode 4 is implemented as a belt formed of, e.g., nickel while the toner is implemented as the conductive toner 91.

Figure 30:
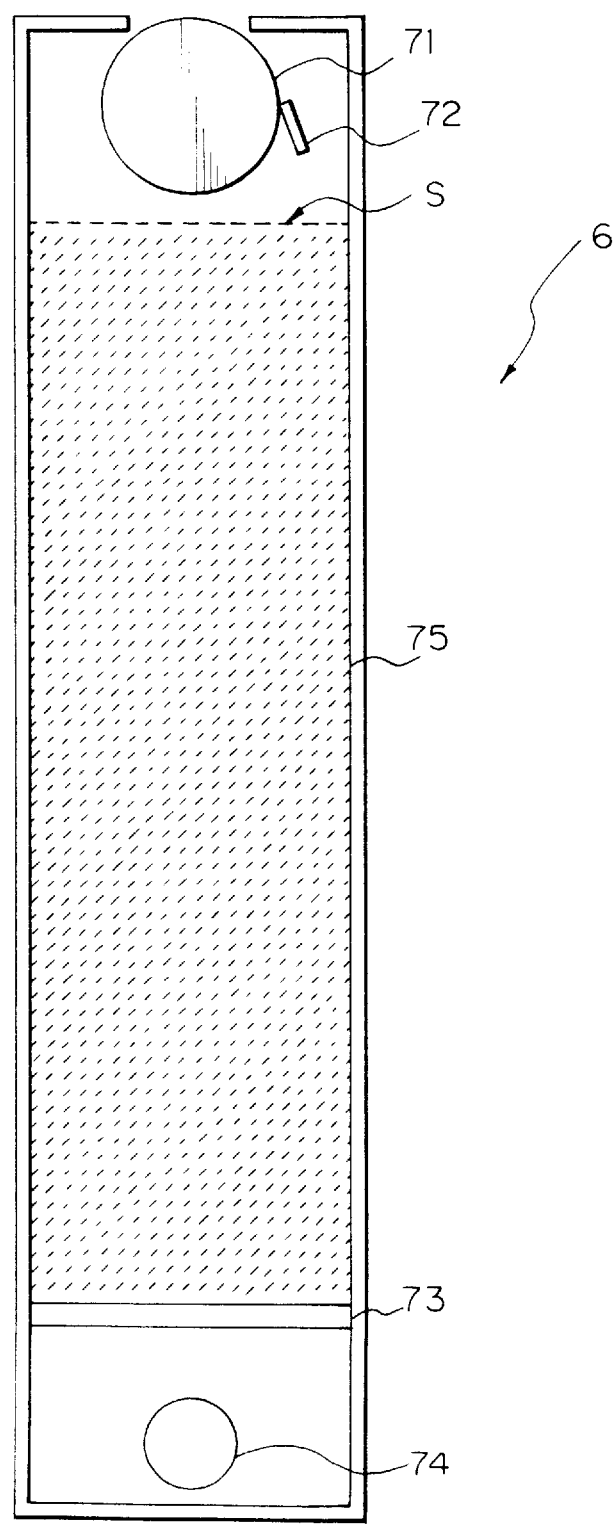
FIG. 30 shows a toner container for practicing a sixth and a seventh embodiment of the present invention.

As shown in FIG. 30, the toner container 6 is 10 mm wide, 50 mm high and 220 mm long and formed of plastics. A 4 mm wide, 210 mm long rectangular opening is formed in the top of the container 6. A toner conveyor roller 71 is disposed in the container 6 and partly exposed to the outside via the opening that faces the counter electrode 4, not shown. The toner conveyor roller 71 plays the role of the toner carrier 6a. At least the surface of the roller 71 is formed of an insulator. For example, the roller 71 may be implemented as an aluminum rod having a diameter of 5 mm and formed with an 80 $\mu$m thick coating of polyester resin. A blade 72 is formed of, e.g., rubber and held in contact with the roller 71 so as to scrape off the conductive toner 91 not transferred to the sheet 10, not shown. An elevatable base 73 and a screw shaft 74 are disposed in the lower portion of the container 71. The plate 73 is implemented by a flat plate of, e.g., plastics and elevatable to raise the toner layer 91 by being driven by the screw shaft 74. The screw shaft 74 and toner conveyor roller 71 are connected to a motor by gears, although not shown specifically. The roller 71 is rotated at a speed equal to the speed at which the sheet 10 is conveyed, e.g., at a peripheral speed of 50 mm/sec. The screw shaft 74 is rotated intermittently in accordance with the consumption of the toner 91, raising the base 73. A conductive paint is applied to the inner periphery 75 of the container 6.

For the conductive toner 91, use may be made of RIFAX 9000 mentioned earlier and having a conductivity of about $10^{-4}$ S/cm at normal temperature and normal humidity. To feed the toner 91 to the roller 71, the roller 71 is connected to ground while a DC voltage (toner voltage hereinafter) is applied to the conductive inner periphery 75 of the container 6. As a result, charge is injected into the toner 91 due to electrostatic induction. An electrostatic force derived from the charge and DC electric field causes the toner 91 to fly toward the roller 71.

For experiment, while the gap between the roller 71 and the surface S of the toner layer 91 (toner gap hereinafter) was maintained constant, the toner voltage was applied to the inner periphery of the container 6. In this condition, the amount of toner deposition on the roller 71 (amount of primary flight hereinafter) and the amount of charge for a unit mass of the toner 91 were measured by a blow-off method (Faraday cage) conventional with electrophotography.

Figure 31A:
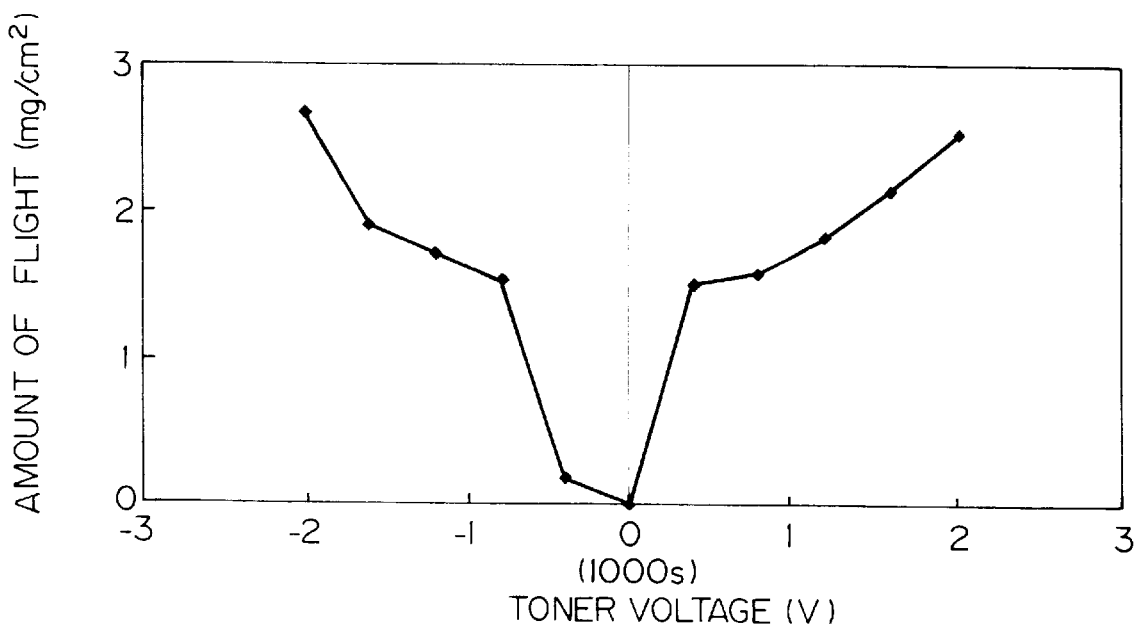
FIG. 31A shows a relation between the amount of primary flight of toner and a toner voltage, as measured with the toner container shown in FIG. 30.
Figure 31B:
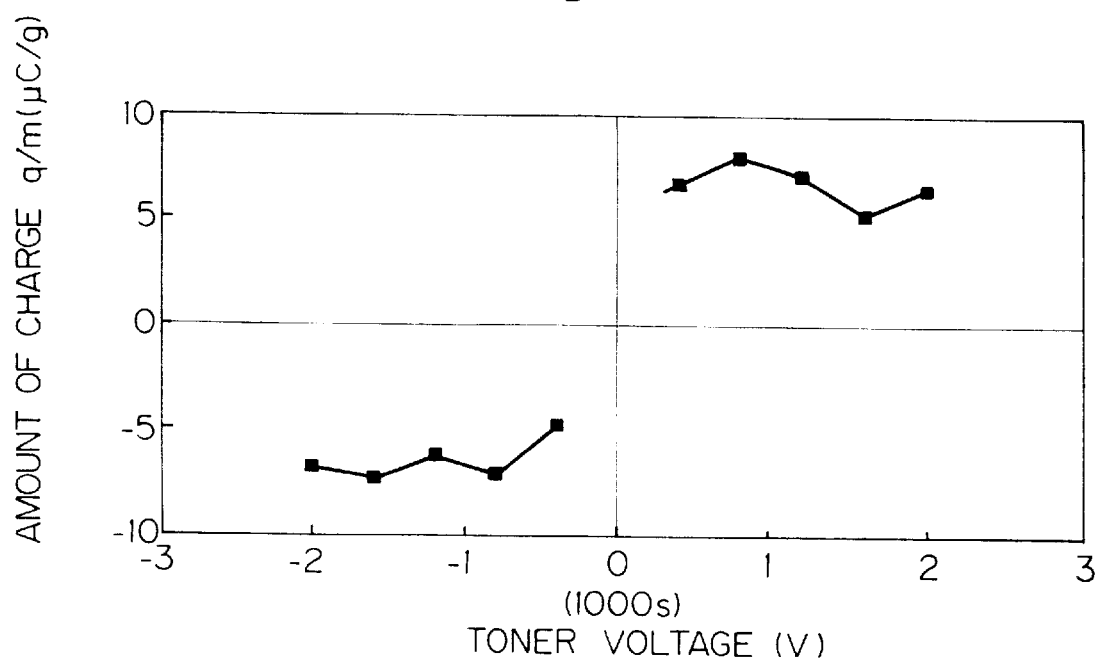
FIG. 31B shows a relation between the amount of charge of toner undergone the primary flight for a unit mass and the toner voltage, as also measured with the toner container shown in FIG. 30.

FIGS. 31A and 31B show the results of measurement. For the measurement, the toner gap was selected to be 1 mm, the roller 71 was caused to make one rotation at a peripheral speed of 50 mm, and the roller 91 deposited on the roller 71 was sucked via the microholes 54.

As shown in FIG. 31A, the toner 91 starts flying at a toner voltage of 400 V without regard to the polarity of the voltage. Because the surface of the roller 71 is insulative, charge of opposite polarity is prevented from being injected into the toner 91 deposited on the roller 71. Therefore, the toner 91 forming the first layer on the roller 71 is prevented from flying in the reverse direction. However, charge is injected into the toner 91 forming the second and successive layers due to electrostatic induction, and causes it to fly in the reverse direction. It follows that the amount of flight increases relatively slowly with the increase in voltage beyond a certain voltage (+400 V if the polarity is positive or −800 V if the polarity is negative).

As also shown in FIG. 31B, the amount of charge for a unit mass remains substantially constant without regard to the toner voltage.

Figure 32A:
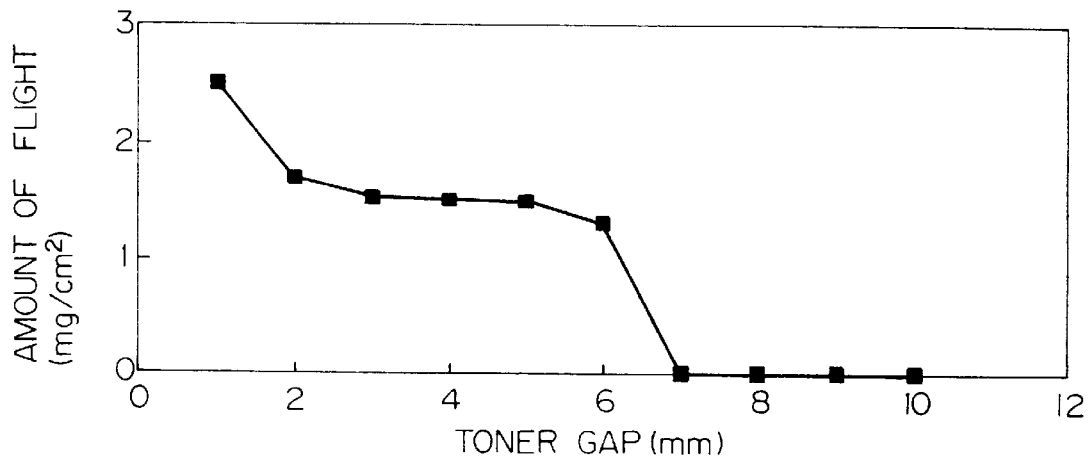
FIG. 32A shows a relation between the amount of primary flight and a toner gap, as also measured with the toner container shown in FIG. 30.
Figure 32B:
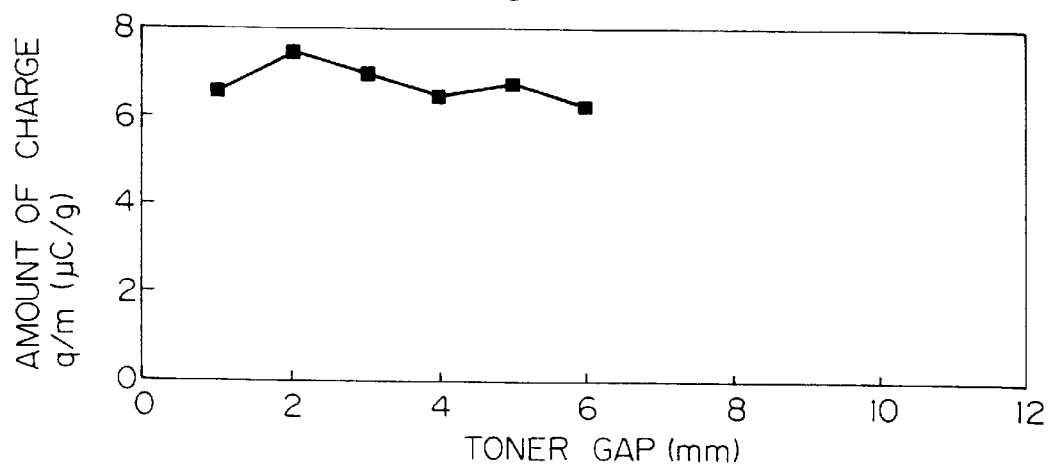
FIG. 32B shows a relation between the amount of charge of toner undergone the primary flight for a unit mass and the toner gap, as also measured with the toner container shown in FIG. 30.

FIGS. 32A and 32B show the results of measurement effected in the above-described manner, but with the toner voltage held at 2,000 V and with the toner gap sequentially varied. As shown in FIG. 32A, the toner 91 does not fly if the toner gap is greater than 6 mm. When the toner gap is smaller than 6 mm inclusive, the toner 91 flies; the amount of flight varies from 1.3 mg/cm$^2$ to 2.5 mg/cm$^2$ in accordance with the toner gap. As shown in FIG. 32B, the amount of charge for a unit mass remains substantially the same so long as the toner gap is smaller than 6 mm inclusive. If the amount of charge of the toner is irregular, then the electrostatic force acting on the toner becomes irregular with the result that the moving speed and density are rendered irregular. However, if the toner gap is maintained smaller than 6 mm inclusive, the amount of charge and therefore image density remains constant.

Figure 33:
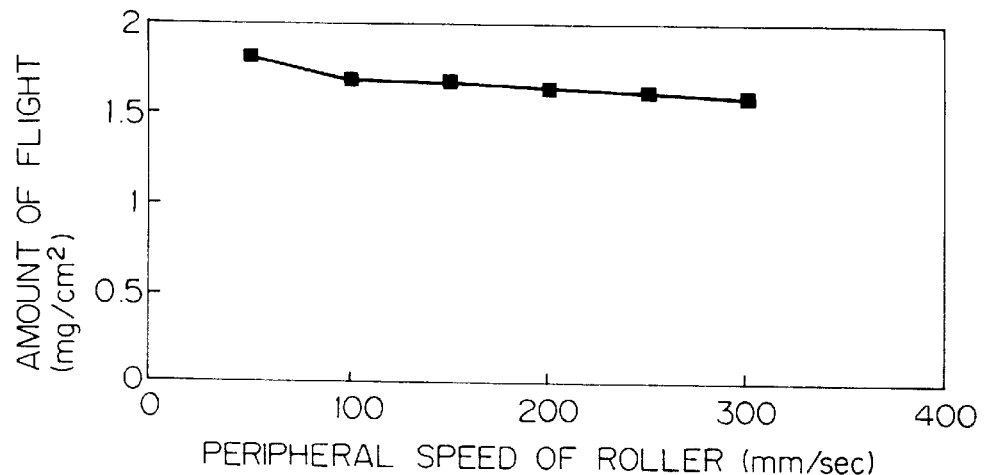
FIG. 33 shows a relation between the amount of primary flight and the peripheral speed of a toner carrier, as also measured with the toner container shown in FIG. 30.

FIG. 33 shows the amount of primary flight measured by maintaining the toner voltage at 1,000 V and the toner gap at 1.0 mm while varying the periphery speed of the roller 71 between 50 mm/sec and 300 mm/sec. As shown, the amount of primary flight decreases only by about 10% even when a ten times higher peripheral speed is set up. For secondary flight for forming an image, the amount of primary flight should only be 1.2 mg/cm$^2$. It will therefore be seen that the toner 91 is fed to the roller 71 in a sufficient amount. Usually, the sheet transport speed is about 20 mm/sec even in a high-speed printer. Therefore, short toner supply does not occur at all only if the peripheral speed of the roller 71 is equal to such a sheet transport speed.

As stated above, the embodiment uses a DC power source less expensive than an AC power source and applies a DC electric field to the toner layer, thereby saving the cost. The embodiment is capable of feeding the toner in a sufficient amount, compared to the conventional electrostatic adhesion scheme relying on the mirror-image force particular to the charge of toner implemented as a cloud. In addition, the embodiment which does not have to form a toner cloud is small size and low cost.

By confining the toner gap in the range below 6 mm inclusive, it is possible to maintain the amount of primary flight and the amount of charge substantially constant. This insures constant image quality at all times.

Because a voltage can be directly applied to the inner periphery 75 of the toner container 6, it is not necessary to provide an exclusive electrode to which a voltage for forming an electric field for causing the toner to fly should be applied. This also reduces the size and cost of the apparatus.

The surface of the roller 71 is covered with an insulator. Therefore, even when the toner has a resistivity as low as about $10^{-4}$ S/cm, charge is prevented from being injected into the toner deposited on the roller 71 and causing it to fly in the reverse direction.

In the printer of FIG. 4, for example, while the roller 71 was continuously rotated, a toner voltage of 2000 V was held at 2,000 V. Voltages of −180 V and −400 V were applied to the image electrodes and counter electrode 4, respectively. The roller 71 and shield electrode 53 were connected to ground. The sheet 10 was transported to form a black solid image thereon and then had the image fixed thereon. In this condition, so long as the toner gap was smaller than 6 mm inclusive, i.e., in the range of toner flight, constant image density as high as 1.4 was achieved despite the variation of the toner gap. This is because even when the amount of primary flight varies from 1.3 mg/cm$^{-2}$ to 2.4 mg/cm$^{-2}$, the maximum amount of secondary flight is as small as 0.8 mg/cm$^{-2}$ and remains constant.

For comparison, when the above experiment was also conducted by removing the polyester resin layer from the roller 71, an image could not be printed. This is because charge of opposite polarity is injected into the toner deposited on the roller 71 by the primary flight and causes the toner to fly in the reverse direction, causing substantially no toner to remain on the roller 71.

To maintain the toner gap less than 6 mm inclusive, the screw shaft 74 is driven to raise the base 73 in accordance with the consumption of the toner 91. This insures constant image density. For example, the toner voltage and toner gap were maintained at 800 V and 1.0 mm, respectively. 3,700 printings expected to consume substantially the entire toner of the container 6 were continuously produced. At this instant, the screw shaft 74 was rotated to make up for the toner consumption calculated on the basis of the area of an image, moving the base 73 upward. It was found that although the toner gap varied between 0.5 mm and 1.5 mm due to a difference between the calculated toner consumption and the actual toner consumption, all the printings had a constant image density of 1.4±0.1.

7th Embodiment

Figure 34:
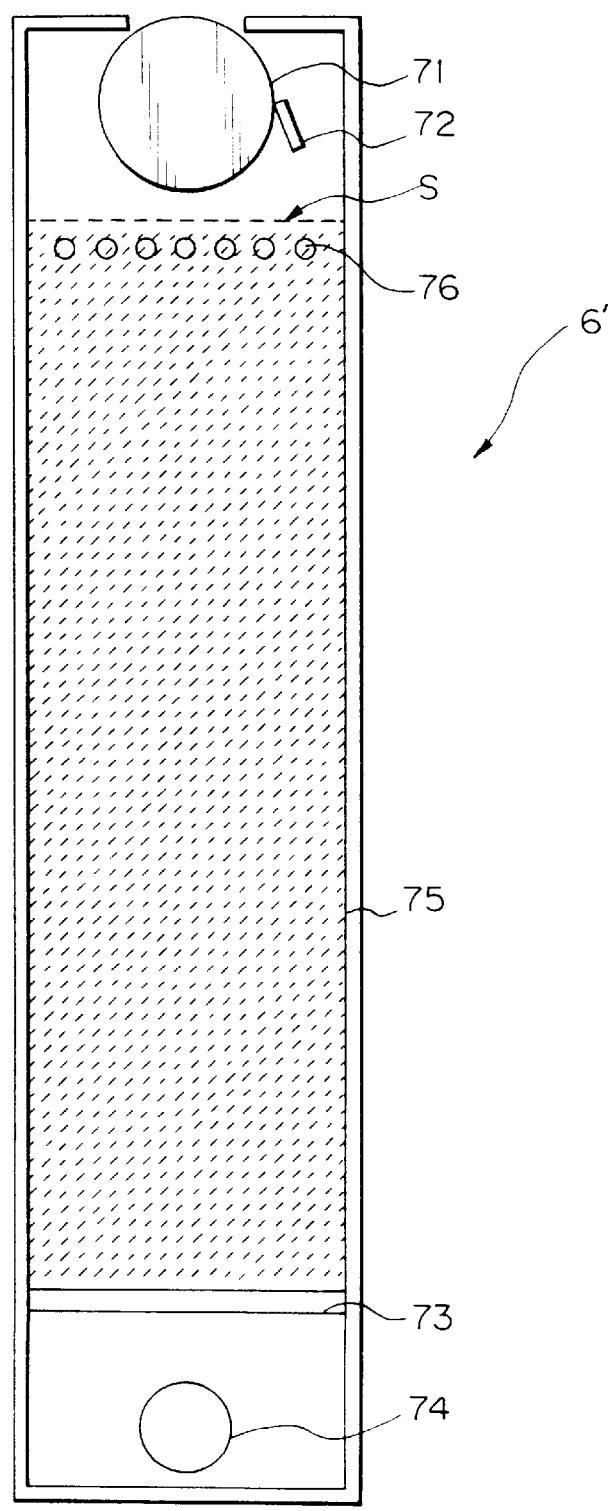
FIG. 34 shows a toner container representative of an eighth embodiment of the present invention.
Figure 35A:
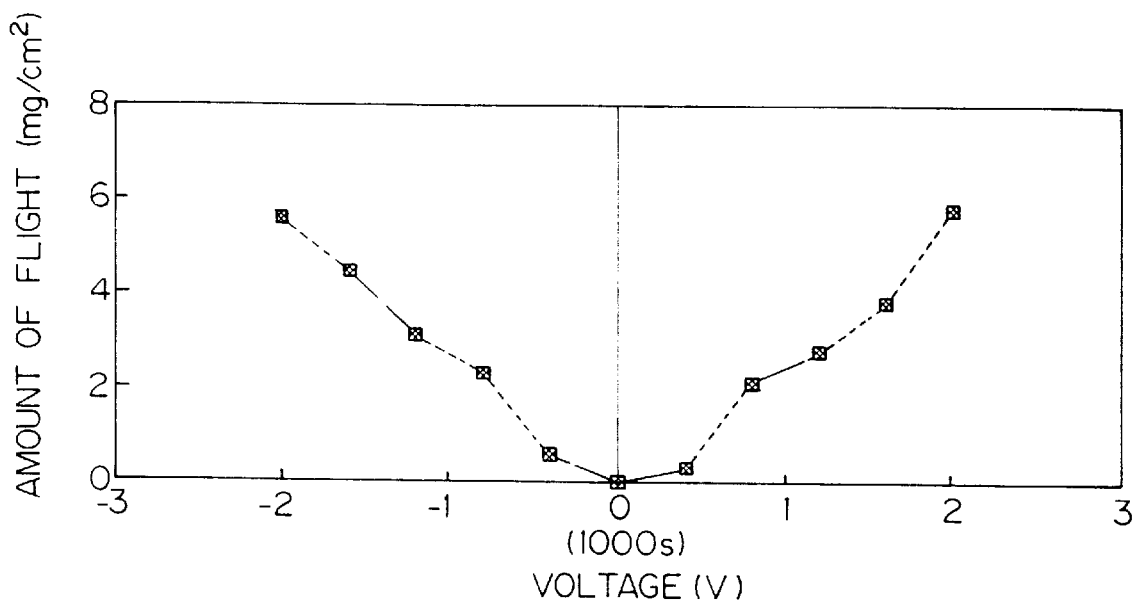
FIG. 35A shows a relation between the amount of primary flight and the toner gap, as measured with the toner container shown in FIG. 34.
Figure 35B:
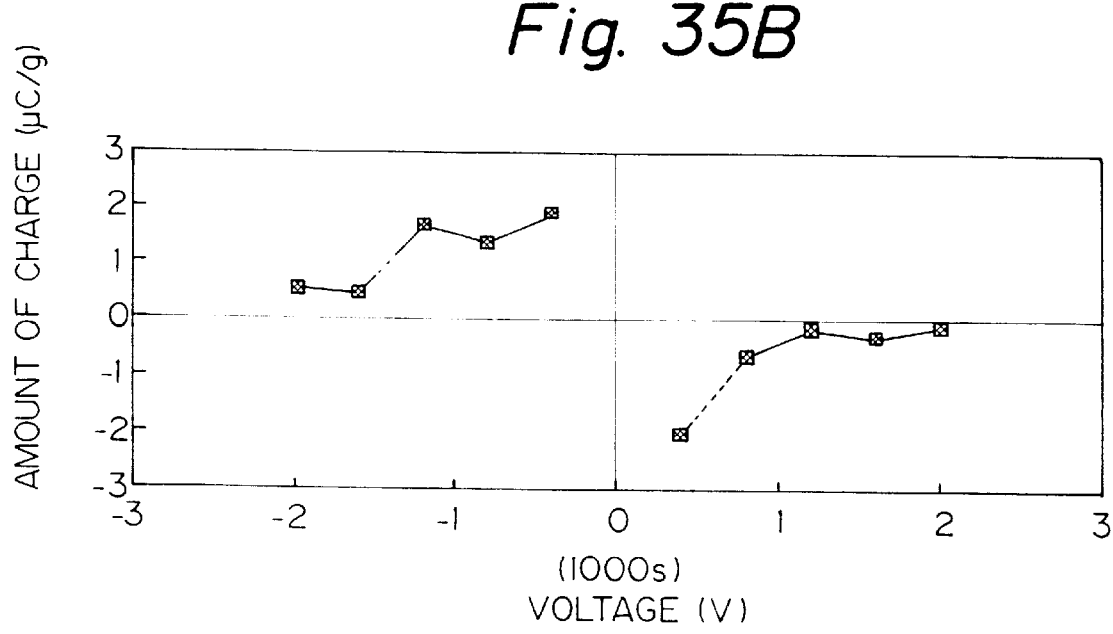
FIG. 35B shows a relation between the amount of charge of toner undergone the primary flight for a unit mass and the toner gap, as also measured with the toner container shown in FIG. 34.

Reference will be made to FIGS. 34, 35A and 35B for describing a seventh embodiment of the present invention. Because the description of the first embodiment made with reference to FIGS. 4, 6, 9 and 10 also applies to this embodiment, it will not be repeated in order to avoid redundancy. While the conductive toner 91 in the sixth embodiment has a conductivity of $10^{-4}$ S/cm, this embodiment uses toner 92 having medium resistance, i.e., a conductivity ranging from $10^{-11}$ S/cm to $10^{-5}$ S/cm. To produce the toner 92, polyethylene oxide having a molecular weight of 10,000, e.g., PEO-1 (trade name) available from Sumitomo Seika Chemicals may be used as mother resin. A pigment is dispersed in the mother resin and then pulverized. The resulting particles are covered with silica. Such toner 92 has a volume mean grain size of 13 μm and a conductivity which is about $10^{-10}$ S/cm at normal temperature and normal humidity, about $10^{-9}$ S/cm at high temperature and high humidity, or about $10^{-11}$ S/cm at low temperature and low humidity.

FIG. 34 shows a toner container 6' whose internal structure is suitable for the toner 92 of medium resistance. The same structural elements of the container 6' as the elements of the container 6, FIG. 30, are designated by identical reference numerals. As shown, a metal screen 76 having an aperture ratio of 70% and a mesh size of 100 is disposed in the container 6' at a distance of, e.g., 2 mm below the bottom of the roller 71, so that the screen 76 is buried in the toner layer. In this case, the inner periphery of the container 6' does not have to be covered with the conductive paint. As for the rest of the configurtation, the container 6' is identical with the container 6.

To feed the toner 92 to the toner conveyor roller 71, the roller 71 is connected to ground while a DC voltage or toner voltage for forming an electric field to cause the toner 92 to fly is applied to the metal screen 76.

For experiment, while the toner gap between the roller 71 and the surface S of the toner layer 92 and the distance between the roller 71 and the metal screen 76 were maintained constant. The toner voltage was applied to the inner periphery 75 of the container 6'. In this condition, the amount of primary flight of the toner 92 and the amount of charge of the toner 92 for a unit mass were measured in the same manner as in the sixth embodiment. FIGS. 35A and 35B show the results of measurement. For the measurement, the toner gap was selected to be 1 mm, the distance between the roller 71 and the metal screen 76 was selected to be 2 mm, the roller 71 was caused to make one rotation at a peripheral speed of 50 mm, and the roller 92 deposited on the roller 71 was sucked via the microholes 54.

As shown in FIG. 35A, the toner 91 starts flying at a toner voltage slightly below 400 V without regard to the polarity of the voltage. In this embodiment, due to the use of the toner 92 of medium resistance, charge of opposite polarity is not allowed to be easily injected into the toner 92 forming the first layer on the roller 71. Therefore, the toner 92 is prevented from flying in the reverse direction. In addition, the insulative surface of the roller 71 contributes to the prevention of the reverse flight of the toner 92 forming the first layer. The charge of opposite polarity is sparingly injected into the second and successive layers of the toner 92. Before the toner 92 is charged to the opposite polarity, the roller 71 rotating at the peripheral speed of 50 mm/sec leaves the range in which the electric field for the primary flight acts. This prevents the toner 92 of the second and successive layers from flying in the reverse direction. Consequently, the amount of flight increases in proportion to the toner voltage.

As shown in FIG. 35B, the amount of charge for a unit mass tends to increase with the increase in toner voltage. This tendency can be accounted for with reference to FIG. 2, as follows. As shown, let the toner 109 be replaced with the toner 92 of medium resistance. Gravity G and the adhesion V acting between the particles of the toner 92 act on the toner 92 downward. The toner 92 starts flying as soon as the sum of the electric field around the toner 92 and the electrostatic force derived from the charge injected into the toner 92 exceeds the sum of gravity G and adhesion V. Because the sum of gravity V and adhesion V is constant, the electrostatic force is also constant. Presumably therefore, as the toner voltage increases to intensify the above electric field, the amount of charge to be injected into the toner 92 decreases. In FIG. 35B, the amount of charge is relatively constant at voltages around −800 V. This indicates that the amount of charge remains relatively constant even when the toner voltage and therefore the field intensity is slightly varied. It follows that when the toner voltage is −800 V, the amount of charge will remain constant despite some variation of the distance between the roller 71 and the metal screen 76.

3,700 printings were continuously produced under the following conditions in order to measure the optical densities of images after fixation. The toner container 6' shown in FIG. 34 was substituted for the toner container shown in FIG. 4. The roller 71 and shield electrode 51 were connected to ground. A voltage of −800 V was selected as the toner voltage. A voltage of 400 V was applied to the counter electrode 4. While the conveyor roller 71 was continuously rotated, a voltage of 180 V and a voltage of 120 V were respectively applied to the roller 71 during recording and during nonrecording for 10 msec each. The screw shaft 74 was rotated once for every 100 printings, raising the base 73 so as to maintain the toner gap of 1.0 mm. It was found that the image density was constantly held at 1.4±0.1 although the toner gap varied within the range of 1+0.5 mm.

Further, after the color printer and the toner 92 of medium resistance were left in a hot and humid atmosphere, i.e., 30° C. and 90%RH, the above continuous printing was repeated. This showed that although the amount of primary flight was slightly greater than in the normal temperature and normal humidity atmosphere, the amount of secondary flight remained the same and provided the images with density as stable as in the normal temperature and normal humidity atmosphere.

In addition, the color printer and the toner 92 of medium resistance were left in a cold and dry atmosphere, i.e., 10° C. and 20%RH, and then the above continuous printing was repeated. This also showed that although the amount of primary flight was slightly greater than in the normal temperature and normal humidity atmosphere, the secondary amount of flight remained the same and insured stable image density.

For comparison, the toner 92 of medium resistance was replaced with the conductive toner 91 used in the sixth embodiment, i.e., RIFAX 9000 whose conductivity is about $10^{-4}$ S/cm at normal temperature and normal humidity. The color printer and toner 91 were left in the 30° C., 90%RH atmosphere, and then the continuous printing was effected. As a result, the image density was found to be as low as about 0.8. This is presumably because the second and successive toner layers fly in the reverse direction at the time of the primary flight and reduce the amount of flight, as stated above, and because reverse flight occurs at the time of secondary flight due to charge injection of opposite polarity from the sheet whose resistance has been lowered.

Further, the toner 92 of medium resistance was replaced with a color toner Ricoh Color PPC Toner, Type F (Trade name) whose conductivity is about $10^{-13}$ S/cm at normal temperature and normal humidity. With this color toner, it was almost impossible to print images. This stems from the fact that after the toner forming the uppermost layer in the toner container has flown due to toner injection, an excessive period of time is necessary for charge great enough to cause the next layer to fly to be injected into the next layer; during such an interval, the roller 61 feeding the toner for the secondary flight while in rotation loses the toner layer.

As stated above, the toner 92 of medium resistance, as distinguished from the conductive toner 91 whose conductivity is high, prevents the toner deposited on the roller 71 from flying reversely. Therefore, the toner can be supplied in a sufficient amount. Further, the toner 92 flies reversely little after the deposition on the sheet 10, insuring stable image density. Moreover, the toner 92 differs from the toner of low conductivity in that it constantly forms a layer on the roller 71 and insures the secondary flight, thereby guaranteeing high image quality.

The continuous printing was also executed under the following conditions. The roller 71 and the surface of the layer of the toner 92 were spaced by 0.2 mm. The distance between the roller 71 and the metal screen 76 was reduced to 0.9 mm. The toner voltage was selected to be −400 V. It was found that although the density remained substantially constant, it was locally reduced or sometimes zero. This is presumably because while the toner 92 is sequentially consumed, the surface of the toner layer becomes irregular. As a result, when the screw shaft 74 raises the base 73, the surface of the toner layer contacts the roller 71 and strips off a part of the toner deposited on the roller 71. While such a n occurrence may be obviated if the surface of the toner layer is made completely flat and mechanically brought toward the roller 71 with high accuracy, this kind of scheme is extremely difficult in practice and increases the cost.

The continuous printing was also executed under the following conditions. The distance between the roller 71 and the surface of the layer of the toner 92 was selected to be 1.0 mm while the distance between the roller 71 and the metal screen 76 was increased to 4 mm. In this case, no undesirable occurrences were found. However, when the distance between the roller 71 and the metal screen 76 was increased to 5 mm, and particularly when the temperature and humidity were high, spark discharge and creeping discharge occurred locally between the screen 76 and the roller 71, preventing the electric field from acting on the toner layer. As a result, the primary flight of the toner 92 did not occur and caused a black solid image to be locally lost.

Further, the continuous printing was executed by removing the metal screen 76, covering the inner periphery of the container 6' with the conductive paint, and applying voltages of from −800 V to −1,600 V to the inner periphery of the container 6'. The resulting image density was as low as about 0.8 even when the voltage was −1,600 V. This stems from the fact that the distance between the inner periphery of the container 6' and the roller 71 is too great to apply a sufficient electric field to the layer of the toner 92, preventing the toner 92 from being fed to the roller 71 in a sufficient amount by the primary flight. While the above voltage may be raised in order to set up a sufficient electric field, a sufficient image density is not achievable unless the voltage is increased to a noticeable degree. This would increase the cost and aggravates the discharge problem.

As stated above, when use is made of the toner 92 of medium resistance, the metal screen 76 is disposed in the toner container 6' and spaced from the bottom of the roller 71 by a preselected distance. The preselected distance is such that the protruding portions of the irregular surface of the toner layer ascribable to the irregular consumption of the toner do not contact the toner carrier when the distance between the conductive screen and the toner carrier is to be held constant. In addition, the distance is such that the voltage applied to the conductive screen for causing the toner above the screen to fly toward the toner carrier in a sufficient amount for image formation does not cause discharge to occur between the screen and the toner carrier. For example, such a distance is between 1.0 mm and 4.0 mm. In this condition, the toner 92 can be caused to fly by a low voltage which does not bring about discharge, insuring high image quality stably.

8th Embodiment

Reference will be made to FIGS. 30 and 34 for describing an eighth embodiment of the present invention also implemented as a color printer. Because the description of the first embodiment made with reference to FIGS. 4, 6, 9 and 10 and that of the second embodiment made with reference to FIG. 11 also apply to this embodiment, they will not be described in order to avoid redundancy. This embodiment also uses the rectifying toner 90 used in the second embodiment and having the characteristic described with reference to FIGS. 11 and 12. The toner 90 is chargeable to the positive polarity as easily as conductive toner of low resistance due to charge injection, but not chargeable to the negative polarity as easily as insulating toner. Therefore, even when the surface of the roller 71 is not formed of an insulator, the toner 90 flown from the toner layer and deposited on the roller 71 is not charged to the negative polarity because negative charge is not injected into the toner 90. Further, the toner forming the second and successive layers on the roller 71 is not charged to the negative polarity either. It follows that the toner 90 deposited on the toner carrier 71 does not fly reversely, but remains thereon in a sufficient amount.

The toner container 6' used in this embodiment is identical with the toner container 6' shown in FIG. 34 except that it lacks the blade 72. How the roller 71 is cleaned will be described later. To feed the toner 90 to the roller 71, the roller 71 is connected to ground while the mesh screen 76 is applied with a DC voltage or toner voltage for the flight of the toner 90, as in the seventh embodiment. If the volume resistivity of the toner 90 is as low as, e.g., 10−6 Ωcm or below, use may be made of the toner container 6 shown in FIG. 30, but with its blade 72 removed. In this case, the voltage will be applied to the inner periphery of the container 6.

The blade 72 used to clean the roller 71 is apt to shave off the surface of the roller 71 if it is hard or to chip itself if it is soft. The resulting pieces of the roller 71 or those of the blade 72 are introduced into the toner and render images defective. When the blade 72 chips off, it fails to clean the roller 71 in the expected manner and brings about defective images. When the toner forms a film on the surface of the roller 71, the adhesion acting between the surface of the roller 71 and the toner increases and obstructs the secondary flight, also resulting in defective images. Van der Waals's forces acting on the toner 90 are proportional to the grain size of the toner 90 while the electrostatic force is proportional to the amount of charge deposited on the toner. The amount of charge is proportional to the surface area of the toner 90, i.e., the square of the grain size. Therefore, when the grain size is halved, the electrostatic force is reduced to one-fourth although van der Waals's forces are halved; the flight of the toner 90 becomes more difficult as the grain size decreases. It is likely that the toner 90 of small grain size passes under the blade 72 to accumulate on the roller 71 and fails to fly away from the roller 71, resulting in low image density. In addition, the blade 72 must be replaced because it wears due to friction between it and the roller 71.

In light of the above, the embodiment cleans the roller 71 without using the blade 72. For the cleaning purpose, an electric field opposite in direction to the electric field for causing the toner 90 in the container 6' to fly toward the roller 71 is applied before or after the flight of the toner 90.

The control electrode 5 controls the flight of the toner 90 by applying an electric field to the toner 90 deposited on the roller or toner carrier 71. When the above electric field is applied for cleaning the roller 71, the potential difference between the roller 71 and one of the electrodes constituting the polarity control member 5 facing the roller 71, i.e., the shield electrode 53 in the configuration shown in FIG. 6 should preferably be so selected as to prevent leak from occurring between the roller 71 and the shield electrode 53. Specifically, before or after image formation, e.g., after the trailing edge of a sheet has moved away from the recording position, but before the leading edge of the next sheet reaches the recording position, the voltage opposite in polarity to the toner voltage is applied to the metal screen 76 with the roller 71 connected to ground. As a result, the toner 90 left on the roller 71 flies reversely toward the surface of the toner layer on the base 73, i.e., the surface of the roller 71 is cleaned. This kind of non-contact cleaning scheme does not bring about defective images or low image density. In addition, because the roller 71 is connected to ground, an intense electric field is not formed between the roller 71 and the shield electrode 53, so that leak between the roller 71 and the shield electrode 53 is eliminated.

For experiment, in the color printer shown in FIG. 4, the gap or toner gap between the roller 71 and the surface of the toner layer was selected to be 1.0 mm while the gap between the roller 71 and the metal screen 76 was selected to be 2.0 mm. The toner container 6' shown in FIG. 34 was used. A preselected image pattern was continuously formed on about 4,000 sheets of size A4 at a rate of ten printings per minute until the toner in the container 6' was substantially fully consumed. Every time the toner gap became greater than 1.5 mm, the screw shaft 74 was rotated to raise the base 73 so as to maintain the toner gap of 1±0.5 mm. The printing operation was performed under the following conditions. The roller 71 and shield electrode 51 were connected to ground. While the roller 71 was continuously rotated, voltages of −180 V and −120 V were respectively applied to the image electrode at the time of recording and at the time of non-recording. Voltages of 0 V and 20 V were respectively applied to the shield and group drive electrodes when selected and when not selected. A voltage of −1,200 V was applied to the metal screen 76 for 1.5 sec at every interval between consecutive sheets.

The voltage applied to the metal screen 76 successfully caused the toner left on the roller 71 to fly reversely toward the surface of the toner layer on the base 73, eventually cleaning the surface of the roller 71. The image density was constantly as high as 1.4.

For comparison, use was made of the toner container 6' with the blade 72 shown in FIG. 34. The above printing operation was repeated with the blade 72 cleaning the roller 71. Initially, the image density was as high as 1.4 and produced desirable printings. However, the image density sequentially decreased and brought about defective images including solid images with white stripes and images having black spots in the background. This is apt to occur also in the sixth and seventh embodiments using the conductive toner 92 and toner 92 of medium resistance, respectively. The decrease in image density stems from the fact that the toner of small grain size which does not fly easily passes under the blade 72 and accumulates on the surface of the roller 71. The white stripes result from an occurrence that the blade 72 partly chips off and fails to clean a part of the roller 71, causing the toner difficult to fly to accumulate on the roller 71. Further, the black spots are presumably ascribable to the chipped pieces of the blade 72 and the pieces of the coating (polyester) of the roller 71 shaved off by the blade 72.

Rectifying toner 90' was produced which was identical with the rectifying toner 90 except that the amount of silica covering its particles was increased to 1 wt % in order to reduce the volume resistivity. The rectifying characteristic of the toner 90' was also measured by using the device shown in FIG. 11. The toner 90' was found to be lower in rectifying characteristic than the toner 90. When a voltage of +2,000 V was applied, the toner 90' flew in an amount which was one-forth of the amount to fly when a voltage of −2,000 V was applied. The printing operation was effected by replacing the toner container 6' of FIG. 34 with the toner container 6 of FIG. 30, but with the blade 72 removed, and by applying +2 kV to the inner periphery of the container 6 during image formation and −2 kV during cleaning effected between sheets. In this condition, prints with high image density were produced, and in addition the roller 71 was desirably cleaned. This shows that the toner 90' exhibits its rectifying characteristic in the range of the electric fields derived from the voltages applied to the container 6 during image formation and cleaning.

For comparison, prints were produced by use of the conductive toner RIFAX 9000 in place of the above rectifying toner. In this case the roller 71 could not be cleaned because the toner on the base 73 flew toward the roller 71 at the same time as the toner left on the roller 71 flew reversely toward the surface of the toner layer on the base 73. In addition, because the toner flown from the surface of the toner layer on the base 73 toward the roller 71 was negatively charged, the toner formed masses at the leading edges of sheets. This stems from the fact that the negatively charged toner deposits on the positively charged toner for image formation and flies in masses together with the positively charged toner; when the masses deposit on a sheet, only the negatively charged toner is scattered around.

Prints were produced by replacing the above rectifying toner with the toner 92 of medium resistance used in the seventh embodiment, and by varying the printing condition accordingly, i.e., reducing the print speed to one-tenth. The toner 92, like the conductive toner 91, flew from the surface of the toner layer on the base 73 toward the roller 71 at the same time as it flew from the roller 71 toward the toner layer. As a result, the roller 71 could not be cleaned. In addition, defective images ascribable to the masses of toner also occurred.

Even when the resistance of the sheet 10 is low, the rectifying toner of this embodiment and deposited on the sheet 10 is free from the injection of charge of opposite polarity, and therefore does not fly reversely. This insures sufficient image density even in, e.g., a hot and humid atmosphere. Even when the toner is deposited in layers, the second and successive layers are prevented from flying reversely due to the charge of opposite polarity ascribable to electrostatic induction. As a result, a full-color print with a laminate of toners of different colors is achievable. Further, if an electric field causing the toner to fly only in one direction is applied, the toner is prevented from being charged to the opposite polarity and flying reversely. This obviates an occurrence that toner flying toward a recording medium and toner flying reversely are brought into elastic collision and scattered around a desired image on the recording medium. Consequently, a sharp image with an image and a background clearly distinguished from each other is attainable.

While the above embodiment has concentrated on toner chargeable only to the positive polarity, it is practicable only if use is made of rectifying toner chargeable either positively or negatively by an electric field which can be formed in the range of a voltage applied to a powder image recording device.

As stated above, in the sixth to eighth embodiments, a DC electric field is applied to at least a part of conductive toner stored in a toner container, charging it to a particular polarity. As a result, the toner is caused to fly by an electrostatic force and deposit on a toner carrier. Because a DC power source is lower in cost than an AC power source, the embodiments successfully reduce the cost. Further, use is made of toner which flies reversely little, or toner whose surface is formed of an insulator. The embodiments are therefore capable of feeding the toner in a sufficient amount and implements high-speed printing, compared to the conventional system causing toner in the form of a cloud to deposit electrostatically due to the mirror-image force of its own charge. At the same time, the embodiments insure stable image density, i.e., stable image quality.

Various modifications will become possible for those skilled in the art after receiving the teachings of the present disclosure without departing from the scope thereof.

What is claimed is:

1. In an image recording method using a toner carrier for carrying a toner thereon, a counter electrode, and a flight control member intervening between said toner carrier and said counter electrode and comprising a plurality of independent or continuous microholes and a plurality of control electrodes for controlling passage of toner through said microholes, said method comprising the steps of:

applying a voltage to said plurality of control electrodes in accordance with an image signal to thereby cause said toner on said toner carrier to move toward said counter electrode via said microholes, and deposit on a recording medium intervening between said flight control member and said counter electrode to thereby form an image on said recording medium, and even when a voltage for forming an image is not applied to said control electrodes, continuously applying an electric field which generates an electrostatic force causing the toner which left said toner carrier to continue to fly toward said recording medium, but preventing toner from newly flying from said toner carrier.

2. In an image recording method using a toner carrier for carrying a toner thereon, a counter electrode, and a flight control member intervening between said toner carrier and said counter electrode and comprising a plurality of independent or continuous microholes and a plurality of control electrodes for controlling passage of toner through said microholes, said method comprising the steps of:

applying a voltage to said plurality of control electrodes in accordance with an image signal to thereby cause said toner on said toner carrier to move toward said counter electrode via said microholes, and deposit on a recording medium intervening between said flight control member and said counter electrode to thereby form an image on said recording medium, wherein said toner comprises rectifying toner exhibiting a rectifying characteristic in a range of voltages used in said method.

3. In an image recording method using a toner carrier for carrying a toner thereon, a counter electrode, and a flight control member intervening between said toner carrier and said counter electrode and comprising a plurality of independent or continuous microholes and a plurality of control electrodes for controlling passage of toner through said microholes, said method comprising the steps of:

applying a voltage to said plurality of control electrodes in accordance with an image signal to thereby cause said toner on said toner carrier to move toward said counter electrode via said microholes, and deposit on a recording medium intervening between said flight control member and said counter electrode to thereby form an image on said recording medium, and even when voltages for forming an image are applied to said counter electrode and said control electrodes, applying an electric field for preventing toner other than toner expected to pass through said microholes from flying from said toner carrier.

4. A powder image recording method comprising the steps of:

(a) causing conductive toner stored in a toner container to fly and deposit on a toner carrier facing said toner container;

(b) causing the conductive toner to selectively fly from said toner carrier and deposit on a recording medium intervening between said toner carrier and a counter electrode facing said toner carrier; and (c) applying a DC electric field to at least a part of the conductive toner stored in said toner container to thereby cause said part of said conductive toner to fly toward said toner carrier.

5. A method as claimed in claim 4, wherein at least a part of said toner container contacting the conductive toner is formed of a conductive material.

6. A method as claimed in claim 4, wherein at least a surface of said toner carrier is formed of an insulating material.

7. A method as claimed in claim 4, wherein the conductive toner has a resistivity ranging from $10^{-11}$ S/cm to $10^{-5}$ S/cm.

8. A method as claimed in claim 4, further comprising (d) burying a conductive mesh in a layer the conductive toner in said toner container at a preselected distance from said toner carrier.

9. A method as claimed in claim 8, wherein said preselected distance is such that after a surface of said layer has become irregular due to uneven consumption of the conductive toner, protruding portions of said surface do not contact said toner carrier when the distance between said conductive mesh and said toner carrier is regulated, and such that a voltage applied to said conductive mesh for causing the conductive toner above said conductive mesh to fly toward said toner carrier in a sufficient amount for image formation does not cause discharge to occur between said conductive mesh and said toner carrier.

10. A method as claimed in claim 4, further comprising (d) providing moving means for moving the conductive toner in said toner container bodily toward said toner carrier, and (e) and causing said moving means to maintain a distance between said toner carrier and a surface of the conductive toner in a preselected range.

11. A method as claimed in claim 4, wherein the conductive toner comprises rectifying toner exhibiting a rectifying characteristic in a range of intensity of the DC electric field.

12. A method as claimed in claim 11, further comprising (d) applying, before or after a flight of the rectifying toner caused by said DC electric field, an electric field opposite in direction to said DC electric field to thereby cause said rectifying toner on said toner carrier to fly toward said toner container.

13. A method as claimed in claim 12, wherein means for causing the rectifying toner carried on said toner carrier to selectively fly comprises a flight control member intervening between said toner carrier and said counter electrode, and wherein said flight control member comprises a plurality independent or continuous microholes and a plurality of control electrodes for controlling passage of the rectifying toner through said holes.

14. A method as claimed in claim 13, said electric field opposite in direction to said DC electric field is applied between said toner carrier and the rectifying toner in said toner container while a potential difference between said flight control member and said toner carrier is so maintained as not to cause leak to occur between said flight control member and said toner carrier.

* * * * *